(12) United States Patent
Teranishi et al.

(10) Patent No.: US 9,304,640 B2
(45) Date of Patent: Apr. 5, 2016

(54) INPUT DEVICE, DISPLAY DEVICE, AND ELECTRONIC DEVICE

(71) Applicant: Japan Display Inc., Tokyo (JP)

(72) Inventors: Yasuyuki Teranishi, Tokyo (JP); Takafumi Suzuki, Tokyo (JP); Kohei Azumi, Tokyo (JP)

(73) Assignee: Japan Display Inc., Tokyo (JP)

( * ) Notice: Subject to any disclaimer, the term of this patent is extended or adjusted under 35 U.S.C. 154(b) by 42 days.

(21) Appl. No.: 14/155,036

(22) Filed: Jan. 14, 2014

(65) Prior Publication Data

US 2014/0218335 A1 Aug. 7, 2014

(30) Foreign Application Priority Data

Feb. 7, 2013 (JP) .................................. 2013-21912

(51) Int. Cl.
  *G06F 3/045* (2006.01)
  *G06F 3/044* (2006.01)
(52) U.S. Cl.
  CPC ...................................... *G06F 3/044* (2013.01)
(58) Field of Classification Search
  CPC ....................................................... G06F 3/044
  USPC ......................................................... 345/174
  See application file for complete search history.

(56) References Cited

U.S. PATENT DOCUMENTS

| 8,466,900 B2 | 6/2013 | Kawaguchi et al. |
| 2007/0257894 A1 | 11/2007 | Philipp |
| 2010/0090979 A1 | 4/2010 | Bae |
| 2010/0309162 A1 | 12/2010 | Nakanishi et al. |
| 2012/0062472 A1* | 3/2012 | Yilmaz ......................... 345/173 |
| 2012/0075238 A1 | 3/2012 | Minami et al. |
| 2013/0021296 A1 | 1/2013 | Min et al. |
| 2013/0088459 A1* | 4/2013 | Yeh et al. ....................... 345/174 |

FOREIGN PATENT DOCUMENTS

| JP | 05-165560 | 7/1993 |
| JP | 2010-282501 | 12/2010 |
| JP | 2012-014329 | 1/2012 |

(Continued)

OTHER PUBLICATIONS

Korean Office Action issued Apr. 27, 2015, for corresponding Korean Appln. No. 10-2013-162836.

(Continued)

*Primary Examiner* — Charles Hicks
(74) *Attorney, Agent, or Firm* — K&L Gates LLP

(57) ABSTRACT

A noise immunity of a detected capacitance is prevented or inhibited from lowering on a driving electrode different in width from the other driving electrodes, provided in an input device. A touch panel serving as an input device has a plurality of driving electrodes extending in an X-axis direction and arranged in a Y-axis direction intersecting with the X-axis direction, and a driving electrode arranged outside one side of an arrangement of the driving electrodes and extending in the X-axis direction. Further, the touch panel TP1 has a plurality of detecting electrodes extending in the Y-axis direction and arranged in the X-axis direction. The width of the driving electrode is smaller than the widths of the driving electrodes and the detecting electrode includes an expanding portion for expanding the area of the detecting electrode on the side opposite to the plurality of driving electrodes via the driving electrode.

6 Claims, 37 Drawing Sheets

(56) References Cited

FOREIGN PATENT DOCUMENTS

| | | |
|---|---|---|
| JP | 2012-043298 | 3/2012 |
| JP | 2012-073783 | 4/2012 |

OTHER PUBLICATIONS

Taiwan Office Action issued Jul. 29, 2015 in corresponding Taiwan Patent Application No. 102140556.

* cited by examiner

FIG. 2
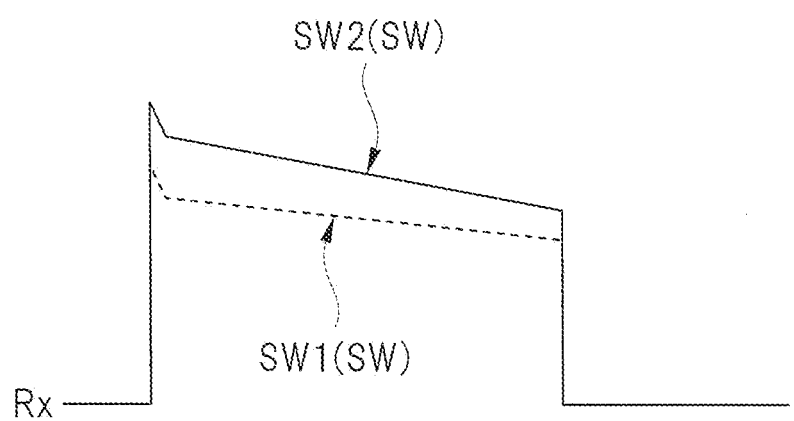
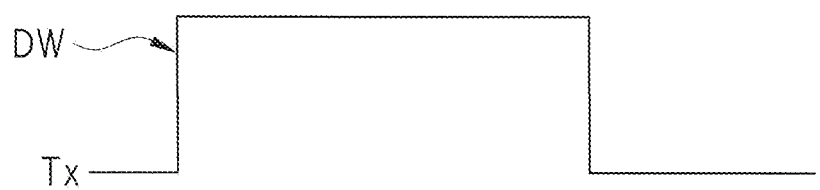

INPUT DEVICE, DISPLAY DEVICE, AND ELECTRONIC DEVICE

CROSS REFERENCES TO RELATED APPLICATIONS

The present application claims priority to Japanese Priority Patent Application JP 2013-021912 filed in the Japan Patent Office on Feb. 7, 2013, the entire content of which is hereby incorporated by reference.

BACKGROUND

The present invention relates to an input device, a display device, and electronic device, and in particular to an input device of a capacitance type, and a display device and electronic device which are provided with such an input device.

In recent years, technique of attaching an input device which is called "touch panel" or "touch sensor" to a display surface side of a display device, and when an input action has been performed by bringing an input tool such as a finger of a user or a touch pen into contact with the touch panel, an input position is detected to be outputted. Since display devices having such a touch panel do not require an input device such as a keyboard, a mouse, or a keypad, they are widely used in portable information terminals such as a mobile phone in addition to computers.

As one of detecting systems for detecting a contact position at which a finger of a user or the like has comes into contact with a touch panel, there is an electrostatic capacitance system. In a touch panel using the capacitance type, a plurality of capacitive elements composed of a pair of electrodes disposed to face each other via a dielectric layer, namely, a driving electrode and a detecting electrode, is provided in plane of the touch panel. When an input action has been performed by bringing such an input tool as a finger of a user or a touch pen into contact with a capacitive element, a capacitance is added to the capacitive element, so that a detected capacitance is changed, which is utilized to detect the input position.

In Japanese Patent Application Laid-Open Publication No. 2012-73783 (Patent Document 1), there is described a display device of a so-called "in-cell type" where a liquid crystal display device composed of liquid crystal display elements and a touch-detecting device of a capacitance type are integrated with each other. Further, in the Patent Document 1, there is such a description that common electrodes for display which are also used as driving electrodes of the touch-detecting device are arranged side by side extending in one direction, while detecting electrodes of the touch-detecting device are arranged side by side so as to extend in a direction intersecting with the common electrodes.

In Japanese Patent Application Laid-Open Publication No. 2012-43298 (Patent Document 2), there is described a technique where in an input device, a plurality of lower transparent electrodes extending in a first direction are arranged in a second direction orthogonal to the first direction, and a plurality of upper transparent electrodes extending in the second direction are arranged in the first direction.

In Japanese Patent Application Laid-Open Publication No. 2012-14329 (Patent Document 3), there is described a technique of detecting an input position in an input device according to a self-capacitance system where the number of electrodes used for sensing is one. Further, in the Patent Document 3, there is a description that the electrode used for sensing has an isosceles trapezoid having an upper side, a lower side and two oblique sides.

SUMMARY

In the input device provided in the display device of an in-cell type described in the Patent Document 1, the driving electrode has a function serving as a driving electrode of the input device and a function serving as a common electrode of the display device. Further, in the display device, an image is displayed by applying a voltage between common electrodes and pixel electrodes disposed to face each other via an insulating film, but it is necessary to control a voltage applied at the displaying time for each pixel, so that it is undesirable that two common electrodes adjacent to each other overlap with one pixel electrode in a plan view. Therefore, the width of the driving electrode is the integral multiple of an arrangement period or each width of pixel electrodes, and the integer corresponds to the number of pixels per one driving electrode.

However, such a case may take place that the number of pixel electrodes, namely the number of pixels, in the arrangement direction of the driving electrodes are determined depending on the specification required as the display device and the number of pixels in the arrangement direction of the driving electrodes and the number of pixels in the arrangement direction of the driving electrodes cannot be evenly divided by the number of pixels per one driving electrode. Here, since a broken number due to the indivisibility is allocated to, for example, a driving electrode at one end in the arrangement of driving electrodes, the width of a certain driving electrode is sometimes different from the widths of the other driving electrodes.

In such a case, the area of a portion of a detecting electrode overlapping with the driving electrode having the different width is different from the area of a portion of the detecting electrode overlapping with each of the other electrodes. Therefore, an electrostatic capacitance between the driving electrode having the different width and the detecting electrode cannot be made equal to an electrostatic capacitance between each of the other driving electrodes and the detecting electrode. Therefore, a difference, namely, a tolerance, of the detected capacitance detected on the driving electrode having the different width to the upper limit or the lower limit of an ADC (analog-to-digital converter) range becomes small, so that a noise immunity of the detected capacitance may lower.

Further, even in an input device used as a single unit and an input device provided in a display device of an on-cell type where the display device and the input device are provided as units separated from each other, the width of a certain driving electrode is different from the widths of the other driving electrodes due to an arrangement constraint or the like. In such a case, it is also impossible to make the electrostatic capacitance between the driving electrode having the different width and the detecting electrode equal to the electrostatic capacitance between each of the other driving electrodes and the detecting electrode. Therefore, the tolerance of the detected capacitance detected on the driving electrode having the different width to the upper limit or the lower limit of the ADC range becomes small, which may result in lowering of the noise immunity of the detected capacitance.

The present invention has been made in order to solve the problem in a conventional art such as described above, and an object thereof is to provide an input device which can inhibit the noise immunity of the detected capacitance from lowering on the driving electrode having a width different from the widths of the other driving electrodes, and a display device provided with the input device.

The typical ones of the inventions disclosed in the present application will be briefly described as follows.

An input device of a typical embodiment includes: a plurality of first electrodes extending in a first direction, respectively, and arranged in a second direction intersecting with the first direction in a plan view; a second electrode arranged outside one side of an arrangement of the plurality of first electrodes and extending in the first direction in a plan view; and a plurality of third electrodes extending in the second direction, respectively, and arranged in the first direction in a plan view. In the input device, an input position is detected based upon a first electrostatic capacitance between the third electrode and the first electrode and a second electrostatic capacitance between the third electrode and the second electrode, a first width of the second electrode in the second direction is smaller than a second width of the first electrode in the second direction, and the third electrode includes a first expanding portion for expanding the area of the third electrode on an opposite side of the plurality of first electrodes interposing the second electrode in a plan view.

In addition, an input device of a typical embodiment includes: a plurality of first electrodes extending in a first direction, respectively, and arranged in a second direction intersecting with the first direction in a plan view; a second electrode arranged outside one side of an arrangement of the plurality of first electrodes or in the middle of the arrangement of the plurality of first electrodes and extending in the first direction in a plan view; and a plurality of third electrodes extending in the second direction, respectively, and arranged in the first direction in a plan view. In the input device, an input position is detected based upon a first electrostatic capacitance formed at a first intersection portion between the third electrode and the first electrode and a second electrostatic capacitance formed at a second intersection portion between the third electrode and the second electrode, a first width of the second electrode in the second direction is different from a second width of the first electrode in the second direction, the third electrode includes a first expanding portion for expanding the area of the third electrode at the second intersection portion, and the area of the first expanding portion is adjusted such that the area of a portion of the third electrode overlapping with the second electrode approaches the area of a portion of the third electrode overlapping with the first electrode in a plan view.

Moreover, an input device of a typical embodiment includes: a plurality of first electrodes extending in a first direction, respectively, and arranged in a second direction intersecting with the first direction in a plan view; a second electrode arranged outside one side of an arrangement of the plurality of first electrodes or in the middle of the arrangement of the plurality of first electrodes and extending in the first direction in a plan view; and a plurality of third electrodes extending in the second direction, respectively, and arranged in the first direction in a plan view. In the input device, an input position is detected based upon a first electrostatic capacitance formed at a first intersection portion between the third electrode and the first electrode and a second electrostatic capacitance formed at a second intersection portion between the third electrode and the second electrode, a first width of the second electrode in the second direction is larger than a second width of the first electrode in the second direction, the third electrode includes a first expanding portion for expanding the area of the third electrode at the first intersection portion, and the area of the first expanding portion is adjusted such that the area of a portion of the third electrode overlapping with the second electrode approaches the area of a portion of the third electrode overlapping with the first electrode.

The effects obtained by typical aspects of the present invention will be briefly described below.

According to the representative embodiment, in the input device and the display device provided with the input device, the noise immunity of the detected capacitance can be prevented or inhibited from lowering on the driving electrode having a width different from the widths of the other driving electrodes.

Additional features and advantages are described herein, and will be apparent from the following Detailed Description and the figures.

BRIEF DESCRIPTION OF THE FIGURES

FIG. 2 is an explanatory diagram showing an example of a relationship between a driving waveform applied to the touch panel shown in FIG. 1 and a signal waveform outputted from the touch panel;

DETAILED DESCRIPTION

Figure 1:
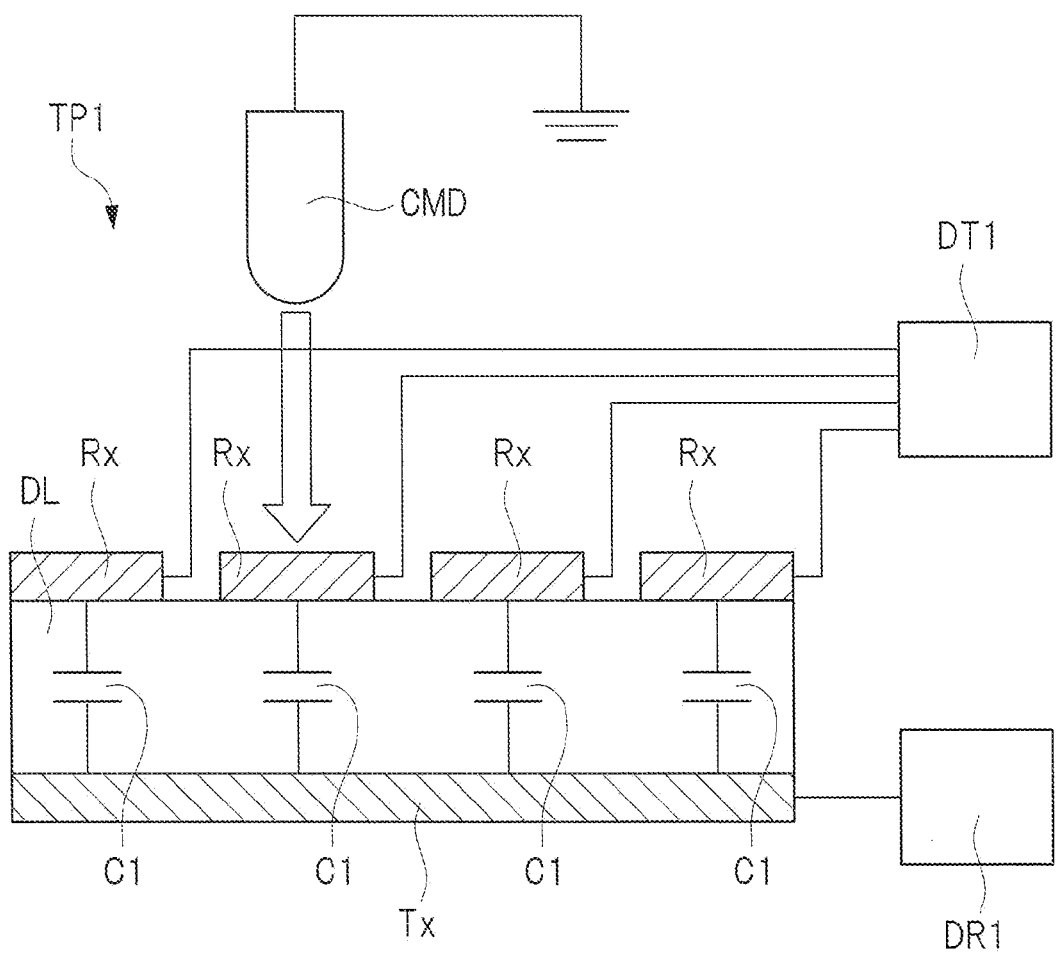
FIG. 1 is an explanatory diagram showing a schematic configuration of a touch panel of a capacitance type.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and the like), the number of the elements is not limited to a specific number unless otherwise stated or except the case in which the number is apparently limited to a specific number in principle. The number larger or smaller than the specified number is also applicable.

Further, in the embodiments described below, it goes without saying that the components (including element steps) are not always indispensable unless otherwise stated or except the case in which the components are apparently indispensable in principle. Similarly, in the embodiments described below, when the shape of the components, positional relation thereof, and the like are mentioned, the substantially approximate and similar shapes and the like are included therein unless otherwise stated or except the case in which it is conceivable that they are apparently excluded in principle. The same goes for the numerical value and the range described above.

Hereinafter, embodiments of the present invention will be described in detail with reference to the accompanying drawings. Note that components having the same function are denoted by the same reference symbols throughout the drawings for describing the embodiments, and a repetitive description thereof is omitted. In addition, the description of the same or similar portions is not repeated in principle unless particularly required in the following embodiments.

Also, in some drawings used in the embodiments, hatching may be used even in a plan view so as to make the drawings easy to see. Also, even in plan views, hatching may be used so as to make the drawing easy to see.

(First Embodiment)

<Operating Principle of Input Device of Capacitance Type>

Figure 3:
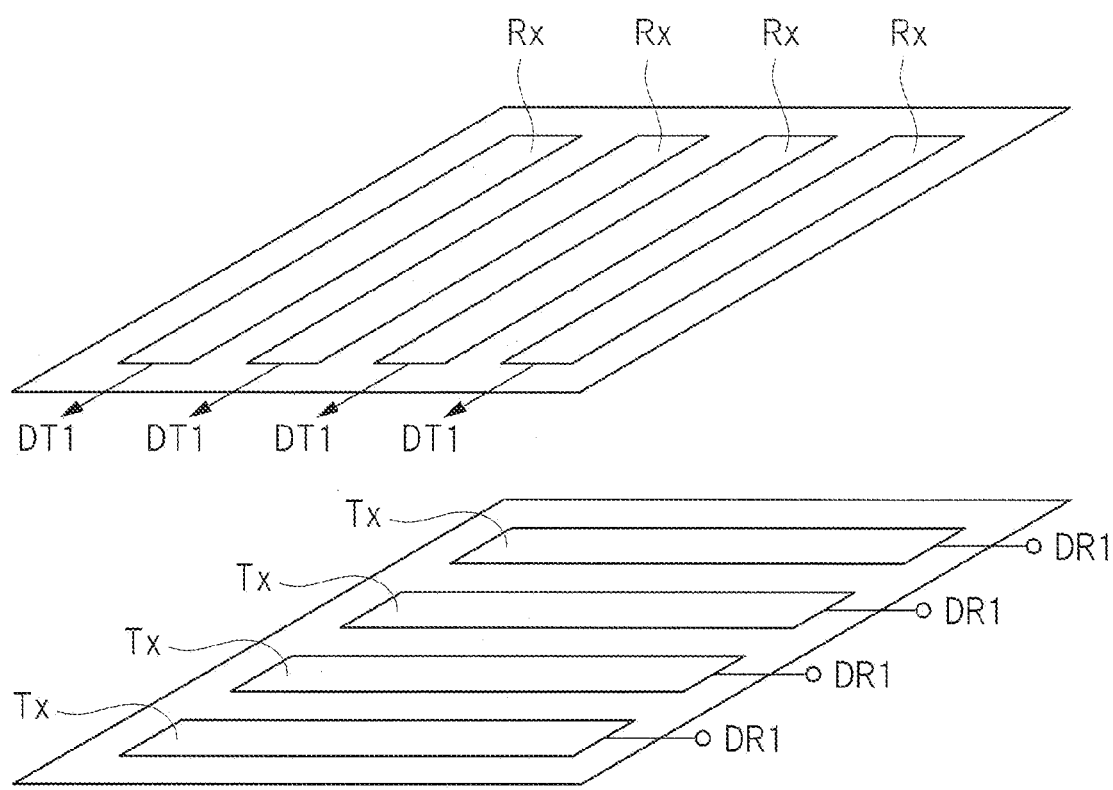
FIG. 3 is an explanatory diagram schematically showing one example of arrangements of driving electrodes and detecting electrodes shown in FIG. 1.

First of all, a basic operating principle of an input device called "touch panel" or "touch sensor" of a capacitance type will be described. FIG. 1 is an explanatory diagram showing a schematic configuration of a touch panel of a capacitance type. Further, FIG. 2 is an explanatory diagram showing an example of a relationship between a driving waveform applied to the touch panel shown in FIG. 1 and a signal waveform outputted from the touch panel. Furthermore, FIG. 3 is an explanatory diagram schematically showing one example of arrangements of driving electrodes and detecting electrodes shown in FIG. 1.

A touch panel TP1 of a capacitance type as an input device has a plurality of driving electrodes Tx and a plurality of detecting electrodes Rx. The driving electrodes Tx and the detecting electrodes Rx are disposed so as to face each other via a dielectric layer DL, and capacitive elements C1 are formed by the driving electrodes Tx, the dielectric layer DL, and the detecting electrodes Rx.

A driving waveform DW which is a rectangular wave, for example, such as that shown in FIG. 2, is applied to the driving electrode Tx from a driving circuit DR1 for an input device as a voltage for detection of an input position, namely, a driving voltage. For example, as shown in FIG. 2, current corresponding to the driving waveform DW and the capacitive element C1 shown in FIG. 1 flows from the detecting electrode Rx and a signal waveform SW is outputted therefrom. The signal waveform SW outputted from the detecting electrode Rx is outputted into a detection circuit DT1 (see FIG. 1) which detects the input position. The detection circuit DT1 is provided with an ADC (analog-to-digital converter), so that the signal waveform SW outputted from the detecting electrode Rx, namely, the detected capacitance, is converted from an analog signal to a digital signal by the ADC for processing.

Here, as shown in FIG. 1, when an input tool CMD having one end being connected to a ground potential, such as a finger of a user or a touch pen is brought close to or is brought into contact with the detecting electrode Rx of the touch panel TP1, a capacitance of the input tool CMD is added to the capacitive element C1 at a position close to the input tool CMD. Therefore, a signal waveform SW1, namely, the detected capacitance, outputted from the detecting electrode Rx disposed at a position close to the input tool CMD is smaller than the signal waveforms SW2, namely, the detected capacitances outputted from the detecting electrodes Rx disposed at the other positions (for example, see FIG. 2).

Therefore, in the detection circuit DT1, signal waveforms SW, namely, detected capacitances, respectively transmitted from the plurality of the detecting electrodes Rx, are monitored, namely, measured, and the position of the input tool CMD can be identified or detected based upon the change amount of the signal waveforms SW, namely, the detected capacitances. For example, a threshold value is preliminarily set to the change amount of the signal waveform SW, namely, the detected capacitance, and the position of the input tool CMD can be outputted with reference to position data of the detection electrode Rx exceeding the threshold value. Further, for example, the values of the signal waveforms SW, namely, the detected capacitances can be directly compared with the threshold value.

Note that a phenomenon that the capacitance of the input tool CMD is added to the capacitive element C1 occurs even when the input tool CMD and the detecting electrode Rx have approached each other in addition to the case in which the input tool CMD and the detecting electrode Rs have come into contact with each other. Therefore, it is unnecessary to expose the detecting electrodes Rx to a face on which the input tool CMD is disposed, for example, the detecting electrodes Rx can be protected by disposing a cover member between the detecting electrodes Rx and the input tool CMD.

Furthermore, as the method of monitoring, namely, measuring, the signal waveform, namely the detected capacitance, there are various modification examples, for example, a method of measuring a voltage value generated at the detecting electrode Rx, or a method of measuring an integrated quantity of current per unit time flowing in the detection circuit DT1 can be used.

Regarding respective plane arrangements of the driving electrodes Tx and the detecting electrodes Rx, for example, as shown in FIG. 3, the driving electrodes Tx and the detecting electrodes Rx can be disposed alternately so as to intersect with each other (preferably, be orthogonal to each other) in a band shape. In this case, a driving waveform DW (see FIG. 2) is applied to the plurality of driving electrodes Tx sequentially, and the change amount of the signal waveform SW (see FIG. 2) is determined for each intersection portion at which the driving electrode Tx and the detecting electrode Rx intersect with each other.

Note that the details of the arrangements of the driving electrodes Tx and the detecting electrodes Rx will be described later.

<Configuration of Display Device>

Figure 4:
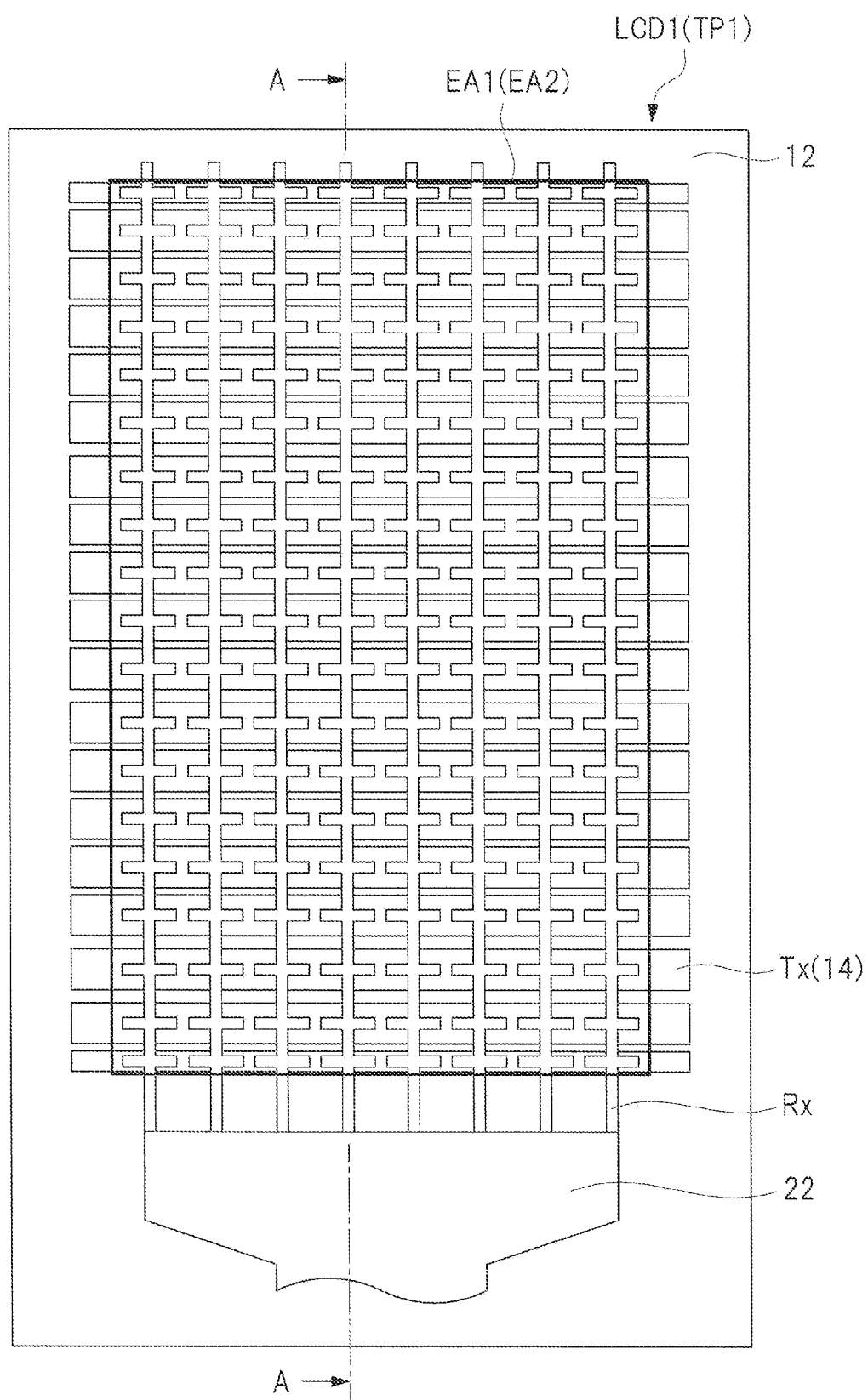
FIG. 4 is a plan view showing a configuration of one example of a display device of a first embodiment.
Figure 5:
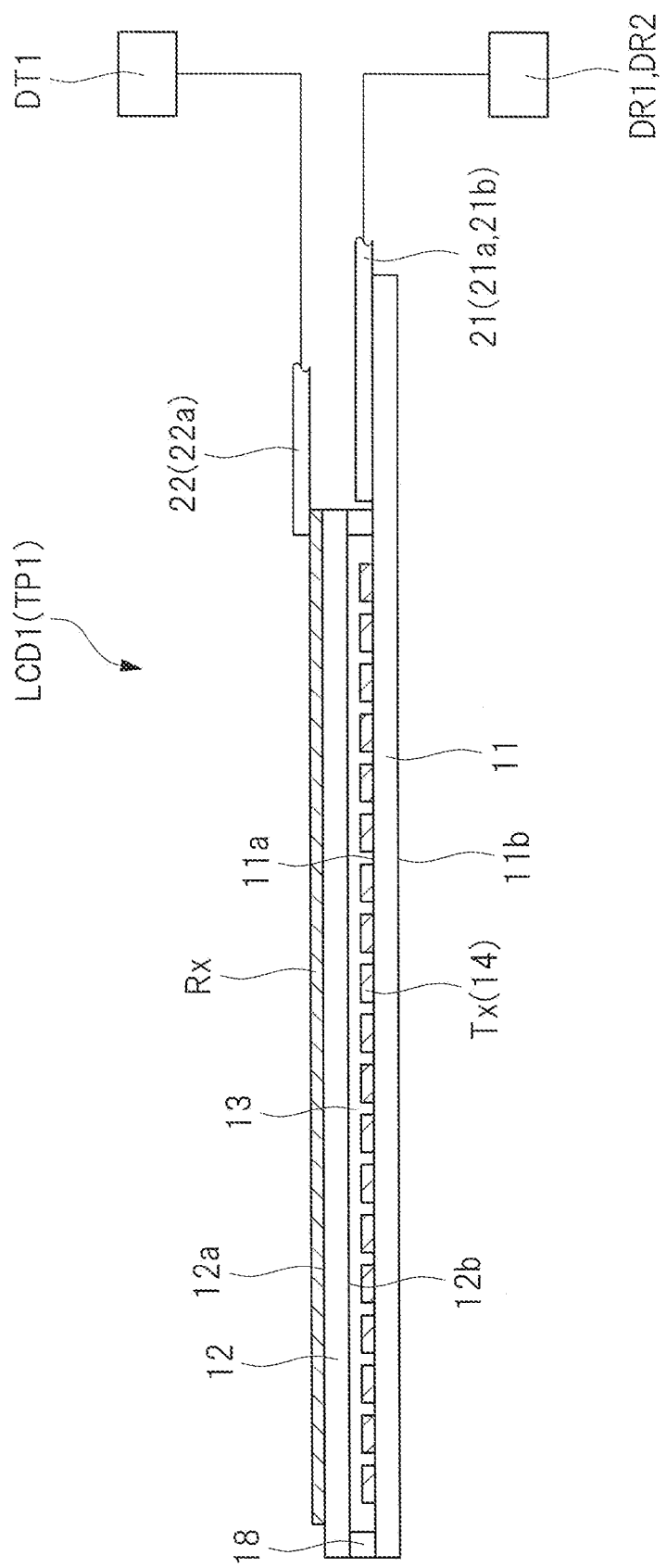
FIG. 5 is a cross-sectional view showing a configuration of one example of the display device of the first embodiment.
Figure 6:
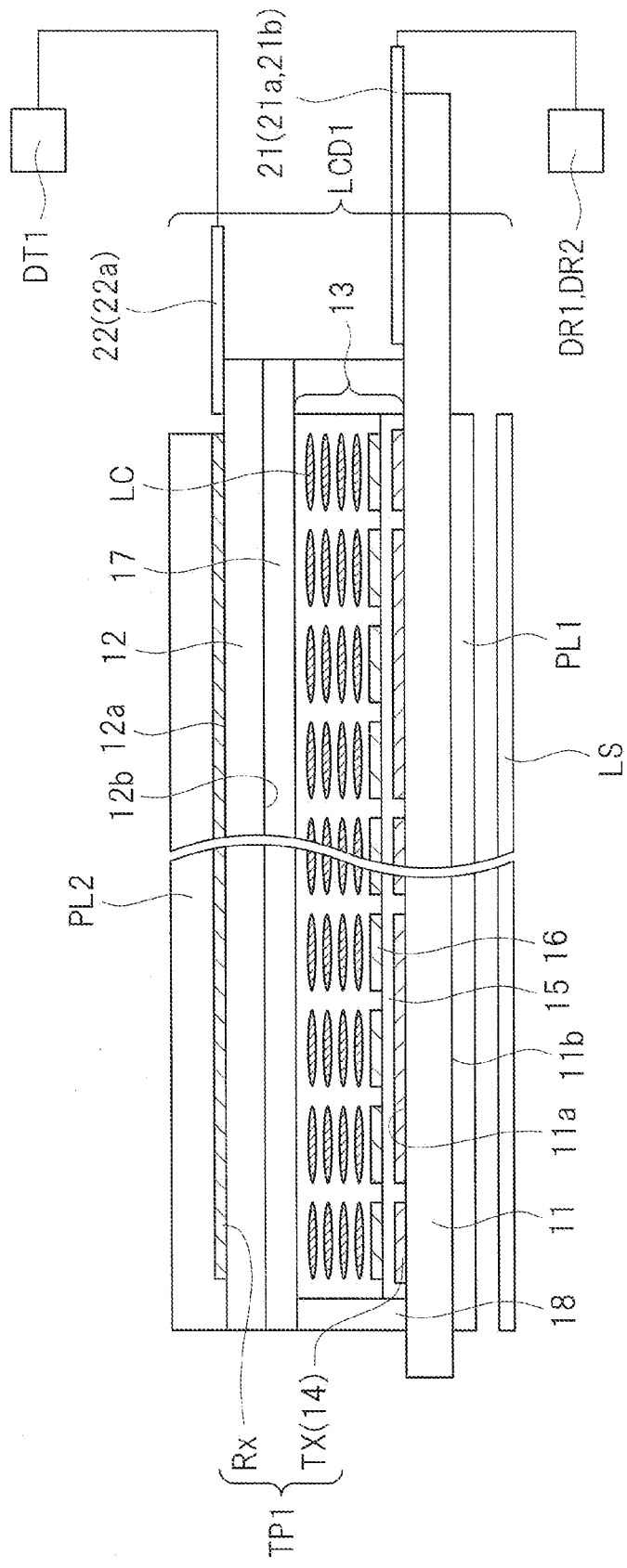
FIG. 6 is a cross-sectional view showing a configuration of one example of the display device of the first embodiment.

Next, a configuration of a display device of a first embodiment will be described. FIG. 4 is a plan view showing a configuration of one example of the display device of the first embodiment. FIG. 5 and FIG. 6 are cross-sectional views showing a configuration of one example of the display device of the first embodiment. FIG. 5 is a cross-sectional view taken along the line A-A in FIG. 4. Further, FIG. 6 schematically shows a cross-sectional view of a main part shown in FIG. 5 in a further enlarged fashion.

A display device LCD1 of the first embodiment is a display device with a touch-detecting function. Further, the display device LCD1 of the first embodiment is a display device with a touch-detecting function of a so-called "in-cell type" where a liquid crystal display device provided with liquid crystal elements as display elements and an input device composed of a touch panel TP1 of a capacitance type have been integrated with each other.

In the liquid crystal display device, as a system of applying electric field in order to change orientations of liquid crystal molecules in a liquid crystal layer functioning as a display image forming section described later, two systems described below are mainly used. As a first system, a so-called vertical-electric-field mode in which electric field is applied in a thickness direction of a liquid crystal display device, namely, in an off-plane direction is used. Further, as a second system, a so-called horizontal-electric-field mode where electric field is applied in a plane direction of a liquid crystal display device, namely, in an in-plane direction is used. As the horizontal-electric-field mode, for example, an IPS (In-Plane Switching) mode, an FFS (Fringe Field Switching) mode, or the like is used. In the following, as one example, the display device LCD1 of an in-cell type in which a liquid crystal display device of the FFS mode and an input device composed of a touch panel TP1 are integrated with each other will be described.

As shown in FIG. 4 and FIG. 5, the display device LCD1 includes a substrate 11, a substrate 12 arranged to face the substrate 11, and a liquid crystal layer 13 arranged between the substrate 11 and the substrate 12. The substrate 12 is disposed on a display surface side of the display device LCD1, while the substrate 11 is disposed on the side opposite to the display surface side.

As shown in FIG. 6, the substrate 11 has a front surface 11a positioned on the substrate 12 side, and a rear surface 11 positioned on the opposite side of the front surface 11a. The substrate 11 is used as a circuit board in which various electrodes and wirings, thin-film transistors (TFTs), and the like are formed. The substrate is made of glass, for example.

A common electrode 14 is disposed on the substrate 11, namely, on the front surface 11a side of the substrate 11 for each of a plurality of pixels. The common electrode 14 is an electrode for supplying a common voltage to each plurality of pixels, and it is composed of a transparent conductive film having translucency, namely, a transparent conductive film, for example, ITO (Indium Tin Oxide) or the like. The term "having translucency" or "transparent" means that the transmittance of light within a visible light range having, for example, a wavelength of 550 nm is, for example, 80% or higher.

As shown in FIG. 4, the common electrodes 14 are arranged side by side so as to extend in one direction within an area where the display device LCD1 performs displaying, namely, a display area EA1 which is an area where a plurality of pixels are arranged in a matrix fashion. Here, the common electrodes 14 are disposed within the display area EA1 in a section perpendicular to an extension direction (X-axis direction described later with reference to FIG. 7) of the common electrodes 14. On the other hand, as shown in FIG. 4, the common electrodes 14 may be formed such that both ends thereof extend outside the display area EA1. Note that, details of the shape of the common electrode 14 will be described later.

An insulating film 15 is formed on the common electrodes 14. Further, pixel electrodes 16 are disposed on the insulating film 15 corresponding to a plurality of pixels disposed within the display area EA1, respectively. The pixel electrodes 16 are arranged in a matrix fashion or in an array fashion corresponding to the plurality of pixels, respectively, and they face the common electrodes 14 via the insulating film 15. That is, the common electrodes 14 and the pixel electrodes 16 are arranged so as to face each other via the insulating film 15. The pixel electrode 16 is an electrode for supplying a voltage as a pixel signal for performing display for each pixel, and it is composed of a transparent conductive film having translucency, namely, a transparent conductive film, for example, ITO or the like.

Although not illustrated, an active element such as a TFT is formed on the substrate 11, namely, on the front surface 11a side of the substrate 11 corresponding to each pixel. Further, a display driver for driving the pixel electrodes 16 and source lines for supplying pixel signals to the pixel electrodes 16, wirings for such as gate lines for driving TFTs are formed on the substrate 11, namely, the front surface 11a side of the substrate 11. According to such a configuration, a voltage is applied to each pixel electrode 16 for a display period in the display device LCD1.

The substrate 12 has a front surface 12a positioned on the display surface side and a rear surface 12b positioned on the opposite side of the front surface 12a, and the rear surface 12b of the substrate 12 faces the front surface 11a of the substrate 11. Note that, since the above-described common electrodes 14 and pixel electrodes 16 are formed on the rear surface 12b side of the substrate 12, the common electrodes 14 and pixel electrodes 16 are arranged between the substrate 11 and the substrate 12.

A color filter 17 is formed on the rear surface 12b of the substrate 12. The color filter 17 is constituted by arranging three color filter layers of, for example, red (R), green (G), and blue (B) periodically. In a color display device, one picture element or one pixel is constituted by utilizing sub-pixels of three colors of, for example, the red (R), green (G), and blue (B) as one set.

The liquid crystal layer 13 is provided between the substrate 11 and the substrate 12. The liquid crystal layer 13 functions as a display image forming section which forms a display image by application of voltages for display between the pixel electrodes 16 and the common electrode 14. The liquid crystal layer 13 is constituted to modulate light passing through the liquid crystal layer 13 in response to a state of electric field applied, and in the first embodiment, as described above, a liquid crystal LC corresponding to the FFS mode can be used. Note that, although not illustrated, oriented films are disposed between the liquid crystal layer 13 and the substrate 11 and between the liquid crystal layer 13 and the substrate 12, respectively. The liquid crystal layer 13 is sealed between the substrate 11 and the substrate 12 by a seal 18.

A light source LS and a polarization plate PL1 for filtering light which has been generated from the light source LS are provided on the rear surface 11b side of the substrate 11 in the display device LCD1. On the other hand, a polarization plate PL2 for filtering light which has passed through the substrate 12 is provided on the front surface 12a side of the substrate 12.

A wiring board 21 is formed on the front surface 11a of the substrate 11. The wiring board 21 is, for example, a so-called flexible wiring board where a plurality of wirings is formed in a resin film, which can be freely deformed in response to the shape of an arrangement place of the flexible wiring board. Wirings 21a are formed in the wiring board 21. One end of the wiring 21a is electrically connected to a plurality of pixel electrodes 16, and the other end of the wiring 21a is electrically connected to a driving circuit DR2. The driving circuit DR2 supplies a driving potential for image display to the pixel electrode 16.

A displaying method of a color image performed by the display device LCD1 shown in FIG. 4 to FIG. 6 is, for example, as described below. That is, light emitted from the light source LS is filtered by the polarization plate PL1 to pass through the polarization plate PL1 to enter the liquid crystal layer 13. The light which has entered the liquid crystal 13 is propagated in the liquid crystal layer 13 in a direction from the substrate 11 toward the substrate 12 to be emitted from the substrate 12 while a polarization state thereof is changed in response to anisotropy of the refractive index of the liquid crystal LC. Here, a liquid crystal orientation is controlled by electric field formed by application of voltages to the pixel electrodes 16 and the common electrodes 14, and the liquid crystal layer 13 functions as an optical shutter. That is, in the liquid crystal layer 13, the transmittance of light can be controlled for each sub-pixel. Light which has reached the substrate 12 is subjected to a color filtering processing in the color filter 17 formed on the substrate 12 to be emitted from the front surface 12a. Further, light which has been emitted from the front surface 12a is filtered by the polarization plate PL2 to reach a viewer VW.

<Configuration of Touch Panel>

Subsequently, a configuration of the touch panel TP1 serving as the input device and provided in the display device LCD1 will be described with reference to FIG. 4 to FIG. 6.

As described with reference to FIG. 1, the touch panel TP1 serving as the input device has a plurality of driving electrodes Tx and a plurality of detecting electrodes Rx. Further, the display device LCD1 is a liquid crystal display device of an in-cell type. Therefore, the common electrodes 14 of the display device LCD1 are used as the driving electrodes Tx of the touch panel TP1.

As described with reference to FIG. 4, the common electrodes 14 are arranged within the display area EA1 which is an area on which the display device LCD1 performs displaying, but since the common electrodes 14 are also used as the driving electrodes Tx, they are also disposed within a detection area EA2 which is an area where the touch panel TP1 detects an input position. That is, as shown in FIG. 4, the common electrodes 14 serving as the driving electrodes Tx are arranged side by side within the detection area EA1 so as to extend in one direction. Here, the common electrodes 14 serving as the driving electrodes Tx are disposed within the detection area EA2 in a section perpendicular to the extension direction (X-axis direction described with reference to FIG. 7) of the common electrodes 14. On the other hand, as shown in FIG. 4, the common electrodes 14 serving as the driving electrodes Tx may be formed such that both ends thereof extend outside the detection area EA2.

Further, since the display device LCD1 is the liquid crystal display device of an in-cell type, the detection area EA2 which is the area where the touch panel detects a position coincides with the display area EA1 which is the area where the display device performs displaying. As described later in a fourth embodiment, however, when the display device is a display device of an on-cell type, the detection area EA2 which is the area where the touch panel detects a position may not coincide with the display area EA1 which is the area where the display device performs displaying.

Further, details of the shape of the common electrode 14, namely, the driving electrode Tx in a plan view will be described later.

A plurality of detecting electrodes Rx is formed on the front surface 12a of the substrate 12. The plurality of detecting electrodes Rx are each composed of a transparent conductive film having translucency, namely, a transparent conductive film, for example, ITO (Indium Tin Oxide) or the like. Note that details of the shape of the detecting electrode Rx in a plan view will be described later.

As described above, the wiring board 21 is formed on the front surface 11a of the substrate 11. Wirings 21b are formed in the wiring board 21. One end of the wiring 21b is electrically connected to each of the plurality of common electrodes 14, while the other end of the wiring 21b is electrically connected to the driving circuit DR1. The driving circuit DR1 applies the driving waveform DW for input position detection described with reference to FIG. 2 to the common electrodes 14 serving as the driving electrodes Tx.

For example, doubling of the common electrodes 14 and the driving electrodes Tx is made possible by dividing a certain period into a touch detection period, namely, an input period and a display writing period. A whole thickness of the display device LCD1 can be made thin by doubling of the common electrodes 14 of the display device LCD1 and the driving electrodes Tx of the touch panel TP1.

A wiring board 22 is formed on the front surface 12a of the substrate 12. The wiring board 22 is, for example, a so-called flexible wiring board in which a plurality of wirings are formed in a resin film and the flexible wiring board can be freely deformed in accordance with the shape of an arrangement place of the flexible wiring board. Wirings 22a are formed in the wiring board 22. One end of the wiring 22a is electrically connected to each of the plurality of detecting electrodes Rx, while the other end of the wiring 22a is electrically connected to the detection circuit DT1. The detection circuit DT1 detects an input position based upon a detection signal.

Note that, for example, since a light shielding layer is formed in an area outside the display area EA1, namely, the detection area EA2, the detecting electrodes Rx and the wiring boards 21 and 22 cannot be viewed.

<Arrangement of Driving Electrodes and Detecting Electrodes>

Figure 7:
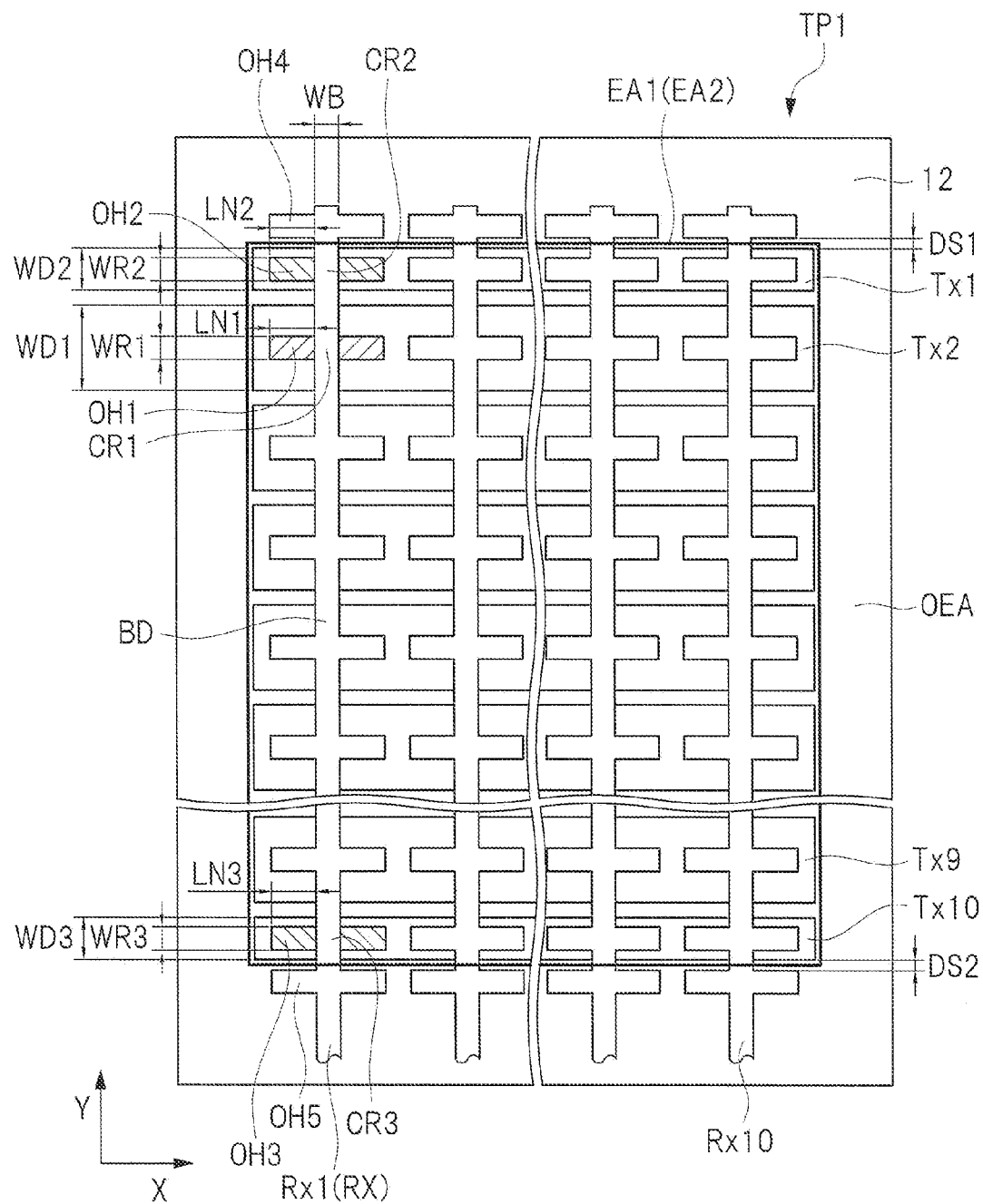
FIG. 7 is a plan view schematically showing an arrangement of driving electrodes and detecting electrodes in a touch panel provided in the display device of the first embodiment.

FIG. 7 is a plan view schematically showing an arrangement of driving electrodes and detecting electrodes in a touch panel provided in the display device of the first embodiment.

As shown in FIG. 7, two directions intersecting with each other in a plan view are defined as an X-axis direction and a Y-axis direction. Further, as shown in FIG. 7, the X-axis direction and the Y-axis direction are preferably orthogonal to each other. Note that, in this specification, the term "plan view" means a view from a direction perpendicular to the front surface 12a (see FIG. 6) of the substrate 12.

In the following explanation, for easy understanding, as one example, it is assumed that the number of driving electrodes Tx is 10 and the number of detecting electrodes Rx is 10. However, the number of driving electrodes Tx is not limited to 10, and the number of detecting electrodes Rx is not limited to 10. Therefore, the number of driving electrodes Tx can be set to M (M is an integer equal to 3 or more) while the number of detecting electrodes Rx can be set to N (N is an integer equal to 2 or more) (the same goes to modification examples of the first embodiment, a second embodiment and a third embodiment, and modification examples thereof).

As shown in FIG. 7, as one example of the plurality of driving electrodes Tx, for example, it is assumed that ten driving electrodes Tx indicated by Tx1, Tx2, . . . , Tx9, Tx10 are provided in the touch panel TP1. Further, as shown in FIG. 7, as one example of the plurality of detecting electrodes Rx, it is assumed that ten detecting electrodes Rx indicated by Rx1, Rx2, . . . , Rx10 are provided in the touch panel TP1.

In a plan view, the driving electrodes Tx1 to Tx10 extend in the X-axis direction, respectively, and they are arranged in the Y-axis direction. That is, the driving electrodes Tx1 to Tx10 each extend in the X-axis direction, and these driving electrodes Tx1 to Tx10 are spaced from one another and arranged in the Y-axis direction in the order to Tx1, Tx2, . . . , Tx9, Tx10. On the other hand, in a plan view, the detecting electrodes Rx1 to Rx10 extend in the Y-axis direction, respectively, and they are arranged in the X-axis direction. That is, the detecting electrodes Rx1 to Rx10 each extend in the Y-axis direction, and these detecting electrodes Rx1 to Rx10 are spaced from one another and arranged in the X-axis direction in the order of Rx1, . . . , Rx10. The detecting electrodes Rx1 to Rx10 each intersect with the driving electrodes Tx1 to Tx10 in a plan view.

In a plan view, the respective widths of the driving electrodes Tx2 to Tx9 in the Y-axis direction are represented by WD1, the width of the driving electrode Tx1 in the Y-axis direction is represented by WD2, and the width of the driving electrode Tx10 in the Y-axis direction is represented by WD3. Here, the respective widths WD1 of the driving electrodes Tx2 to Tx9 are equal to one another, the width WD2 of the driving electrode Tx1 is smaller than the respective widths WD1 of the driving electrodes Tx2 to Tx9, and the width WD3 of the driving electrode Tx10 is larger than the respective widths WD1 of the driving electrodes Tx2 to Tx9.

Further, the driving electrode Tx1 is arranged outside one side of an arrangement of the plurality of driving electrodes Tx2 to Tx9 in a plan view, while the driving electrode Tx10 is arranged outside the other side of the arrangement of the plurality of driving electrodes Tx2 to Tx9 in the plan view.

Note that, although not illustrated in FIG. 7, the pixel electrodes 16 (see FIG. 6) are arranged in the X-axis direction and in the Y-axis direction corresponding to the plurality of pixels, respectively, to be disposed in matrix.

As described with reference to FIG. 6, the common electrodes 14 have a function to serve as the driving electrodes Tx of the touch panel TP1 and a function to serve as the common electrodes 14 of the display device LCD1. Further, since it is necessary to control a voltage applied between the pixel electrodes 16 and the common electrodes 14 of the display device LCD1 for each pixel, it is undesirable that two common electrodes adjacent to each other overlap with one pixel electrode in a plan view. Therefore, the respective widths WD1 of the driving electrodes Tx2 to Tx9 is an integral multiple (an integral multiple of double or higher) of the arrangement period or the width of the pixel electrodes in the Y-axis direction, and the integral number is the number of pixels per one driving electrode Tx. That is, each of the driving electrodes Tx2 to Tx9 has a width to overlap with the plurality of pixel electrodes arranged in the Y-axis direction in a plan view.

However, the number of pixel electrodes, namely, the number of pixels, in the Y-direction is determined according to the specification required as the display device. Therefore, such a case sometimes occurs that the number of pixels in the Y-axis direction cannot be evenly divided by the number of pixels per one driving electrodes Tx. In such a case, a broken number due to the indivisibility is allocated to the driving electrodes Tx on both sides of the arrangement of the driving electrodes Tx in a divisional fashion, and the widths obtained by multiplying the respective allocated broken numbers by the arrangement period or the width of the pixel electrodes in the Y-axis direction are set as the widths WD2 and WD3 of the driving electrodes Tx1 and Tx10, respectively. Thus, the widths WD2 and WD3 of the driving electrodes Tx1 and Tx10 become smaller than the respective widths WD1 of the driving electrodes Tx2 to Tx9.

For example, such a case is considered that 89 pixels are arranged in the Y-axis direction and one driving electrode Tx is arranged for each ten pixels. In this case, 9 pixels of a reminder occurring when 89 pixels are divided into each 10 pixels are divided into 4 pixels and 5 pixels, and the 4 pixels and the 5 pixels are allocated to the driving electrodes on both ends of the arrangement of the driving electrodes Tx. Therefore, for example, the respective widths WD1 of the driving electrodes Tx2 to Tx9 can be made equal to the width corresponding to 10 pixels, the width WD2 of the driving electrode Tx1 can be made equal to the width corresponding to 4 pixels, and the width WD3 of the driving electrode Tx10 can be made equal to the width corresponding to 5 pixels.

Since the detecting electrodes Rx1 to Rx10 can be set to have the same shape, representing the detecting electrodes Rx1 to Rx10, the detecting electrode Rx1 is explained as the detecting electrode Rx (the same goes to modification examples of the first embodiment, a second embodiment and a third embodiment, and modification examples of the second and third embodiment).

An intersection portion between each of the driving electrodes Tx2 to Tx9 and the detecting electrode Rx is represented as CR1, an intersection portion between the driving electrode Tx1 and the driving electrode Tx is represented as CR2, and an intersection portion between the driving electrode Tx10 and the driving electrode Tx is represented as CR3. Further, an electrostatic capacitance between each of the driving electrodes Tx2 to Tx9 and the detecting electrode Rx is represented as CP1, an electrostatic capacitance between the driving electrode Tx1 and the detecting electrode Rx is represented as CP2, and an electrostatic capacitance between the driving electrode Tx10 and the detecting electrode Rx is represented as CP3. Here, an input position is detected based upon the electrostatic capacitances CP1, CP2, and CP3.

The detecting electrode Rx includes a main body portion BD, and a plurality of overhang portions OH1 and overhang portions OH2 to OH5. The main body portion BD extends in the Y-axis direction, and the width of the main body portion BD in the X-axis direction is represented as WB. Note that, in FIG. 7, the overhang portions OH1 formed in the area provided with the driving electrode Tx2 and the overhang portions OH2 and OH3 are hatched.

Further, in the following, the case in which the overhang portions OH1 to OH5 have a rectangular shape is described as an example, but the overhang portions OH1 to OH5 may have a triangular shape, a semi-circular shape, or the other various shapes (the same goes to modification examples of the first embodiment, a second embodiment and a third embodiment, and modification examples thereof).

In a plan view, the plurality of overhang portions OH1 are formed inside the areas provided with the driving electrodes Tx2 to Tx9, namely, inside the plurality of intersection portions CR1 to project in a positive direction and in a negative direction of the X-axis direction, respectively. The overhang portion OH1 is an expanding portion for expanding the area of the detecting electrode Rx as compared with the case in which the overhang portion OH1 is not formed. Further, the areas of the plurality of overhang portions OH1 are preferably equal to one another. Therefore, since the shapes of the overhang portions OH1 have a periodicity to be inconspicuous, visibility of the display device LCD1 can be improved, and the electrostatic capacitances between the driving electrodes Tx2 to Tx9 and the detecting electrode Rx can be made equal to one another, respectively.

Note that, the positive direction and the negative direction of the X-axis direction are directions opposed to each other along the X-axis direction, the positive direction of the X-axis direction is a direction from the detecting electrode Rx1 toward the detecting electrode Rx10, and the negative direction of the X-axis direction is a direction from the detecting electrode Rx10 toward the detecting electrode Rx1.

In a plan view, the overhang portions OH2 are formed inside the area provided with the driving electrode Tx1, namely inside the intersection portion CR2 to project from the main body portion BD in the positive direction and the negative direction of the X-axis direction, respectively. The overhang portion OH2 is an expanding portion for expanding the area of the detecting electrode Rx as compared with the case in which the overhang portion OH2 is not formed. Further, the area of the overhang portion OH2 is preferably equal to the area of the overhang portion OH1. Therefore, since the shape of the overhang portion OH2 can be made identical to the shape of the overhang portion OH1 so that the overhang portion OH2 becomes inconspicuous, visibility of the display device LCD1 can be improved.

In a plan view, the overhang portions OH3 are formed inside the area provided with the driving electrode Tx10, namely inside the intersection portion CR3 to project from the main body portion BD in the positive direction and the negative direction of the X-axis direction, respectively. The overhang portion OH3 is an expanding portion for expanding the area of the detecting electrode Rx as compared with the case in which the overhang portion OH3 is not formed. Further, the area of the overhang portion OH3 is preferably equal to the area of the overhang portion OH1. Therefore, since the shape of the overhang portion OH3 can be made equal to the shape of the overhang portion OH1 so that the overhang portion OH3 becomes inconspicuous, visibility of the display device LCD1 can be improved.

In a plan view, the overhang portions OH4 are formed on the side opposite to the plurality of driving electrodes Tx2 to Tx9 via the driving electrode Tx1, namely on the positive direction side of the Y-axis direction to the driving electrode Tx1, to project from the main body portion BD in the positive direction and the negative direction of the X-axis direction, respectively. The overhang portion OH4 is an expanding portion for expanding the area of the detecting electrode Rx as compared with the case in which the overhang portion OH4 is not formed.

In a plan view, the overhang portions OH5 are formed on the side opposite to the plurality of driving electrodes Tx2 to Tx9 via the driving electrode Tx10, namely on the negative direction side of the Y-axis direction to the driving electrode Tx10, to project from the main body portion BD in the positive direction and the negative direction of the X-axis direction, respectively. The overhang portion OH5 is an expanding portion for expanding the area of the detecting electrode Rx as compared with the case in which the overhang portion OH5 is not formed.

Note that, the positive direction and the negative direction of the Y-axis direction are opposite directions to each other along the Y-axis direction, the positive direction of the Y-axis direction is a direction from the driving electrode Tx10 toward the driving electrode Tx1, and the negative direction of the Y-axis direction is a direction from the driving electrode Tx1 toward the driving electrode Tx10.

The length of the overhang portion OH1 in the X-axis direction is represented as LN1, and the width of the overhang portion OH1 in the Y-axis direction is represented as WR1. Further, the length of the overhang portion OH2 in the X-axis direction is represented as LN2, and the width of the overhang portion OH2 in the Y-axis direction is represented a WR2. Further, the length of the overhang portion OH3 in the X-axis direction is represented as LN3, and the width of the overhang portion OH3 in the Y-axis direction is represented as WR3.

In the first embodiment, for example, it is assumed that the length LN1 of the overhang portion OH1, the length LN2 of the overhang portion OH2, and the length LN3 of the overhang portion OH3 are equal to one another. Furthermore, for example, it is assumed that the width WR1 of the overhang portion OH1, the width WR2 of the overhang portion OH2, and the width WR3 of the overhang portion OH3 are equal to one another. Here, an area SO2 of the overhang portion OH2 which is a product of the length LN2 and the width WN2 becomes equal to an area SO1 of the overhang portion OH1 which is a product of the length LN1 and the width WR1. An area SO3 of the overhang portion OH3 which is a product of the length LN3 and the width WR3 becomes equal to the area SO1 of the overhang portion OH1 which is the product of the length LN1 and the width WR1.

Further, an area SB1 of a portion of the main body portion BD overlapping with each of the driving electrodes Tx2 to Tx9 is represented by the product of the width WB and the width WD1. An area SB2 of a portion of the main body portion BD overlapping with the driving electrode Tx1 is represented by the product of the width WB and the width WD2, and an area SB3 of a portion of the main body portion BD overlapping with the driving electrode Tx10 is represented as the product of the width WB and the width WD3. Therefore, an area S1 of a portion of the detecting electrode Rx overlapping with each of the driving electrodes Tx2 to Tx9 is represented by the following equation (1)

$$S1 = SB1 + SO1 \times 2 = WB \times WD1 + LN1 \times WR1 \times 2 \qquad \text{Equation (1)}$$

Further, an area S2 of a portion of the detecting electrode Rx overlapping with the driving electrode Tx1 is represented by the following Equation (2).

$$S2 = SB2 + SO2 \times 2 = WB \times WD2 + LN2 \times WR2 \times 2 \qquad \text{Equation (2)}$$

Further, an area S3 of a portion of the detecting electrode Rx overlapping with the driving electrode Tx10 is represented by the following Equation (3).

$$S3 = SB3 + SO3 \times 2 = WB \times WD3 + LN3 \times WR3 \times 2 \qquad \text{Equation (3)}$$

As described above, since the width WD2 is smaller than the width WD1, and the width WD2 is smaller than the width WD1, the area SB2 is smaller than the area SB1 and the area SB3 is smaller than the area SB1. Further, as described above, the area SO2 is equal to the area SO1, and the area SO3 is equal to the area SO1. Therefore, according to the above-described Equation (1) and Equation (2), the area S2 becomes smaller than the area S1, and the electrostatic capacitance CP2 between the driving electrode Tx1 and the detecting electrode Rx becomes smaller than the electrostatic capacitance CP1 between each of the driving electrodes Tx2 to Tx9 and the detecting electrode Rx. Further, according to the above-described Equation (1) and Equation (3), the area S3 becomes smaller than the area S1, and the electrostatic capacitance CP3 between the driving electrode Tx10 and the detecting electrode Rx becomes smaller than the electrostatic capacitance CP1 between each of the driving electrodes Tx2 to Tx9 and the detecting electrode Rx.

In the first embodiment, however, the overhang portions OH4 have been formed. Further, although the overhang portions OH4 do not overlap with the driving electrode Tx1 in a plan view, they may be disposed in the vicinity of the driving electrode Tx1. Therefore, by forming the overhang portions OH4, the electrostatic capacitance CP2 between the driving electrode Tx1 and the detecting electrode Rx can be increased and adjustment can be performed such that the electrostatic capacitance CP2 approaches the electrostatic capacitance CP1 between each of the driving electrodes Tx2 to Tx9 and the detecting electrode Rx.

Further, in the first embodiment, the overhang portions OH5 have been formed. Further, though the overhang portions OH5 do not overlap with the driving electrode Tx10 in a plan view, they may be disposed in the vicinity of the driving electrode Tx10. Therefore, by forming the overhang portions OH5, the electrostatic capacitance CP3 between the driving electrode Tx10 and the detecting electrode Rx can be increased and adjustment can be performed such that the electrostatic capacitance CP3 approaches the electrostatic capacitance CP1 between each of the driving electrodes Tx2 to Tx9 and the detecting electrode Rx.

That is, when driving electrodes having a width smaller than the widths of the other driving electrodes are disposed on both sides of the arrangement of the other driving electrodes, adjustment can be performed such that the electrostatic capacitance between the driving electrode having the smaller width and the detecting electrode approaches the electrostatic capacitance between each of the other driving electrodes and the detecting electrode.

Note that, the expression "the electrostatic capacitance CP2 approaches the electrostatic capacitance CP1" means that the ratio of the electrostatic capacitance CP2 to the electrostatic capacitance CP1 approaches 1, and it preferably means that the ratio of the electrostatic capacitance CP2 to the electrostatic capacitance CP1 becomes 0.9 to 1.1. Furthermore, the expression "the electrostatic capacitance CP3 approaches the electrostatic capacitance CP1" means that the ratio of the electrostatic capacitance CP3 to the electrostatic capacitance CP1 approaches 1, and it preferably means that the ratio of the electrostatic capacitance CP3 to the electrostatic capacitance CP1 becomes 0.9 to 1.1. That is, the expression "the second electrostatic capacitance approaches the first electrostatic capacitance" means that the ratio of the second electrostatic capacitance to the first electrostatic capacitance approaches 1, and it preferably means that the ratio of the second electrostatic capacitance to the first electrostatic capacitance becomes 0.9 to 1.1 (the same goes to modification examples of the first embodiment, a second embodiment and modification examples thereof, and a third embodiment and modification examples thereof, a fourth embodiment, and a fifth embodiment).

The driving electrodes Tx1 to Tx10 are disposed within the above-described display area EA1 in a section perpendicular to the X-axis direction. Further, the overhang portions OH4 and OH5 are disposed in an area OEA outside the display area EA1 in a plan view. Further, since the display area EA1 is an area formed with pixels, it is not shielded from light, but the area OEA outside the display area EA1 is shielded from light by a light-shielding layer (not shown). Therefore, the overhang portions OH4 and OH5 are shielded from light by a light-shielding layer (not shown). Therefore, since the pattern shapes of the overhang portions OH4 and OH5 are not viewed, visibility of the display device can be improved.

That is, in the first embodiment, in order to adjust the electrostatic capacitance between the driving electrode having a width smaller than the widths of the other driving electrodes and the detecting electrode, the expanding portion for expanding the area of the detecting electrode is provided outside the display area in a plan view.

In a plan view, the overhang portions OH4 can be brought close to the driving electrode Tx1 up to a position where the outer peripheral portions of the overhang portions OH4 come into contact with the driving electrode Tx1, namely, a position where a distance DS1 shown in FIG. 7 becomes 0. Here, the distance DS1 is a distance between an outer periphery of the overhang portion OH4 on the side of the negative direction of the Y-axis direction and an outer periphery of the driving electrode Tx1 on the side of the positive direction of the Y-axis direction. That is, the overhang portions OH4 are preferably formed such that outer peripheries of the overhang portions OH4 on the side of the negative direction of the Y-axis direction come into contact with the outer periphery of the driving electrodes Tx1 on the side of the positive direction of the Y-axis direction in a plan view. Therefore, adjustment can be performed such that the electrostatic capacitance CP2 between the driving electrode Tx1 and the detecting electrode Rx approaches the electrostatic capacitance CP1 between each of the driving electrodes Tx2 to Tx9 and the detecting electrode Rx, while visibility of the display device is improved.

Further, in a plan view, the overhang portions OH5 can be brought close to the driving electrode Tx10 up to a position where the outer peripheral portions of the overhang portions OH5 come in contact with the driving electrode Tx10, namely, a position where a distance DS2 shown in FIG. 7 becomes 0. Here, the distance DS2 is a distance between an outer periphery of the overhang portion OH5 on the side of the positive direction of the Y-axis direction and an outer periphery of the driving electrode Tx10 on the side of the negative direction of the Y-axis direction. That is, the overhang portions OH5 are preferably formed such that outer peripheries of the overhang portions OH5 on the side of the positive direction of the Y-axis direction contact with the outer periphery of the driving electrodes Tx10 on the side of the negative direction of the Y-axis direction in a plan view. Therefore, adjustment can be performed such that the electrostatic capacitance CP3 between the driving electrode Tx10 and the detecting electrode Rx approaches the electrostatic capacitance CP1 between each of the driving electrodes Tx2 to Tx9 and the detecting electrode Rx, while visibility of the display device is improved.

Note that, in FIG. 7, the case that both ends of each of the driving electrodes Tx1 to Tx10 are positioned inside the display area EA1, namely, the detection area EA2 is shown. As shown in FIG. 4, however, the both ends of each of the driving electrodes Tx1 to Tx10 may be positioned outside the display area EA1, namely, the detection area EA2 (the same goes to modification examples of the first embodiment, a second embodiment and a third embodiment, and modification examples of the second and third embodiments).

<First Modification Example of Arrangement of Driving Electrodes and Detection Electrodes>

Figure 8:
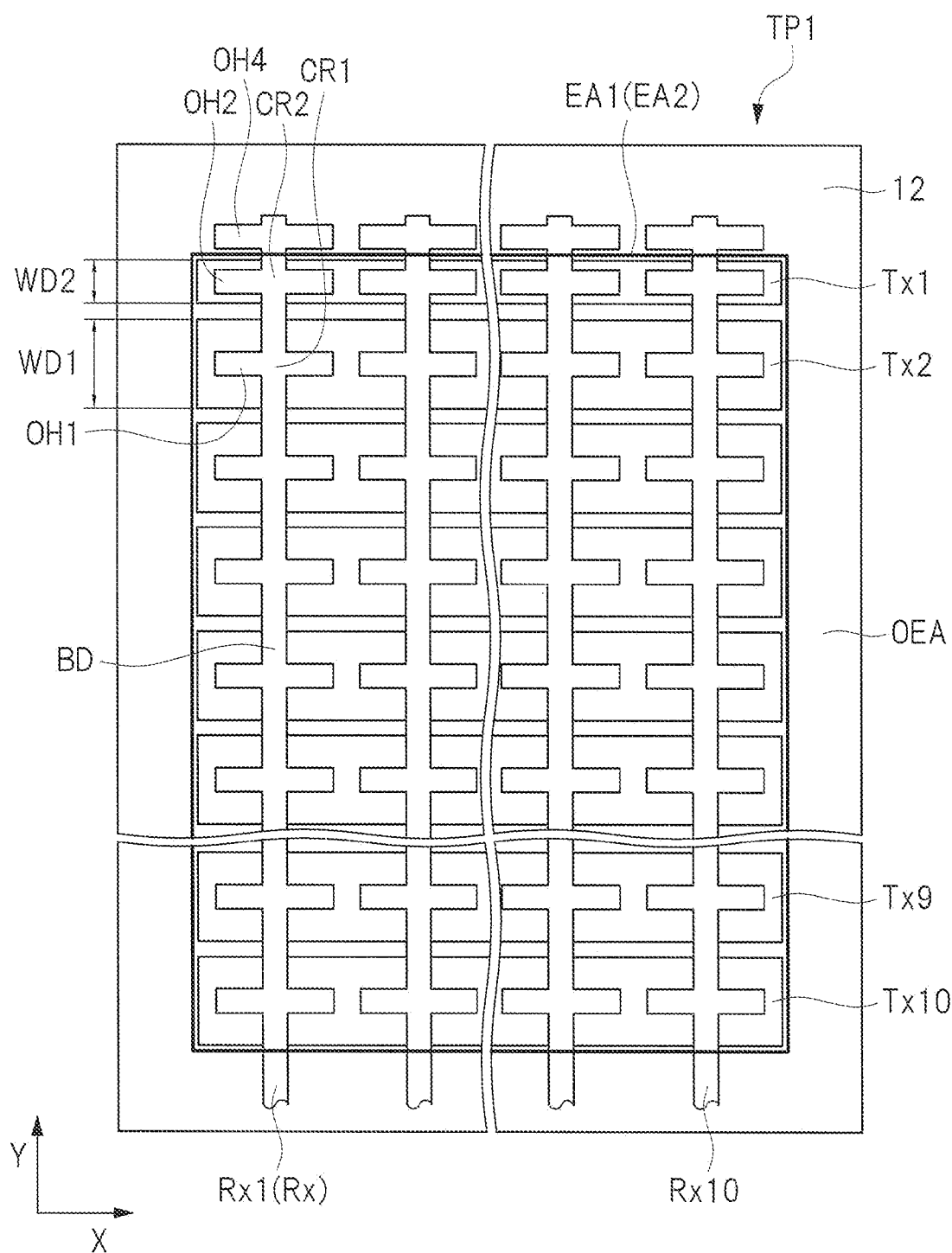
FIG. 8 is a plan view schematically showing a first modification example of the arrangement of driving electrodes and detecting electrodes in a touch panel provided in the display device of the first embodiment.

FIG. 8 is a plan view schematically showing an arrangement of driving electrodes and detecting electrodes in the touch panel provided in the display device of the first embodiment. FIG. 8 shows an example in which the width of the driving electrode Tx1 is smaller than the respective widths of the driving electrodes Tx2 to Tx9 but the width of the driving electrode Tx10 is equal to the respective widths of the driving electrodes Tx2 to Tx9. Note that, members of a touch panel TP1 shown in FIG. 8 which have the same functions as those of the members of the touch panel TP1 shown in FIG. 7 are denoted by the same reference numerals and repetitive descriptions thereof will be omitted.

In the first modification example, the respective widths WD1 of the driving electrodes Tx2 to Tx10 are equal to one another, and the width of the driving electrode WD2 of the driving electrode Tx1 is smaller than the respective widths of the driving electrodes Tx2 to Tx10. Further, the driving electrode Tx1 is arranged outside one side of the arrangement of the plurality of driving electrodes Tx2 to Tx10 in a plan view.

In this modification example, when the number of pixels along the Y-axis direction cannot be evenly divided by the number of pixels per one driving electrode Tx, a broken number which has occurred due to the indivisibility is allocated to one end of the arrangement of the driving electrodes Tx, and the width obtained by multiplying the allocated broken number by the arrangement period or the width of the pixel electrodes is set as the width WD2 of the driving electrode Tx1.

An intersection portion between each of the driving electrodes Tx2 to Tx10 and the detecting electrode Rx is represented as CR1, and an intersection portion between the driving electrode Tx1 and the detecting electrode Rx is represented as CR2. Further, an electrostatic capacitance between each of the driving electrodes Tx2 to Tx10 and the detecting electrode Rx is represented as CP1, and an electrostatic capacitance between the driving electrode Tx1 and the detecting electrode Rx is represented as CP2. Here, an input position is detected based upon the electrostatic capacitances CP1 and CP2.

The detecting electrode Rx includes the main body portion BD, the plurality of overhang portions OH1, and the overhang portions OH2 and OH4, but it does not include the overhang portions OH3 and OH5 (see FIG. 7).

In a plan view, the plurality of overhang portions OH1 are formed inside the areas provided with the driving electrodes Tx2 to Tx10, respectively, namely, inside the plurality of intersection potions CR1 so as to project from the main body portion BD in the positive direction and in the negative direction of the X-axis direction, respectively. The overhang portion OH1 is an expanding portion for expanding the area of the detecting electrode Rx as compared with the case in which the overhang portion OH1 is not formed. Further, the areas of the respective overhang portions OH1 of the plurality of driving electrodes Tx2 to Tx10 are preferably equal to one another. Therefore, since the shapes of the overhang portions OH1 have a periodicity to be inconspicuous, visibility of the display device LCD1 can be improved, and the electrostatic capacitances between the driving electrodes Tx2 to Tx10 and the detecting electrode Rx can be made equal to each other, respectively.

The overhang portion OH2 in the first modification example may be made equal to the overhang portion OH2 in the first embodiment. Further, the overhang portion OH4 in the first modification example may be made equal to the overhang portion OH4 in the first embodiment.

In the first modification example, the electrostatic capacitance between the driving electrode Tx1 and the detecting electrode Rx can be increased by forming the overhang portions OH4 in the same manner as the first embodiment. Therefore, adjustment can be performed such that the electrostatic capacitance between the driving electrode Tx1 and the detecting electrode Rx approaches the electrostatic capacitance between each of the other driving electrodes Tx2 to Tx10 and the detecting electrode Rx.

That is, even when the driving electrode having a width smaller than the widths of the other driving electrodes is disposed only outside one side of the arrangement of the other driving electrodes, adjustment can be performed such that the electrostatic capacitance between the driving electrode having the smaller width and the detecting electrode approaches the electrostatic capacitance between each of the other driving electrodes and the detecting electrode.

<Second Modification Example and Third Modification Example of Arrangement of Driving Electrodes and Detecting Electrode>

Figure 9:
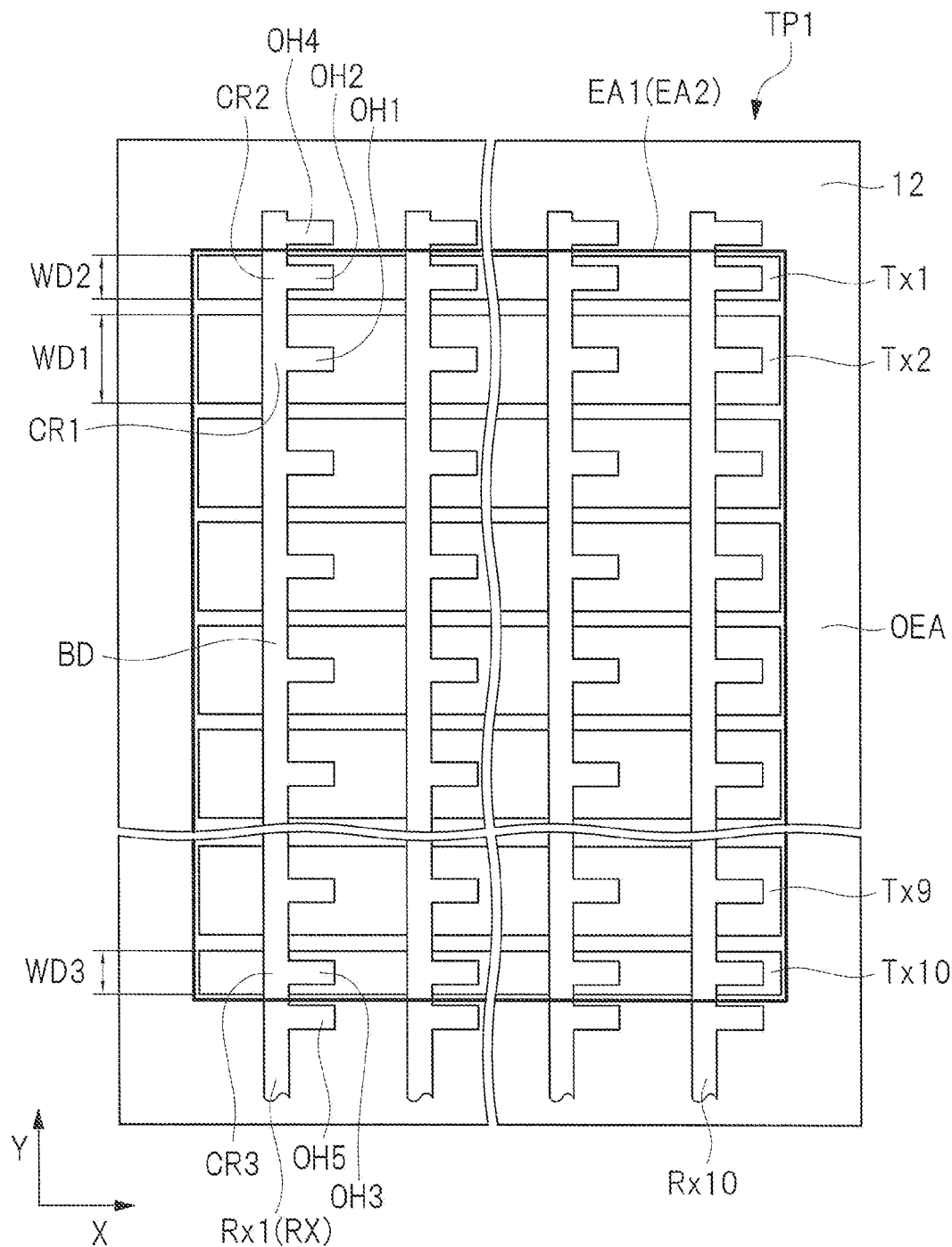
FIG. 9 is a plan view schematically showing a second modification example of the arrangement of driving electrodes and detecting electrodes in a touch panel provided in the display device of the first embodiment.
Figure 10:
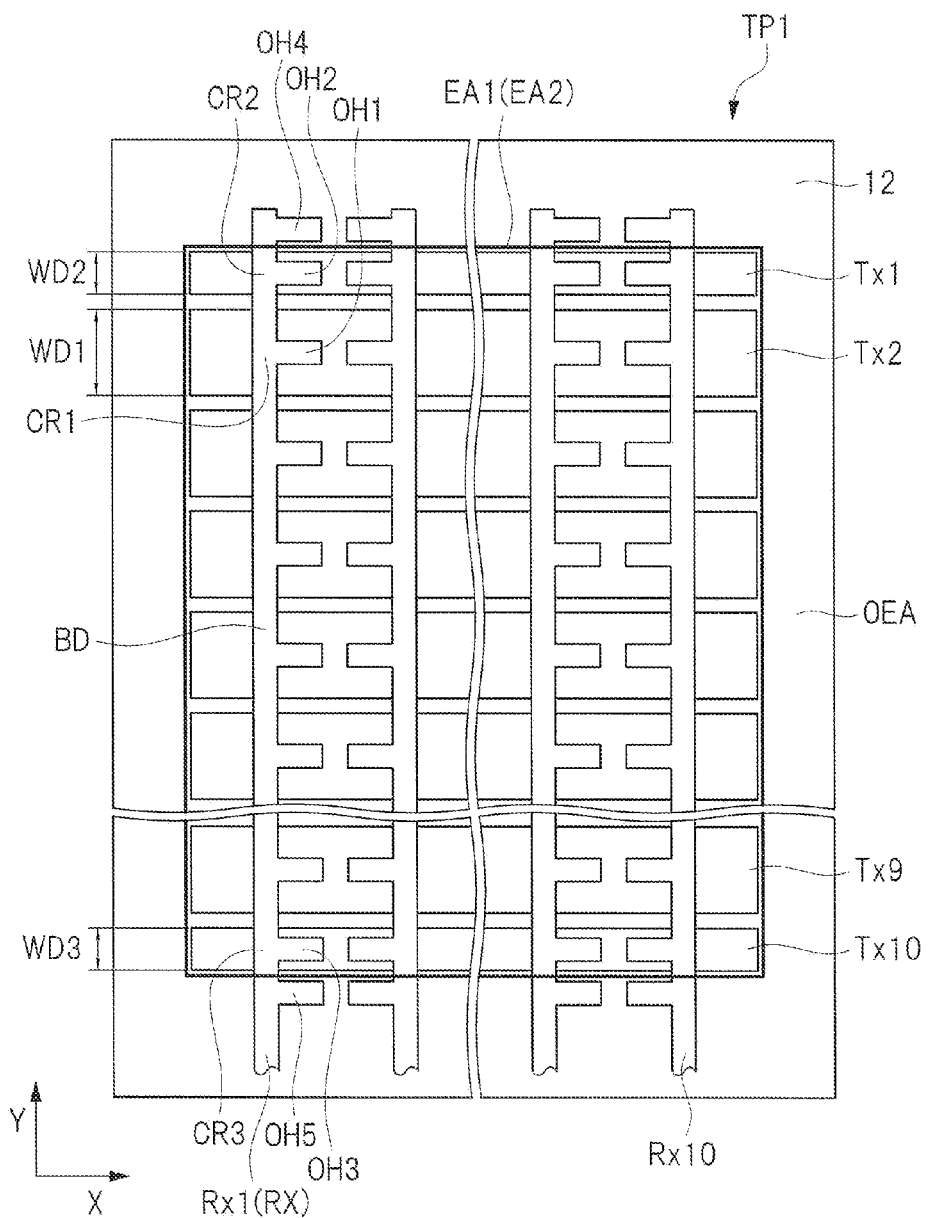
FIG. 10 is a plan view schematically showing a third modification example of the arrangement of driving electrodes and detecting electrodes in a touch panel provided in the display device of the first embodiment.

FIG. 9 is a plan view schematically showing a second modification example of an arrangement of driving electrodes and detecting electrodes in the touch panel provided in the display device of the first embodiment. FIG. 10 is a plan view schematically showing a third modification example of an arrangement of driving electrodes and detecting electrodes in the touch panel provided in the display device of the first embodiment. FIG. 9 and FIG. 10 show examples in which the overhang portions OH1 to OH5 project toward one side of the main body portion BD but not toward other side thereof. Note that, respective portions of the touch panels TP1 other than the overhang portions OH1 to OH5 in the second modification example and the third modification example are identical to those of the touch panel TP1 in the first embodiment. Therefore, the respective portions of the touch panels shown in FIG. 9 and FIG. 10 other than the overhang portions OH1 to OH5, which are members having the same functions as those of members of the touch panel TP1 shown in FIG. 7 are denoted by the same reference numerals, and repetitive descriptions thereof will be omitted.

In the second modification example shown in FIG. 9, in a plan view, the plurality of overhang portions OH1, and the overhang portions OH2 to OH5 are formed to project in the positive direction of the X-axis direction from the main body portion BD, and the detecting electrodes Rx have a comb-like shape.

Further, in the third modification example shown in FIG. 10, the plurality of overhang portions OH1, and the overhang portions OH2 to OH5 are formed to project in the positive direction or the negative direction of the X-axis direction from the main body portion BD, and the detecting electrodes Rx have a comb-like shape. In the third modification example, the detecting electrodes having the overhang portions OH1 to OH5 projecting from the main body portion BD in the positive direction of the X-axis direction and the detecting electrodes having the overhang portions OH1 to OH5 projecting from the main body portion BD in the negative direction of the X-axis direction are alternately arranged in the X-axis direction.

In each of the second modification example and the third modification example, also, adjustment can be performed by formation of the overhang portions OH4 in the same manner as the first embodiment such that the electrostatic capacitance between the driving electrode Tx1 and the detecting electrode Rx approaches the electrostatic capacitance between each of the driving electrodes Tx2 to Tx9 and the detecting electrode Rx. Further, in each of the second modification example and the third modification example, also, adjustment can be performed by formation of the overhang portions OH5 in the same manner as the first embodiment such that the electrostatic capacitance between the driving electrode Tx10 and the detecting electrode Rx approaches the electrostatic capacitance between each of the driving electrodes Tx2 to Tx9 and the detecting electrode Rx.

<Fourth Modification Example of Arrangement of Driving Electrodes and Detecting Electrodes>

Figure 11:
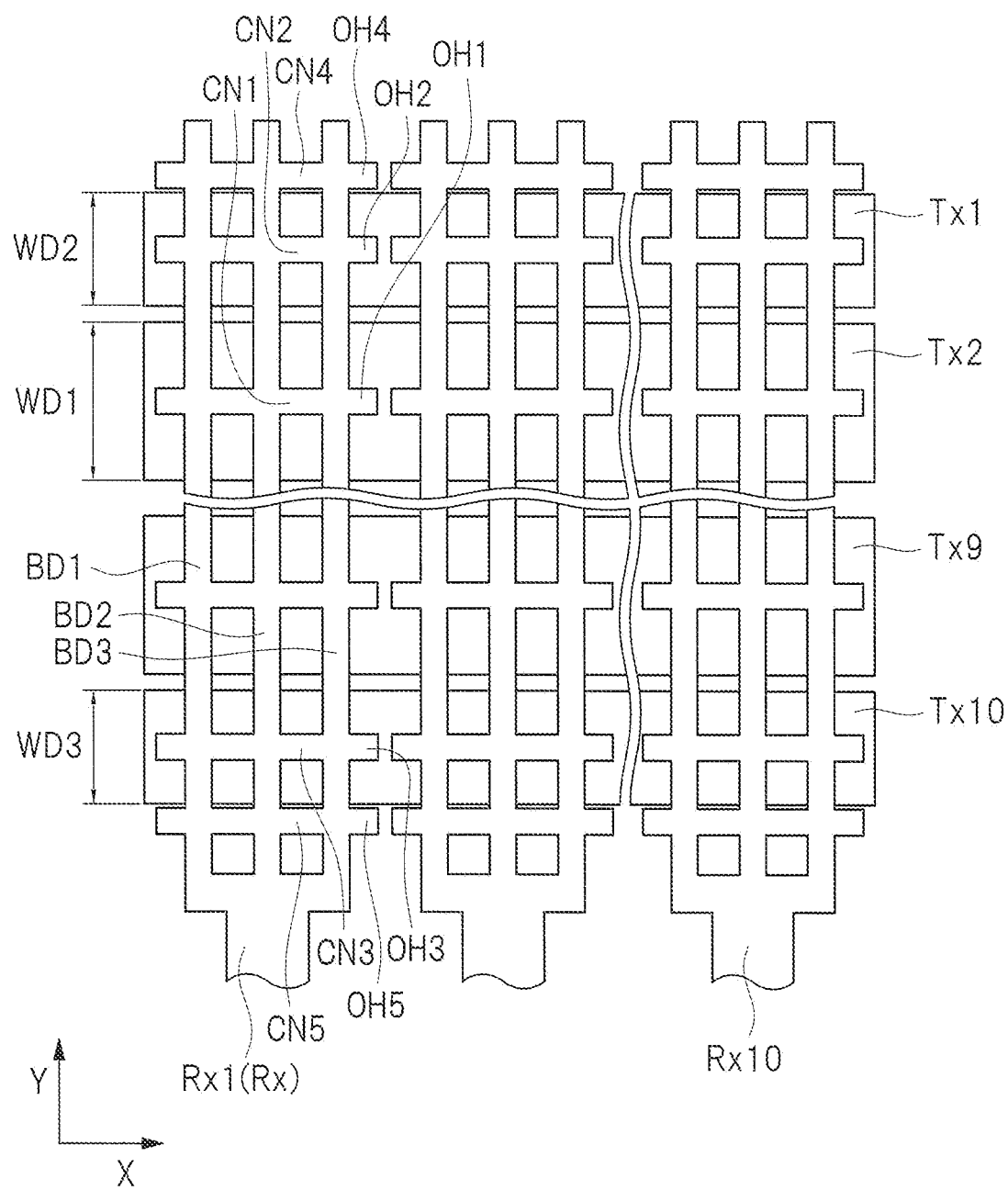
FIG. 11 is a plan view schematically showing a fourth modification example of the arrangement of driving electrodes and detecting electrodes in a touch panel provided in the display device of the first embodiment.

FIG. 11 is a plan view schematically showing a fourth modification example of an arrangement of driving electrodes and detecting electrodes in the touch panel provided in the display device of the first embodiment. FIG. 11 shows an example in which each of a plurality of detecting electrodes has a plurality of main body portions. Note that, in FIG. 11, illustration of the substrate 12, the display area EA1, the detecting area EA2 and the area OEA (see FIG. 7) is omitted. Further, respective portions of the touch panel other than the detecting electrodes Rx1 to Rx10, namely, the detecting electrodes Rx, in the fourth modification example are identical to respective portions of the touch panel TP1 in the first embodiment. Therefore, the respective portions of the touch panel shown in FIG. 11 other than the detecting electrodes, which are members having the same functions as those of members of the touch panel TP1 shown in FIG. 7 are denoted by the same reference numerals, and repetitive descriptions thereof will be omitted.

In the fourth modification example shown in FIG. 11, the detecting electrode Rx includes three main body portions BD1, BD2, and BD3, a plurality of connecting portions CN1 and connecting portions CN2 to CN5, and a plurality of overhang portions OH1 and overhang portions OH2 to OH5.

The three main body portions BD1, BD2 and BD3 each extend in the Y-axis direction, and they are arranged in the X-axis direction. The three main body portions BD1, BD2 and BD3 are united in one piece on the side of the negative direction of the Y-axis direction, and they are electrically connected to one another on the side of the negative direction of the Y-axis direction. Note that, the present invention is not limited to the case in which the detecting electrode Rx includes the three main body portions BD1, BD2, and BD3, but it may include two, four or more main body portions.

In a plan view, each of the plurality of connecting portions CN1 is formed inside an area provided with each of the driving electrodes Tx2 to Tx9 so as to connect the main body portions BD1, BD2 and BD3. In a plan view, the connecting portion CN2 is formed inside an area provided with the driving electrode Tx1 so as to connect the main body portions BD1, BD2 and BD3. In a plan view, the connecting portion CN3 is formed inside an area provided with the driving electrode Tx10 so as to connect the main body portions BD1, BD2 and BD3. Each of the connecting portions CN1 to CN3 is an expanding portion for expanding the area of the detecting electrode Rx as compared with a case in which each of the connecting portions CN1 to CN3 is not formed.

In a plan view, the plurality of overhang portions OH1 are respectively formed inside the areas provided with the driving electrodes Tx2 to Tx9 so as to project from the main body portion BD1 in the negative direction of the X-axis direction and project from the main body portion BD3 in the positive direction of the X-axis direction. The overhang portion OH1 is an expanding portion for expanding the area of the detecting electrode Rx as compared with a case in which the overhang portion OH1 is not formed.

Further, preferably, the respective areas of the plurality of connecting portions CN1 are equal to one another, and the respective areas of the plurality of overhang portions OH1 are equal to one another. Therefore, since the shapes of the connecting portions CN1 and the overhang portions OH1 have a periodicity to be inconspicuous, visibility of the display device LCD1 can be improved, and the electrostatic capacitances between the respective driving electrodes Tx2 to Tx9 and the detecting electrode Rx can be made equal to each other.

In a plan view, the overhang portions OH2 are formed inside the area provided with the driving electrode Tx1 so as to project from the main body portion BD1 in the negative direction of the X-axis direction and project from the main body portion BD3 in the positive direction of the X-axis direction, respectively. The overhang portion OH2 is an expanding portion for expanding the area of the detecting electrode Rx as compared with a case in which the overhang portion OH2 is not formed.

Preferably, the area of the connecting portion CN2 is equal to the area of the connecting portion CN1, and the area of the overhang portion OH2 is equal to the area of the overhang portion OH1. Therefore, since the shape of the connecting portion CN2 can be made identical to the shape of the connecting portion CN1 and the shape of the overhang portion OH2 can be made identical to the shape of the overhang portion OH1, the connecting portion CN2 and the overhang portion OH2 become inconspicuous, and thus visibility of the display device LCD1 can be improved.

In a plan view, the overhang portions OH3 are formed inside the area provided with the driving electrode Tx10 so as to project from the main body portion BD1 in the negative direction of the X-axis direction and project from the main body portion BD3 in the positive direction of the X-axis direction, respectively. The overhang portion OH3 is an expanding portion for expanding the area of the detecting electrode Rx as compared with a case in which the overhang portion OH3 is not formed.

Further, preferably, the area of the connecting portion CN3 is equal to the area of the connecting portion CN1 and the area of the overhang portion OH3 is equal to the area of the overhang portion OH1. Therefore, since the shape of the connecting portion CN3 can be made identical to the shape of the connecting portion CN1 and the shape of the overhang portion OH3 can be made identical to the shape of the overhang portion OH1, so that the connecting portion CN3 and the overhang portion OH3 become inconspicuous, visibility of the display device LCD1 can be improved.

In a plan view, the connecting portion CN4 is formed so as to connect the main body portions BD1, BD2 and BD3 on the side opposite to the plurality of driving electrodes Tx2 to Tx9 via the driving electrode Tx1, namely, on the side of the positive direction of the Y-axis direction to the driving electrode Tx1. The connecting portion CN4 is an expanding portion for expanding the area of the detecting electrode Rx as compared with a case in which the connecting portion CN4 is not formed.

In a plan view, the overhang portions OH4 are formed so as to project from the main body portion BD1 in the negative direction of the X-axis direction and project from the main body portion BD3 in the positive direction of the X-axis direction, respectively, on the side opposite to the plurality of driving electrodes Tx2 to Tx9 via the driving electrode Tx1, namely, on the side of the positive direction of the Y-axis direction to the driving electrode Tx1. The overhang portion OH4 is an expanding portion for expanding the area of the detecting electrode Rx as compared with a case in which the overhang portion OH4 is not formed.

In a plan view, the connecting portion CN5 is formed so as to connect the main body portions BD1, BD2 and BD3 on the side opposite to the plurality of driving electrodes Tx2 to Tx9 via the driving electrode Tx10, namely, on the side of the negative direction of the Y-axis direction to the driving electrode Tx10. The connecting portion CN5 is an expanding portion for expanding the area of the detecting electrode Rx as compared with a case in which the connecting portion CN5 is not formed.

In a plan view, the overhang portions OH5 are formed so as to project from the main body portion BD1 in the negative direction of the X-axis direction and project from the main body portion BD3 in the positive direction of the X-axis direction, respectively, on the side opposite to the plurality of driving electrodes Tx2 to Tx9 via the driving electrode Tx10, namely, on the side of the negative direction of the Y-axis direction to the driving electrode Tx10. The overhang portion OH5 is an expanding portion for expanding the area of the detecting electrode Rx as compared with a case in which the overhang portion OH5 is not formed.

In the fourth modification example, adjustment can be performed by formation of the connecting portion CN4 and the overhang portions OH4 in the same manner as the first embodiment such that the electrostatic capacitance between the driving electrode Tx1 and the detecting electrode Rx approaches the electrostatic capacitance between each of the driving electrodes Tx2 to Tx9 and the detecting electrode Rx. Further, adjustment can be performed by formation of the connecting portion CN5 and the overhang portions OH5 in the same manner as the first embodiment such that the electrostatic capacitance between the driving electrode Tx10 and the detecting electrode Rx approaches the electrostatic capacitance between each of the driving electrodes Tx2 to Tx9 and the detecting electrode Rx.

<Fifth Modification Example of Arrangement of Driving Electrodes and Detecting Electrodes>

Figure 12:
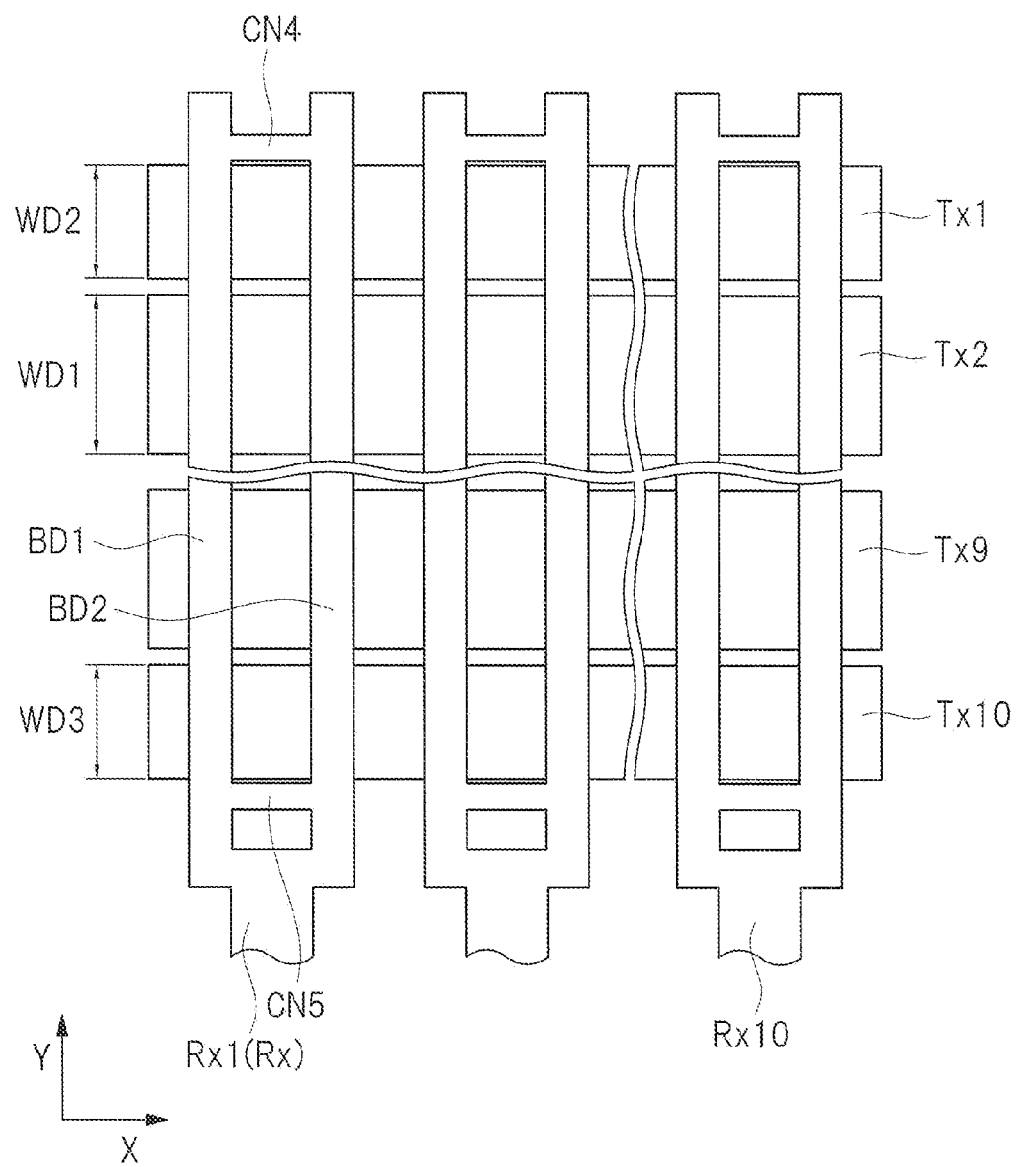
FIG. 12 is a plan view schematically showing a fifth modification example of the arrangement of driving electrodes and detecting electrodes in a touch panel provided in the display device of the first embodiment.

FIG. 12 is a plan view schematically showing a fifth modification example of an arrangement of driving electrodes and detecting electrodes in the touch panel provided in the display device of the first embodiment. FIG. 12 shows an example in which each of a plurality of detecting electrodes has a plurality of main body portions. Note that, in FIG. 12, illustration of the substrate 12, the display area EA1, the detecting area EA2 and the area OEA (see FIG. 7) is omitted. Further, respective portions of the touch panel other than the detecting electrodes Rx1 to Rx10, namely, the detecting electrodes Rx, in the fifth modification example are identical to respective portions of the touch panel TP1 in the first embodiment. Therefore, the respective portions of the touch panel shown in FIG. 12 other than the detecting electrodes Rx, which are members having the same functions as those of members of the touch panel TP1 shown in FIG. 7 are denoted by the same reference numerals, and repetitive descriptions thereof will be omitted.

In the fifth modification example shown in FIG. 12, the detecting electrode Rx includes two main body portions BD1 and BD2, and connecting portions CN4 and CN5.

The two main body portions BD1 and BD2 each extend in the Y-axis direction, and they are arranged in the X-axis direction. The two main body portions BD1 and BD2 are united into one piece on the side of the negative direction of the Y-axis direction, and they are electrically connected to each other on the side of the negative direction of the Y-axis direction. Note that, the present invention is not limited to the case the detecting electrode Rx includes two main body portions BD1 and BD2, but the detecting electrodes Rx may include three or more main body portions.

In a plan view, the connecting portion CN4 is formed so as to connect the main body portions BD1 and BD2 on the side opposite to the plurality of driving electrodes Tx2 to Tx9 via the driving electrode Tx1, namely, on the side of the positive direction of the Y-axis direction to the driving electrode Tx1. The connecting portion CN4 is an expanding portion for expanding the area of the detecting electrode Rx as compared with a case in which the connecting portion CN4 is not formed.

In a plan view, the connecting portion CN5 is formed so as to connect the main body portions BD1 and BD2 on the side opposite to the plurality of driving electrodes Tx2 to Tx9 via the driving electrode Tx10, namely, on the side of the negative direction of the Y-axis direction to the driving electrode Tx10. The connecting portion CN5 is an expanding portion for expanding the area of the detecting electrode Rx as compared with a case in which the connecting portion CN5 is not formed.

On the other hand, as shown in FIG. 12, in a plan view, such a configuration can be adopted that, the connecting portion or the overhang portion as the expanding portions for expanding the area of the detecting electrode Rx is not formed inside the area provided with each of the driving electrodes Tx1 to Tx10. In a plan view, such a configuration can be adopted that, the overhang portions projecting from the main body portion BD1 in the negative direction of the X-axis direction and projecting from the main body portion BD2 in the positive direction of the X-axis direction, respectively, are not formed on the side opposite to the plurality of driving electrodes Tx2 to Tx9 via the driving electrode Tx1. Further, such a configuration can be adopted in a plan view, the overhang portions projecting from the main body portion BD1 in the negative direction of the X-axis direction and projecting from the main body portion BD2 in the positive direction of the X-axis direction are not formed on the side opposite to the plurality of driving electrodes Tx2 to Tx9 via the driving electrode Tx10.

In the fifth embodiment, adjustment can be performed by forming the connecting portions CN4 and CN5 in the same manner as the first embodiment that the electrostatic capacitance between each of the driving electrodes Tx1 and Tx10 and the detecting electrode Rx approaches the electrostatic capacitance between each of the driving electrodes Tx2 to Tx9 and the detecting electrode Rx.

<Regarding Electrostatic Capacitance Between Driving Electrode and Detecting Electrode>

Figure 13:
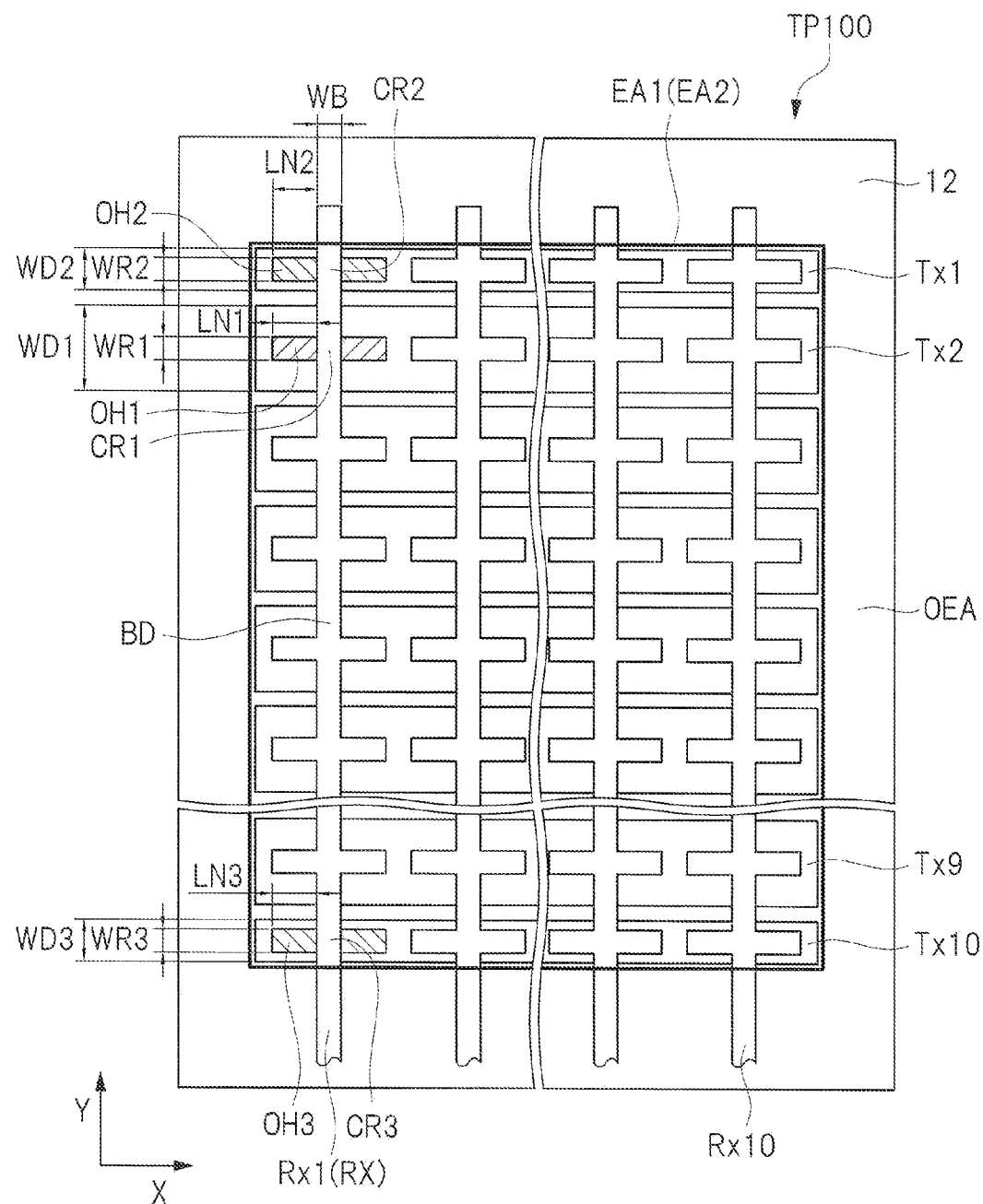
FIG. 13 is a plan view schematically showing an arrangement of driving electrodes and detecting electrodes in a touch panel provided in the display device of a first comparative example.

Next, the electrostatic capacitance between the driving electrode and the detecting electrode will be described with reference to a first comparative example. FIG. 13 is a plan view schematically showing an arrangement of the driving electrodes and the detecting electrodes in a touch panel provided in a display device of the first comparative example.

In the first comparative example, it is assumed that the detecting electrode Rx includes the main body portion BD and the overhang portions OH1 to OH3, but it does not include the overhang portions OH4 and OH5. The main body portion BD extends in the Y-axis direction and the width of the main body portion BD in the X-axis direction is represented as WB.

Figure 14:
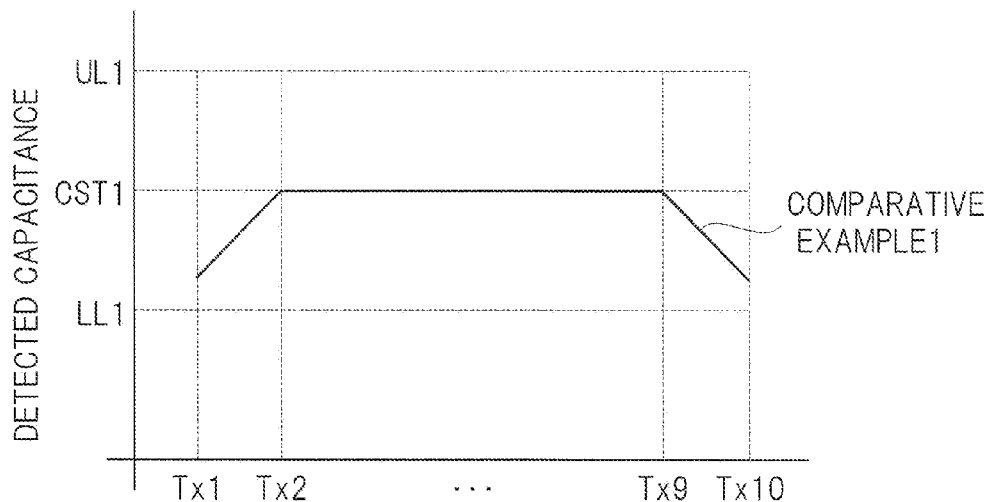
FIG. 14 is a graph showing a detected capacitance detected when a driving voltage is applied to each of a plurality of driving electrodes in the first comparative example.

FIG. 14 is a graph showing a detected capacitance detected when a driving voltage has been applied to each of the plurality of driving electrodes in the first comparative example. In FIG. 14, a horizontal axis represents a driving electrode applied with a driving voltage and a vertical axis represents a detected capacitance. Further, in FIG. 14, a range of a detected capacitance which can be detected by the ADC, namely, a lower limit LL1 and an upper limit UL1 of the ADC range is shown. Further, the detected capacitance shown in FIG. 14 is equal to the electrostatic capacitance between each of the driving electrodes Tx1 to Tx10 and the detecting electrode Rx.

Note that respective potions of the touch panel TP100 other than the detecting electrodes Rx1 to Rx10, namely, the detecting electrode Rx in the first comparative example shown in FIG. 14 are identical to the respective portions of the touch panel TP1 other than the detecting electrode Rx in the first embodiment shown in FIG. 7. Further, respective portions other than the touch panel TP100 in the display device provided with the touch panel TP100 of the first comparative example are identical to the respective portions other than the touch panel TP1 in the display device LCD1 shown in FIG. 6.

That is, in the first comparative example, also, the width WD2 of the driving electrode Tx1 is smaller than the respective widths WD1 of the driving electrodes Tx2 to Tx9 and the width WD3 of the driving electrode Tx10 is smaller than the respective widths WD1 of the driving electrodes Tx2 to Tx9 in the same manner as the first embodiment.

Further, respective portions of the detecting electrode Rx in the first comparative example are identical to the respective portions of the detecting electrode Rx in the first embodiment except for a point that the former detecting electrode Rx does not include the overhang portions OH4 and OH5. That is, each of the plurality of overhang portions OH1 in the first comparative example is identical to each of the plurality of overhang portions OH1 in the first embodiment. Further, the overhang portion OH2 in the first comparative example is identical to the overhang portion OH2 in the first embodiment. Further, the overhang portion OH3 in the first comparative example is identical to the overhang portion OH3 in the first embodiment.

Note that, in FIG. 13, the overhang portions OH1 formed inside the area provided with the driving electrode Tx2, and the overhang portions OH2 and OH3 are hatched.

In the first comparative example, also, the width WD2 of the driving electrode Tx1 is smaller than the respective widths WD1 of the driving electrodes Tx2 to Tx9 in the same manner as the first embodiment. Therefore, the area S2 of a portion of the detecting electrode Rx overlapping with the driving electrode Tx1 becomes smaller than the area S1 of a portion of the detecting electrode Rx overlapping with each of the driving electrodes Tx2 to Tx9. Further, in the first comparative example, also, the width WD3 of the driving electrode Tx10 is smaller than the respective widths WD1 of the driving electrodes Tx2 to Tx9 in the same manner as the first embodiment. Therefore, the area S3 of a portion of the detecting electrode Rx overlapping with the driving electrode Tx10 becomes smaller than the area S1 of a portion of the detecting electrode Rx overlapping with each of the driving electrodes Tx2 to Tx9. Accordingly, the electrostatic capacitance between each of the driving electrodes Tx1 and Tx10 and the detecting electrode Rx becomes smaller than the electrostatic capacitance between each of the driving electrodes Tx2 to Tx9 and the detecting electrode Rx.

In the touch panel TP100 of the first comparative example, as shown in FIG. 14, the electrostatic capacitances, namely, the detected capacitances detected when a driving voltage has been applied to the respective driving electrodes Tx2 to Tx9 become a constant value CST1.

In the touch panel TP100 of the first comparative example, however, the electrostatic capacitance, namely the detected capacitance detected when a driving voltage has been applied to each of the driving electrodes Tx1 and Tx10 becomes smaller than the constant value CST1. When the detected capacitance becomes smaller than the constant value CST1, there is such a possibility that the detected capacitance approaches the lower limit LL1 or becomes smaller than the lower limit LL1. That is, a difference, namely, a tolerance of the detected capacitance detected when the driving voltage has been applied to each of the driving electrodes Tx1 and Tx10 to the lower limit LL1 of the ADC range becomes small, so that a resistance of the detected capacitance to the noise, namely, a noise immunity of the detected capacitance lowers. As a result, in the touch panel TP100 of the first comparative example, a position detection accuracy may be lowered or the position detection sensitivity may be lowered on the driving electrodes Tx1 and Tx10 as compared with that on the driving electrodes Tx2 to Tx9.

<Main Features and Advantageous Effects of the First Embodiment>

In the first embodiment and the first modification example to the fifth modification example, the detecting electrode Rx is disposed on the side opposite to the plurality of driving electrodes Tx2 to Tx9 via the driving electrode Tx1 or the driving electrode Tx10, and it includes, for example, the overhang portions OH4 and OH4 or the connecting portions CN4 and CN5 as the expanding portions for expanding the area of the detecting electrode Rx. In the following, the overhang portions OH4 and OH5 are described on behalf of the overhang portions OH4 and OH5 and the connecting portions CN4 and CN5, but the overhang portions OH4 and OH5 cannot increase the areas of portions of the detecting electrode Rx overlapping with the driving electrodes Tx1 and Tx10 in a plan view.

However, since each of the overhang portions OH4 and OH5 is disposed in the vicinity of the driving electrode Tx1 or in the vicinity of the driving electrode Tx10, the detected capacitance between each of the driving electrodes Tx1 and Tx10 and the detecting electrode Rx can be increased. Therefore, the electrostatic capacitance between each of the driving electrodes Tx1 and Tx10 and the detecting electrode Rx can be prevented or inhibited from becoming smaller than the electrostatic capacitance between each of the driving electrodes Tx2 to Tx9 and the detecting electrode Rx.

Figure 15:
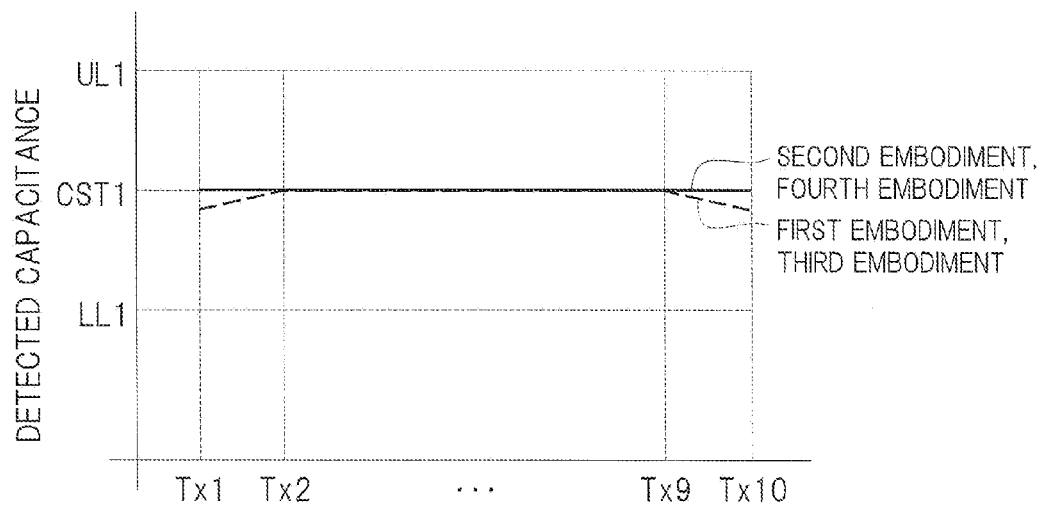
FIG. 15 is a graph showing a detected capacitance detected when a driving voltage is applied to each of a plurality of driving electrodes in the first to fourth comparative examples.

FIG. 15 is a graph showing a detected capacitance detected when a driving electrode has been applied to each of the plurality of driving electrodes in Example 1 and Example 2 which are examples in the first embodiment. In FIG. 15, a horizontal axis represents a driving electrode applied with a driving voltage, and a vertical axis represents a detected capacitance in the same manner as FIG. 14. Further, FIG. 15 shows the range of the detected capacitance which can be detected by the ADC, namely, the lower limit LL1 and the upper limit UL1 of the ADC range like FIG. 14. Further, the detected capacitances shown in FIG. 15 are equal to the electrostatic capacitances between the respective driving electrodes Tx1 to Tx10 and the detecting electrode Rx like the detected capacitance shown in FIG. 14.

As shown in FIG. 15, it is assumed that the electrostatic capacitances, namely, the detected capacitances detected when a driving voltage has been applied to the respective driving electrodes Tx2 to Tx9 also take the constant value CST1 in Example 1 and Example 2.

Here, the respective areas of the overhang portions OH4 and OH5 are preferably adjusted so that the electrostatic capacitances, namely, the detected capacitances detected when a driving voltage has been applied to the respective driving electrodes Tx1 and Tx10 fall within a range of ±10% to the constant value CST1. The case in which the detecting electrode Rx includes the overhang portions OH4 and OH5 thus adjusted is shown as Example 1 shown in FIG. 15.

In Example 1 shown in FIG. 15, a difference, namely, a tolerance, of the detected capacitance detected when a driving voltage has been applied to each of the driving electrodes Tx1 and Tx10 to the lower limit LL1 of the ADC range can be inhibited from becoming small as compared with the first comparative example shown in FIG. 14. A noise immunity of the detected capacitance detected when a driving voltage has been applied to each of the driving electrodes Tx1 and Tx10 can be inhibited from lowering. As a result, a position detection accuracy can be prevented or inhibited from lowering and a position detection sensitivity can be prevented or inhibited from lowering on the driving electrodes Tx1 and Tx10 as compared with that on the driving electrodes Tx2 to Tx9. Therefore, the position detection performance in the display device can be improved.

Further, the areas of the overhang portions OH4 and OH5 are preferably adjusted such that the detected capacitance detected when a driving voltage has been applied to each of the driving electrodes Tx1 and Tx10 becomes the constant value CST1. The case in which the detecting electrode Rx includes the overhang portions OH4 and OH5 thus adjusted is shown as Example 2 shown in FIG. 15.

In Example 2 shown in FIG. 15, the tolerance of the detected capacitance detected when a driving voltage has been applied to each of the driving electrodes Tx1 and Tx10 to the lower limit LL1 of the ADC range can be inhibited further securely from becoming small. The noise immunity of the detected capacitance detected when a driving voltage has been applied to each of the driving electrodes Tx1 and Tx10 can be inhibited further securely from lowering. As a result, a position detection accuracy can be prevented or inhibited further securely from lowering and a position detection sensitivity can be prevented or inhibited further securely from lowering on the driving electrodes Tx1 and Tx10 as compared with on the driving electrodes Tx2 to Tx9. Accordingly, the position detection performance in the display device can be improved.

(Second Embodiment)

In the first embodiment, in a plan view, the expanding portion for expanding the area of the detecting electrode is provided outside the display area in order to adjust the electrostatic capacitance between the driving electrode having a width smaller than those of the other driving electrodes and the detecting electrode. On the other hand, in the second embodiment, in order to adjust the electrostatic capacitance between the driving electrode having a width smaller than those of the other driving electrodes and the detecting electrode, the expanding portion for expanding the area of the detecting electrode is provided on the driving electrode having the smaller width in a plan view.

Since respective portions of the display device of the second embodiment other than a touch panel TP2 are identical to the respective portions of the display device of the first embodiment other than the touch panel TP1, descriptions of respective portions of the display device of the second embodiment other than a touch panel TP2 are omitted.

<Arrangement of Driving Electrodes and Detecting Electrodes>

Figure 16:
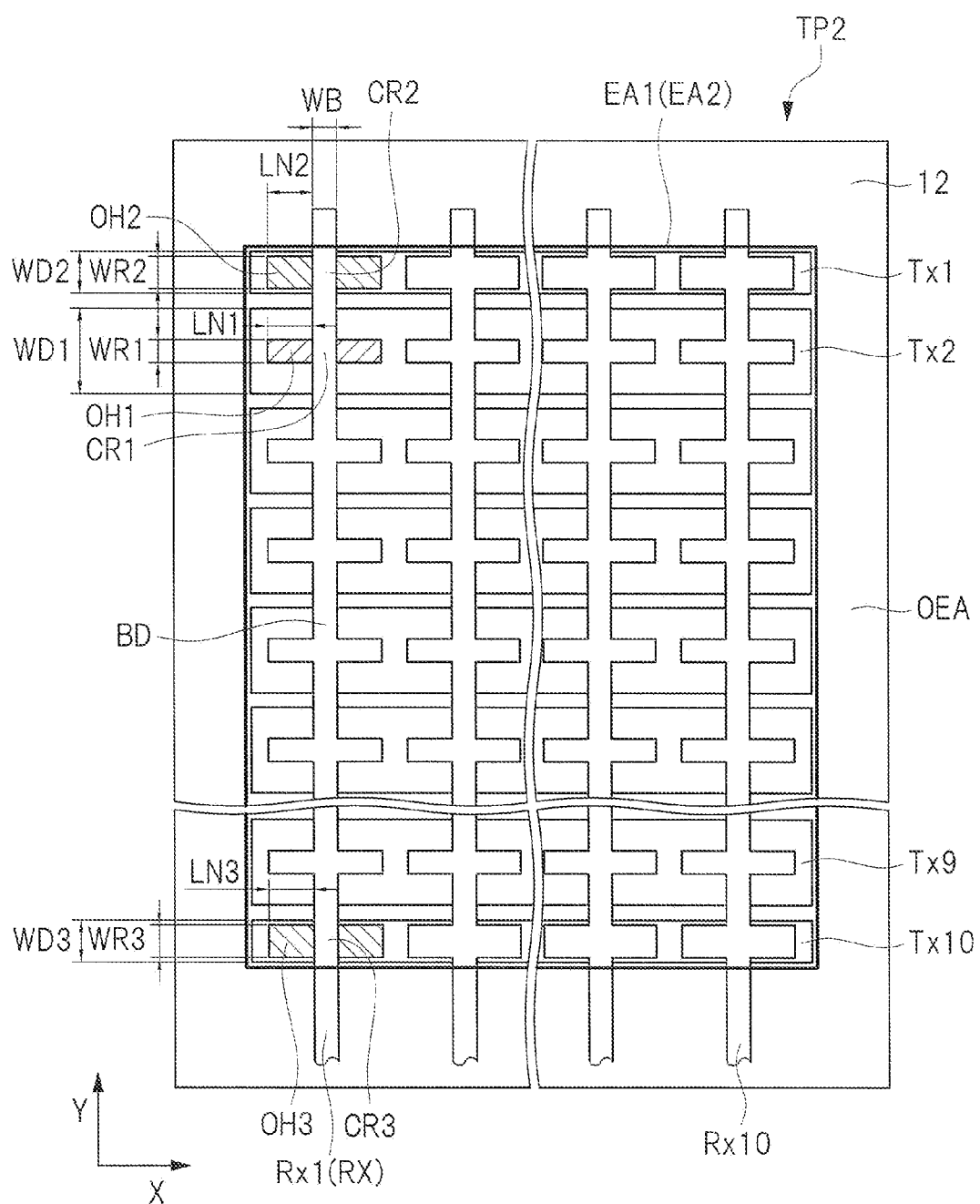
FIG. 16 is a plan view schematically showing an arrangement of driving electrodes and detecting electrodes in a touch panel provided in the display device of a second embodiment.

FIG. 16 is a plan view schematically showing an arrangement of driving electrodes and detecting electrodes in a touch panel provided in the display device of the second embodiment.

Note that, respective portions of the touch panel TP2 other than the detecting electrodes Rx1 to Rx10, namely, the detecting electrodes Rx in the second embodiment are identical to respective portions of the touch panel TP1 in the first embodiment. Therefore, respective portions of the touch panel TP2 shown in FIG. 16 other than the driving electrodes Rx, which have the same functions as those of the members of the touch panel TP1 shown in FIG. 7 are denoted by the same reference numerals, and descriptions thereof are omitted.

In the second embodiment, the widths WD1 of the respective driving electrodes Tx2 to Tx9 are equal to one another in the same manner as the first embodiment. Further, the width WD2 of the driving electrode Tx1 is smaller than the respective widths WD1 of the driving electrodes Tx2 to Tx9, and the width WD3 of the driving electrode Tx10 is smaller than the respective widths WD1 of the driving electrodes Tx2 to Tx9.

In the second embodiment, in the same manner as the first embodiment, an intersection portion between each of the driving electrodes Tx2 to Tx9 and the detecting electrode Rx is represented as CR1, an intersection portion between the driving electrode Tx1 and the detecting electrode Rx is represented as CR2, and an intersection portion between the driving electrode Tx10 and the detecting electrode Rx is represented as CR3. Further, the electrostatic capacitance between each of the driving electrodes Tx2 to Tx9 and the detecting electrode Rx, namely, the electrostatic capacitance formed at the intersection portion CR1, is represented as CP1. Further, the electrostatic capacitance between the driving electrode Tx1 and the detecting electrode Rx, namely, the electrostatic capacitance formed at the intersection portion CR2, is represented as CP2, and the electrostatic capacitance between the driving electrode Tx10 and the detecting electrode Rx, namely, the electrostatic capacitance formed at the intersection portion CR3, is represented as CP3. Here, an input position is detected based upon the electrostatic capacitances CP1, CP2, and CP3.

The detecting electrode Rx includes a main body portion BD, and a plurality of overhang portions OH1 and overhang portions OH2 and OH3. The main body portion BD extends in the Y-axis direction, and the width of the main body portion BD in the X-axis direction is represented as WB. Note that, in FIG. 16, the overhang portions OH1 provided inside the area provided with the driving electrode Tx2, and the overhang portions OH2 and OH3 are hatched.

Each of the plurality of overhang portions OH1 in the second embodiment can be made identical with each of the plurality of overhang portions OH1 in the first embodiment.

In a plan view, the overhang portions OH2 are formed inside the area provided with the driving electrode Tx1, namely at the intersection portion CR2, and overhang from the main body portion BD in the positive direction and the negative direction of the X-axis direction, respectively. The overhang portion OH2 is an expanding portion for expanding the area of the detecting electrode Rx as compared with the case in which the overhang portion OH2 is not formed.

In a plan view, the overhang portions OH3 are formed inside the area provided with the driving electrode Tx10, namely at the intersection portion CR3, and overhang from the main body portion BD in the positive direction and the negative direction of the X-axis direction, respectively. The overhang portion OH3 is an expanding portion for expanding the area of the detecting electrode Rx as compared with the case in which the overhang portion OH3 is not formed.

In the second embodiment, also, the area of a portion of the detecting electrode Rx overlapping with each of the driving electrodes Tx2 to Tx9 is represented as S1, the area of a portion of the detecting electrode Rx overlapping with the driving electrode Tx1 is represented as S2, and the area of a portion of the detecting electrode Rx overlapping with the driving electrode Tx10 is represented as S3 in the same manner as the first embodiment. Here, the area of the overhang portion OH2 has been adjusted such that the area S2 approaches the area S1, and the area of the overhang portion OH3 has been adjusted such that the area S3 approaches the area S1. Further, preferably, the area of the overhang portion OH2 has been adjusted such that the area S2 becomes equal to the area S1 and the area of the overhang portion OH3 has been adjusted such that the area S3 becomes equal to the area S1.

Note that, the expression "the area S2 approaches the area S1" means that the ratio of the area S2 to the area S1 approaches 1, and it preferably means, for example, that the ratio of the area S2 to the area S1 falls within the range of 0.9 to 1.1. Further, the expression "the area S3 approaches the area S1" means that the ratio of the area S3 to the area S1 approaches 1, and it preferably means, for example, that the ratio of the area S3 to the area S1 falls within the range of 0.9 to 1.1. That is, the expression "the second area approaches the first area" means that the ratio of the second area to the first area approaches 1, and it preferably means, for example, that the ratio of the second area to the first area falls within the range of 0.9 to 1.1 (the same goes to modification examples of the second embodiment).

In the second embodiment, also, the length of the overhang portion OH1 in the X-axis direction is represented as LN1, and the width of the overhang portion OH1 in the Y-axis direction is represented as WR1 in the same manner as the first embodiment. Further, the length of the overhang portion OH2 in the X-axis direction is represented as LN2, and the width of the overhang portion OH2 in the Y-axis direction is represented as WR2. Further, the length of the overhang portion OH3 in the X-axis direction is represented as LN3, and the width of the overhang portion OH3 in the Y-axis direction is represented as WR3.

In the second embodiment, also, for example, it is assumed in the same manner as the first embodiment that the length LN1 of the overhang portion OH1, the length LN2 of the overhang portion OH2, and the length LN3 of the overhang portion OH3 are equal to each other. Here, adjustment has been performed such that the width WR2 of the overhang portion OH2 is larger than the width WR1 of the overhang portion OH1, and adjustment has been performed such that the width WR3 of the overhang portion OH3 is larger than the width WR1 of the overhang portion OH1. That is, adjustment has been performed such that the area SO2 of the overhang portion OH2 which is a product of the length LN2 and the width WR2 becomes larger than the area SO1 of the overhang portion OH1 which is a product of the length LN1 and the width WR1. Adjustment has been performed such that the area SO3 of the overhang portion OH3 which is a product of the length LN3 and the width WR3 becomes larger than the area SO1 of the overhang portion OH1 which is a product of the length LN1 and the width WR1.

Furthermore, the area SB1 of a portion of the main body portion BD overlapping with each of the driving electrodes Tx2 to Tx9 is represented by a product of the width WB and the width WD1. The area SB2 of a portion of the main body portion BD overlapping with the driving electrode Tx1 is represented by a product of the width WB and the width WD2, and the area SB3 of a portion of the main body portion BD overlapping with the driving electrode Tx10 is represented by a product of the width WB and the width WD3. Therefore, the area S1 of the portion of the detecting electrode Rx overlapping with each of the driving electrodes Tx2 to Tx9 is represented by the above-mentioned Equation (1). The area S2 of the portion of the detecting electrode Rx overlapping with the driving electrode Tx1 is represented by the above-mentioned Equation (2), and the area S3 of the portion of the detecting electrode Rx overlapping with the driving electrode Tx10 is represented by the above-mentioned Equation (3).

As described above, since the width WD2 is smaller than the width WD1 and the width WD3 is smaller than WD1, the area SB2 is smaller than the area SB1 and the area SB3 is smaller than SB1. Therefore, when the area SO2 of the overhang portion OH2 is equal to the area SO1 of the overhang portion OH1, the area S2 becomes smaller than the area S1, so that the electrostatic capacitance between the driving electrode Tx1 and the detecting electrode Rx becomes smaller than the electrostatic capacitance between each of the driving electrodes Tx2 to Tx9 and the detecting electrode Rx. Further, when the area SO3 of the overhang portion OH3 is equal to the area SO1 of the overhang portion OH1, the area S3 becomes smaller than the area S1, so that the electrostatic capacitance between the driving electrode Tx10 and the detecting electrode Rx becomes smaller than the electrostatic capacitance between each of the driving electrodes Tx2 to Tx9 and the detecting electrode Rx.

In the second embodiment, however, for example, since the width WR2 is larger than the width WR1, adjustment has been performed that the area SO2 of the overhang portion OH2 becomes larger than the area SO1 of the overhang portion OH1. Adjustment has been performed such that the area S2 of the portion of the detecting electrode Rx overlapping with the driving electrode Tx1 approaches the area S1 of the portion of the detecting electrode Rx overlapping with each of the driving electrodes Tx2 to Tx9. Therefore, adjustment can be performed such that the electrostatic capacitance between the driving electrode Tx1 and the detecting electrode Rx approaches the electrostatic capacitance between each of the driving electrodes Tx2 to Tx9 and the detecting electrode Rx.

Further, in the second embodiment, for example, since the width WR3 is larger than the width WR1, adjustment has been performed that the area SO3 of the overhang portion OH3 becomes larger than the area SO1 of the overhang portion OH1. Adjustment has been performed such that the area S3 of the portion of the detecting electrode Rx overlapping with the driving electrode Tx10 approaches the area S1 of the portion of the detecting electrode Rx overlapping with each of the driving electrodes Tx2 to Tx9. Therefore, adjustment can be performed in such a manner that the electrostatic capacitance between the driving electrode Tx10 and the detecting electrode Rx approaches the electrostatic capacitance between each of the driving electrodes Tx2 to Tx9 and the detecting electrode Rx.

That is, in the second embodiment, adjustment has been performed such that the area of a portion of the detecting electrode overlapping with the driving electrode having a width smaller than those of the other driving electrodes approaches the area of the portion of the detecting electrode overlapping with each of the other driving electrodes in a plan view.

Further, in the second embodiment, when the driving electrodes having a width smaller than those of the other driving electrodes are arranged on both sides of an arrangement of the other driving electrodes, adjustment can be performed such that the electrostatic capacitance between each of the driving electrodes having the smaller width and the detecting electrode approaches the electrostatic capacitance between each of the other driving electrodes and the detecting electrode.

Further, in the second embodiment, in order to adjust the electrostatic capacitance between the driving electrode having the width smaller than those of the other driving electrodes and the detecting electrode, the expanding portion for expanding the area of the detecting electrode is provided inside the display area in a plan view.

<First Modification Example of Arrangement of Driving Electrodes and Detecting Electrodes>

Figure 17:
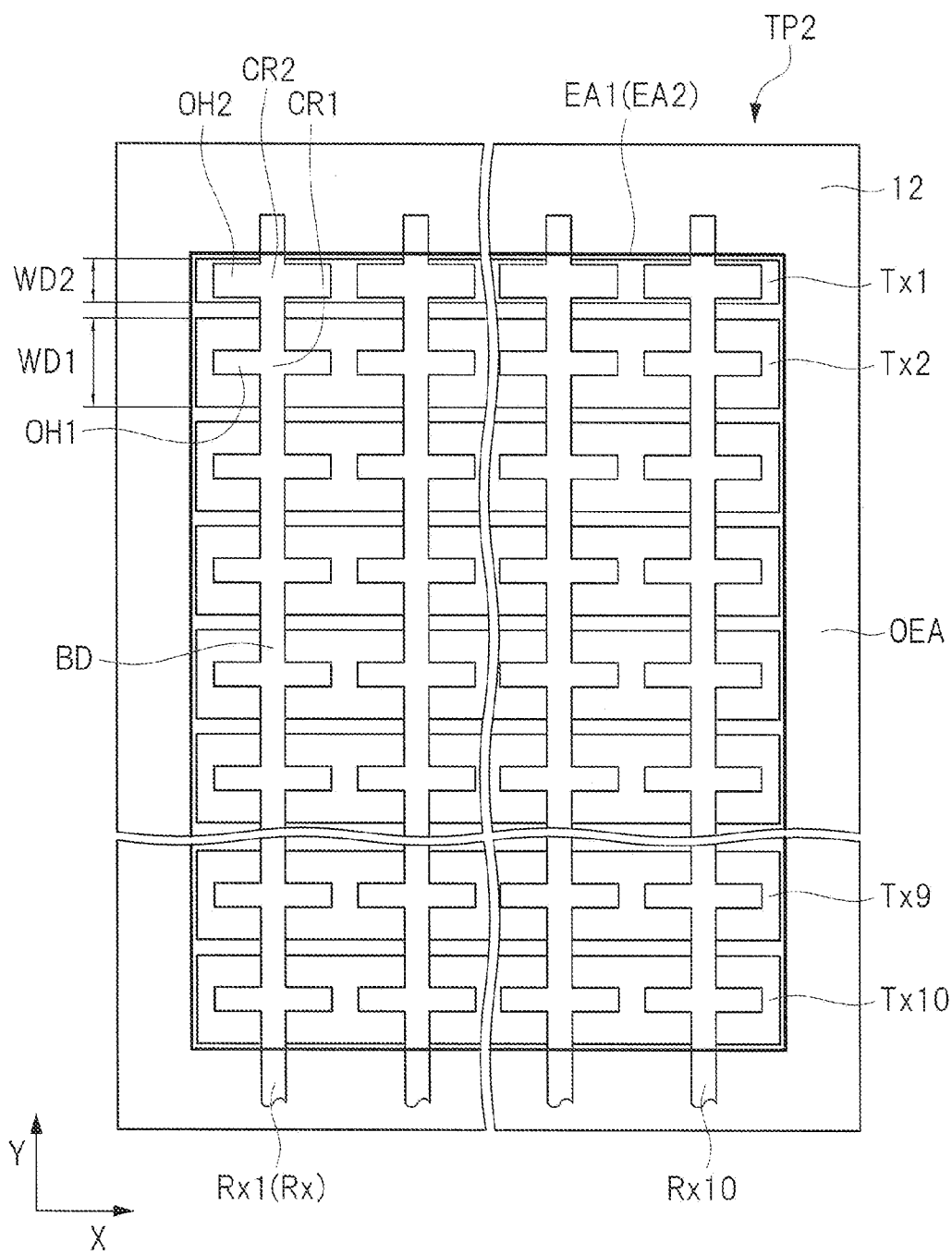
FIG. 17 is a plan view schematically showing a first modification example of an arrangement of driving electrodes and detecting electrodes in a touch panel provided in the display device of a second embodiment.

FIG. 17 is a plan view schematically showing a first modification example of an arrangement of the driving electrodes and the detecting electrodes in the touch panel provided in the display device of the second embodiment. FIG. 17 shows an example in which the width of the driving electrode Tx1 is smaller than the respective widths of the driving electrodes Tx2 to Tx9 but the width of the driving electrode Tx10 is equal to the respective widths of the driving electrodes Tx2 to Tx9. Note that, members of the touch panel TP2 shown in FIG. 17 having the same functions as those of the members of the touch panel TP2 shown in FIG. 16 are denoted by the same reference numerals and descriptions thereof are omitted.

In the first modification example, the respective widths WD1 of the driving electrodes Tx2 to Tx10 are equal to one another and the width WD2 of the driving electrode Tx1 is smaller than the respective widths WD1 of the driving electrodes Tx2 to Tx10.

The detecting electrode Rx includes the main body portion BD, and the plurality of overhang portions OH1 and the overhang portions OH2, but it does not include the overhang portions OH3 (see FIG. 16). That is, the overhang portions OH1 are formed inside an area provided with the driving electrode Tx10.

Each of the plurality of overhang portions OH1 in the first modification example can be made identical to each of the plurality of overhang portions OH1 in the second embodiment. Further, the overhang portion OH2 in the first modification example can be made identical to the overhang portion OH2 in the second embodiment.

In the first modification example, in the same manner as the second embodiment, adjustment has been performed such that the area of the overhang portion OH2 becomes larger than the area of the overhang portion OH1, and adjustment has been performed such that the area of a portion of the detecting electrode Rx overlapping with the driving electrode Tx1 approaches the area of a portion of the detecting electrode Rx overlapping with each of the driving electrodes Tx2 to Tx10. Therefore, adjustment can be performed such that the electrostatic capacitance between the driving electrode Tx1 and the detecting electrode Rx approaches the electrostatic capacitance between each of the driving electrodes Tx2 to Tx10 and the detecting electrode Rx.

That is, even when the driving electrode having a width smaller than those of the other driving electrodes is arranged only on one side of the arrangement of the other driving electrodes, adjustment can be performed such that the electrostatic capacitance between the detecting electrode having the smaller width and the detecting electrode approaches the electrostatic capacitance between each of the other driving electrodes and the detecting electrode.

<Second Modification Example of Arrangement of Driving Electrodes and Detecting Electrodes>

Figure 18:
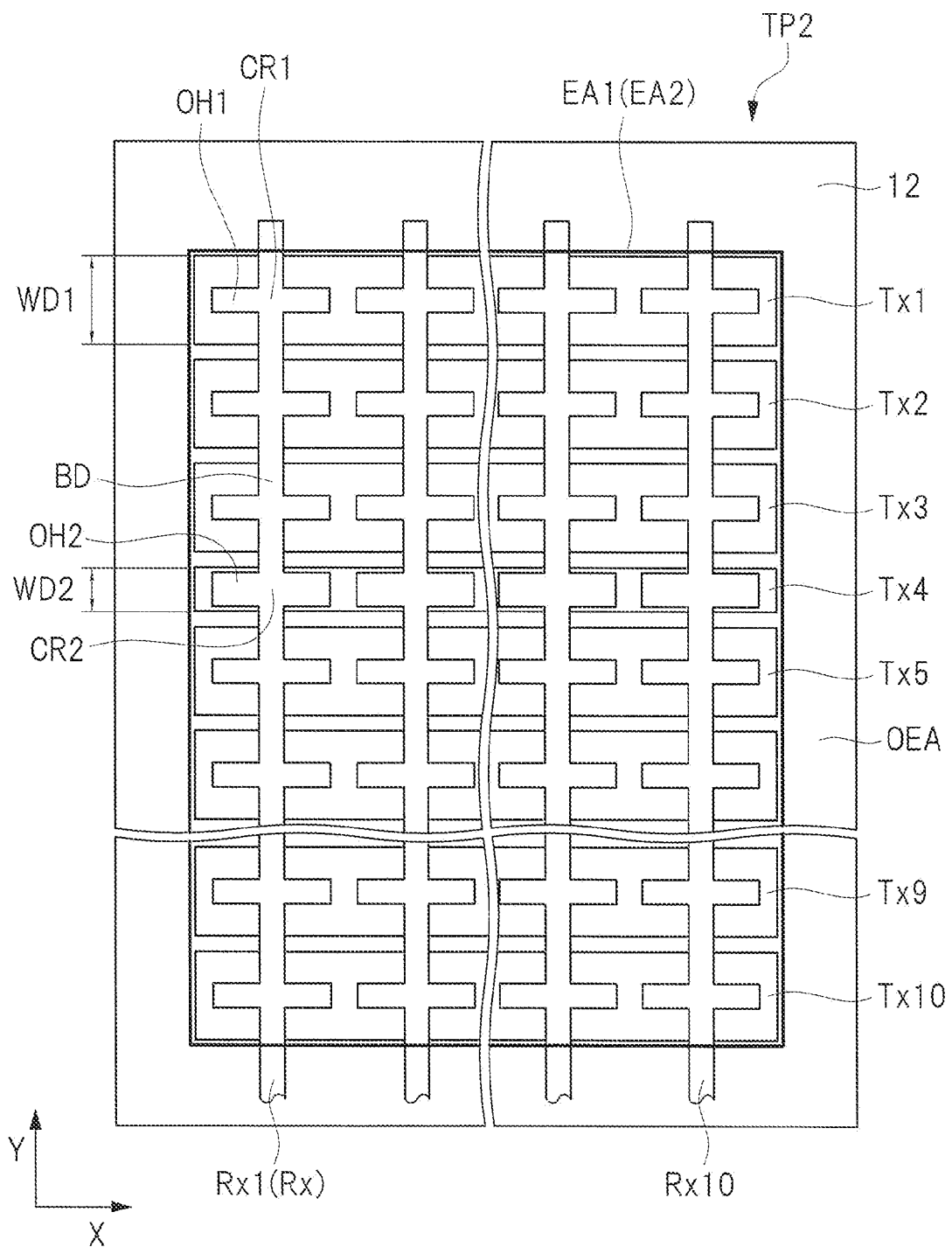
FIG. 18 is a plan view schematically showing a second modification example of the arrangement of driving electrodes and detecting electrodes in the touch panel provided in the display device of the second embodiment.

FIG. 18 is a plan view schematically showing a second modification example of an arrangement of the driving electrodes and the detecting electrodes in the touch panel provided in the display device of the second embodiment. FIG. 18 shows an example in which the driving electrode having a width smaller than those of the other driving electrodes is not arranged outside of the arrangement of the other driving electrodes but it is arranged in the middle of the arrangement of the other driving electrodes. Note that, members of the touch panel TP2 shown in FIG. 18 having the same functions as those of the members of the touch panel TP2 shown in FIG. 16 are denoted by the same reference numerals and descriptions thereof is omitted.

In the second modification example, in a plan view, the respective widths of the driving electrodes Tx1 to Tx3 and Tx5 to Tx10 in the Y-axis direction are represented as WD1 and the width in the Y-axis direction of the driving electrode Tx4 arranged in the middle of arrangement of the driving electrodes is represented as WD2. Here, the respective widths WD1 of the driving electrodes Tx1 to Tx3 and Tx5 to Tx10 are equal to one another, and the width WD2 of the driving electrode Tx4 is smaller than the respective widths WD1 of the driving electrodes Tx1 to Tx3 and Tx5 to Tx10.

For example, according to a specification required as a display device or the like, a driving electrode having a width obtained by multiplying a broken number which has occurred due to the indivisibility of the number of pixels in the Y-axis direction by the arrangement period or the width of pixel electrodes in the Y-axis direction is not arranged outside the arrangement of the driving electrodes but it is arranged in the middle of the arrangement of the driving electrodes. In such a case, for example, the width WD2 of the driving electrode Tx4 which is the driving electrode arranged in the middle of the arrangement of the driving electrodes is made smaller than the respective widths WD1 of the driving electrodes Tx1 to Tx3 and Tx5 to Tx10 which are the other driving electrodes.

Note that, the widths WD1 may also be made different between the driving electrodes Tx1 to Tx3 and the driving electrodes Tx5 to Tx10. Further, in the second modification example, the example in which the driving electrode having a width smaller than those of the other driving electrodes is arranged at the fourth position in the arrangement of the driving electrodes is described, but the position of the driving electrode having the smaller width is not limited to the fourth position but it may be any position in the middle of the arrangement.

In the second modification example, the intersection portion between each of the driving electrodes Tx1 to Tx3 and Tx5 to Tx10 and the detecting electrode Rx is represented as CR1, and the intersection portion between the driving electrode Tx4 and the detecting electrode Rx is represented as CR2. Further, the electrostatic capacitance between each of the driving electrodes Tx1 to Tx3 and Tx5 to Tx10 and the detecting electrode Rx is represented as CP1, and the electrostatic capacitance between he driving electrode Tx4 and the detecting electrode Rx is represented as CP2. Here, an input position is detected based upon the electrostatic capacitances CP1 and CP2.

Each of the plurality of overhang portions OH1 in the second modification example can be made equal to each of the plurality of overhang portions OH1 in the second embodiment. Furthermore, the overhang portion OH2 in the second modification example may be made equal to the overhang portion OH2 in the second embodiment.

In the second modification example, also, adjustment has been performed in the same manner as the second embodiment such that the area of the overhang portion OH2 becomes larger than the area of the overhang portion OH1. Adjustment has been performed such that the area of a portion of the detecting electrode Rx overlapping with the driving electrode Tx4 approaches the area of a portion of the detecting electrode Rx overlapping with each of the driving electrodes Tx1 to Tx3 and Tx5 to Tx10.

<Third Modification Example and Fourth Modification Example of Arrangement of Driving Electrodes and Detecting Electrodes>

Figure 19:
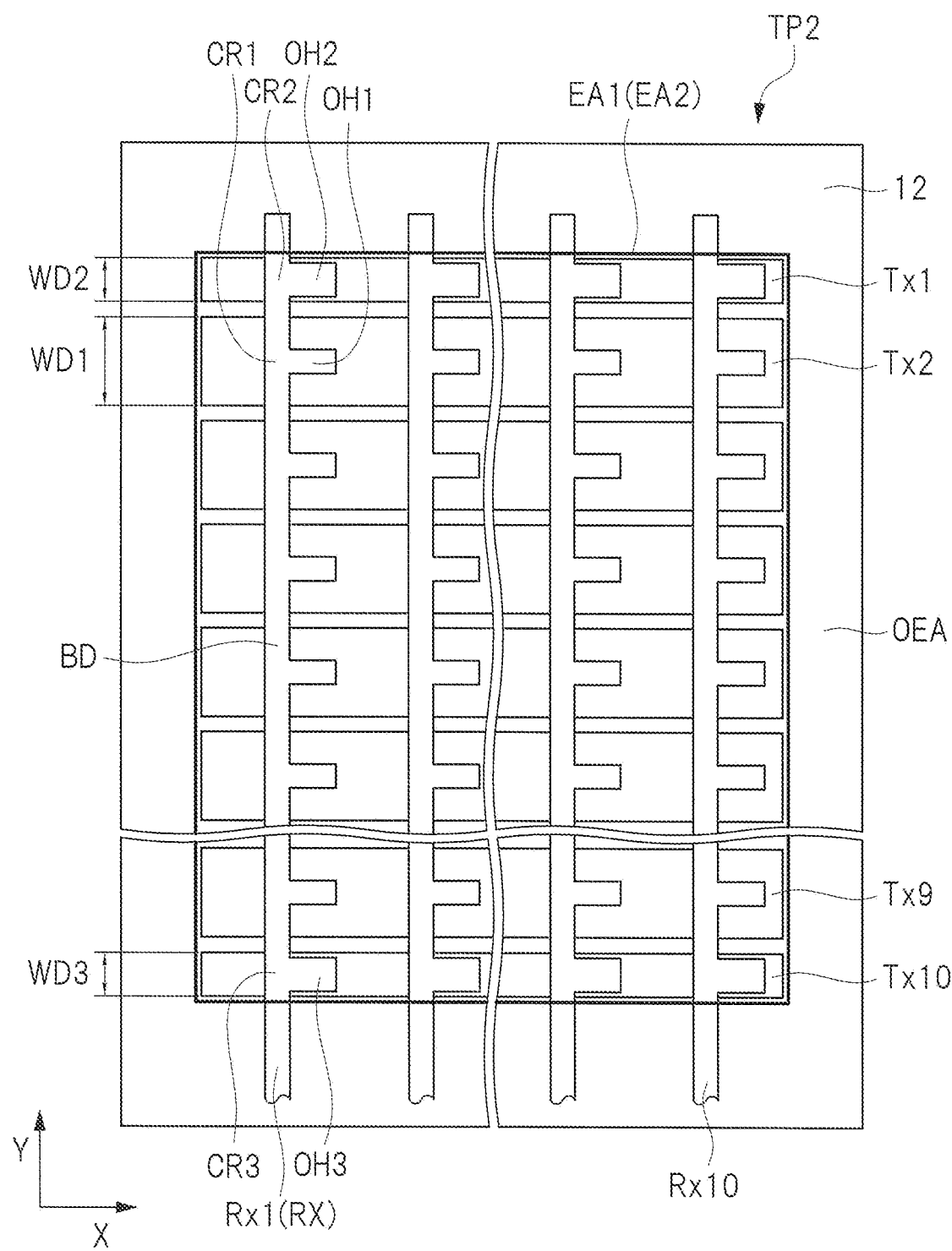
FIG. 19 is a plan view schematically showing a third modification example of the arrangement of driving electrodes and detecting electrodes in the touch panel provided in the display device of the second embodiment.
Figure 20:
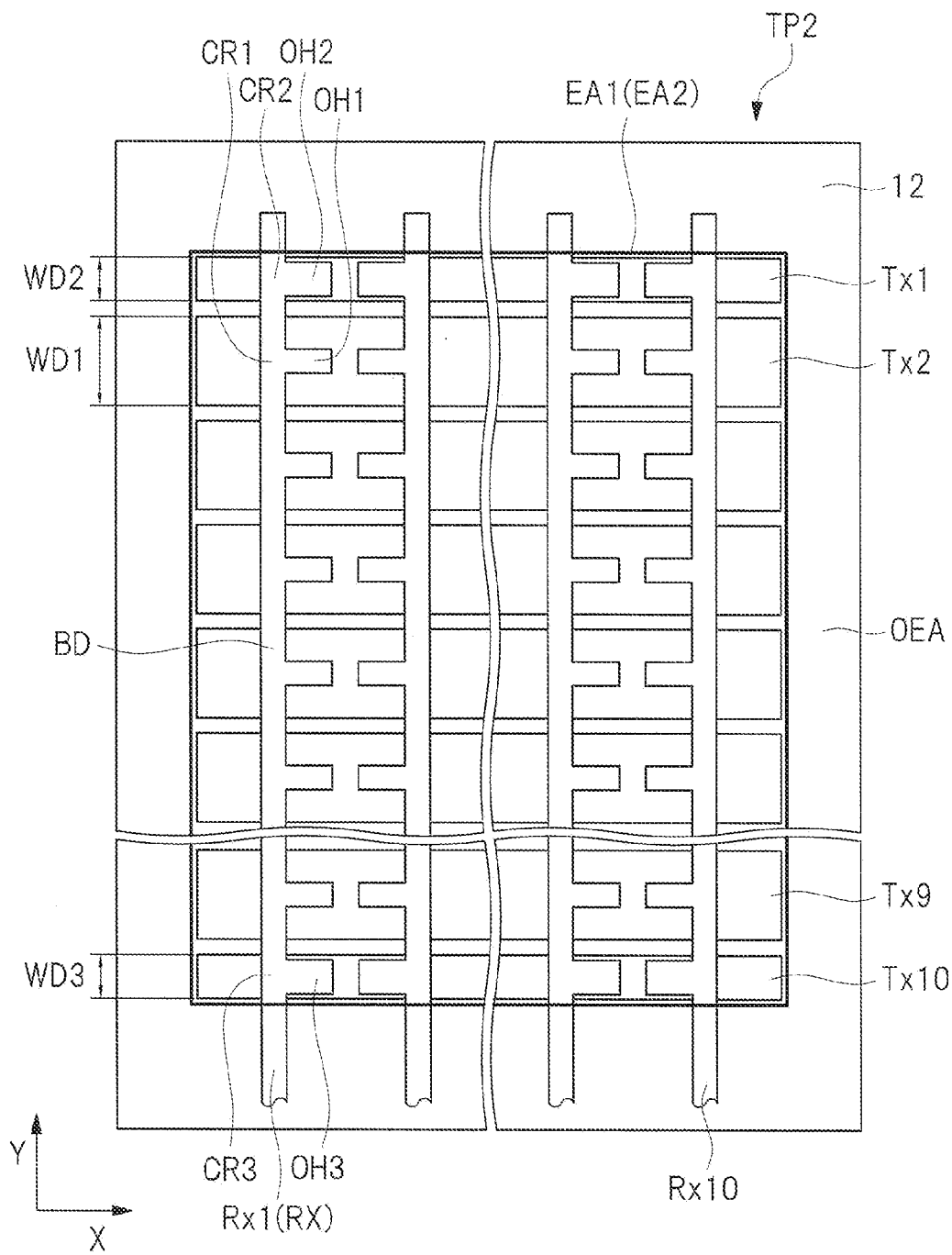
FIG. 20 is a plan view schematically showing a fourth modification example of the arrangement of driving electrodes and detecting electrodes in the touch panel provided in the display device of the second embodiment.

FIG. 19 is a plan view schematically showing a third modification example of arrangement of the driving electrodes and the detecting electrodes in the touch panel provided in the display device of the second embodiment. FIG. 20 is a plan view schematically showing a fourth modification example of arrangement of the driving electrodes and the detecting electrodes in the touch panel provided in the display device of the second embodiment. FIG. 19 and FIG. 20 show examples where the overhang portions OH1 to OH3 project to one side of the main body portion BD, but they do not project to the other side thereof. Note that, respective portions of the touch panels TP2 other than the overhang portions OH1 to OH3 in the third modification example and the fourth modification example are identical to respective portion of the touch panel TP2 in the second embodiment. Therefore, respective portions of the touch panels TP2 shown in FIG. 19 and FIG. 20 other than the overhang portions OH1 to OH3, which are members having the same functions as those of members of the touch panel TP2 shown in FIG. 16 are denoted by the same reference numerals, and repetitive descriptions thereof will be omitted.

In the third modification example shown in FIG. 19, in a plan view, the plurality of overhang portions OH1, and the overhang portions OH2 and OH3 are formed to project from the main body portion BD only in the positive direction of the X-axis direction, and the detecting electrode Rx has a comb-like shape.

In the fourth modification example shown in FIG. 20, in a plan view, the plurality of overhang portions OH1, and the overhang portions OH2 and OH3 are formed to project from the main body portion BD in the positive direction or the negative direction of the X-axis direction, and the detecting electrode Rx has a comb-like shape. In the fourth modification example, the detecting electrodes where the overhang portions OH1 to OH3 project from the main body portion BD in the positive direction of the X-axis direction and the detecting electrodes where the overhang portions OH1 to OH3 project from the main body portion in the negative direction of the X-axis direction are alternately arranged in the X-axis direction.

In each case of the third modification example and the fourth modification example, also, adjustment has been performed in the same manner as the second embodiment such that the areas of the overhang portions OH2 and OH3 become larger than the area of the overhang portion OH1. Adjustment has been performed such that the area of a portion of the detecting electrode Rx overlapping with each of the driving electrodes Tx1 and Tx10 approaches the area of a portion of the detecting electrode Rx overlapping with each of the driving electrodes Tx2 to Tx9.

<Fifth Modification Example of Arrangement of Driving Electrodes and Detecting Electrodes>

Figure 21:
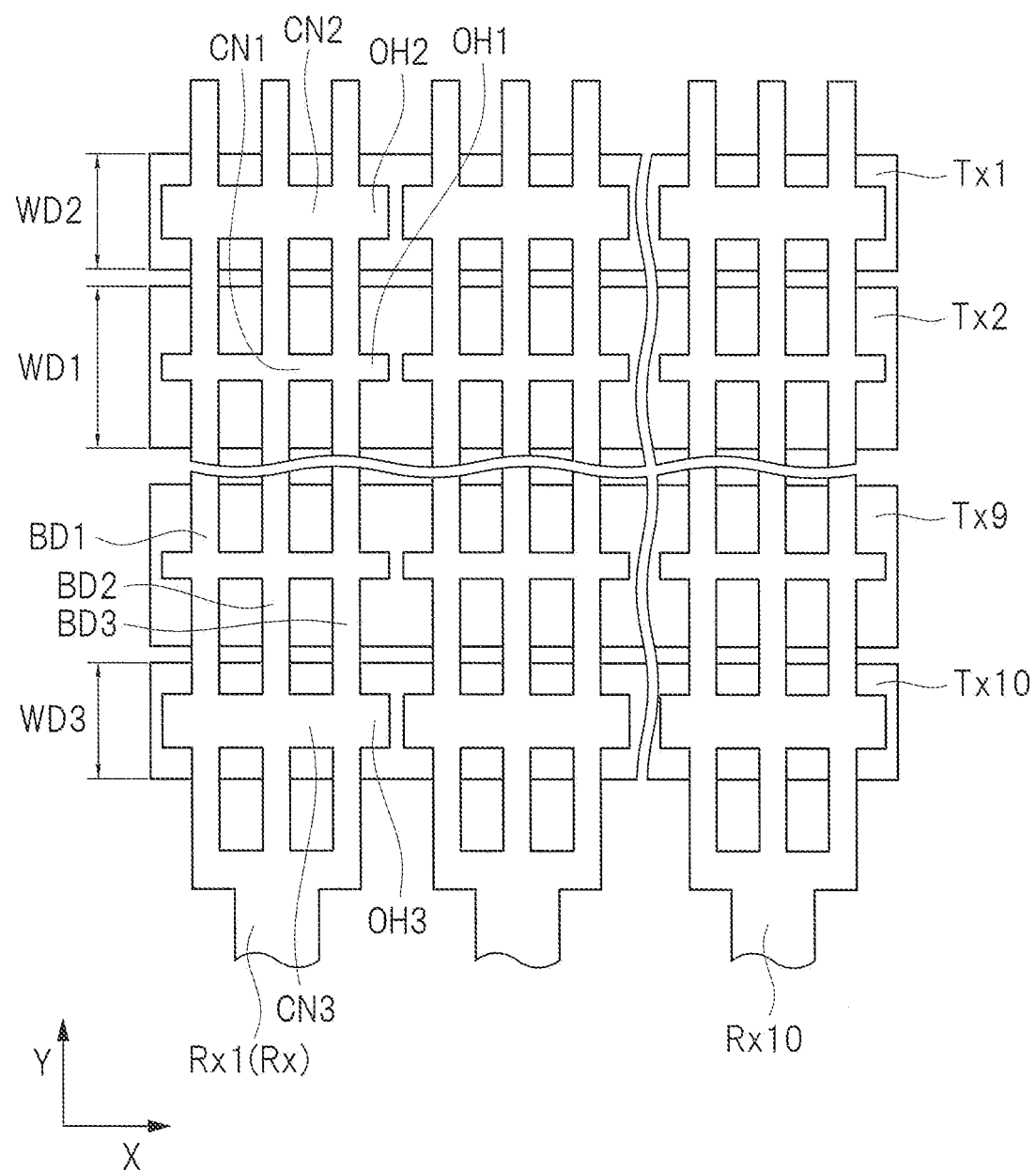
FIG. 21 is a plan view schematically showing a fifth modification example of the arrangement of driving electrodes and detecting electrodes in the touch panel provided in the display device of the second embodiment.

FIG. 21 is a plan view schematically showing a fifth modification example of an arrangement of the driving electrodes and the detecting electrodes in the touch panel provided in the display device of the second embodiment. FIG. 21 shows an example in which each of a plurality of detecting electrodes has a plurality of main body portions. Note that, in FIG. 21, illustration of the substrate 12, the display area EA1, the detecting area EA2 and the area OEA (see FIG. 16) is omitted. Further, respective portions of the touch panel other than the detecting electrodes Rx1 to Rx10, namely, the detecting electrodes Rx, in the fifth modification example are identical to respective portions of the touch panel TP2 in the second embodiment. Therefore, the respective portions of the touch panel shown in FIG. 21 other than the detecting electrodes Rx, which are members having the same functions as those of members of the touch panel TP2 shown in FIG. 16 are denoted by the same reference numerals, and repetitive descriptions thereof will be omitted.

In the fifth modification example shown in FIG. 21, the detecting electrode Rx includes three main body portions BD1, BD2 and BD3, a plurality of connecting portions CN1 and connecting portions CN2 and CN3, and a plurality of overhang portions OH1 and overhang portions OH2 and OH3.

Each of the three main body portions BD1, BD2 and BD3 in the fifth modification example can be made identical to each of the three main body portions BD1, BD2 and BD3 in the fourth modification example of the first embodiment. Note that, like the fourth modification example of the first embodiment, the present invention is not limited to the case in which the detecting electrode Rx includes three main body portions BD1, BD2 and BD3 and the detecting electrode Rx may include two, four or more main body portions.

Each of the plurality of connecting portions CN1 in the fifth modification example can be made identical to each of the plurality of connecting portions CN1 in the fourth modification example of the first embodiment. Further, each of the plurality of overhang portions OH1 in the fifth modification example can be made identical to each of the plurality of overhang portions OH1 in the fourth modification example of the first embodiment.

In a plan view, the connecting portion CN2 is formed inside an area provided with the driving electrode Tx1 so as to connect the main body portions BD1, BD2 and BD3. In a plan view, the connecting portion CN3 is formed inside an area provided with the driving electrode Tx10 so as to connect the main body portions BD1, BD2 and BD3. The connecting portions CN2 and CN3 are expanding portions for expanding the area of the detecting electrode Rx as compared with the case in which the connecting portions are not formed.

In a plan view, the overhang portions OH2 are formed inside an area provided with the driving electrode Tx1 so as to project from the main body portion BD1 in the negative direction of the X-axis direction and project from the main body portion BD3 in the positive direction of the X-axis direction. The overhang portions OH2 are expanding portions for expanding the area of the detecting electrode Rx as compared with the overhang portions OH2 are not formed.

In a plan view, the overhang portions OH3 are formed inside an area provided with the driving electrode Tx10 so as to project from the main body portion BD1 in the negative direction of the X-axis direction and project from the main body portion BD3 in the positive direction of the X-axis direction. The overhang portions OH3 are expanding portions for expanding the area of the detecting electrode Rx as compared with the overhang portions OH3 are not formed.

In the fifth modification example, adjustment has been performed such that the respective areas of the connecting portion CN2 and the overhang portion OH2 become larger than the respective areas of the connecting portion CN1 and the overhang portion OH1. That is, adjustment has been performed in the same manner as the second embodiment such that the area of a portion of the detecting electrode Rx overlapping with the driving electrode Tx1 approaches the area of a portion of the detecting electrode Rx overlapping with each of the driving electrodes Tx2 to Tx9.

Furthermore, in the fifth modification example, adjustment has been performed such that the respective areas of the connecting portion CN3 and the overhang portion OH3 become larger than the respective areas of the connecting portion CN1 and the overhang portion OH1. That is, adjustment has been performed in the same manner as the second embodiment such that the area of a portion of the detecting electrode Rx overlapping with the driving electrode Tx10 approaches the area of a portion of the detecting electrode Rx overlapping with each of the driving electrodes Tx2 to Tx9.

<Sixth Modification Example of Arrangement of Driving Electrodes and Detecting Electrodes>

Figure 22:
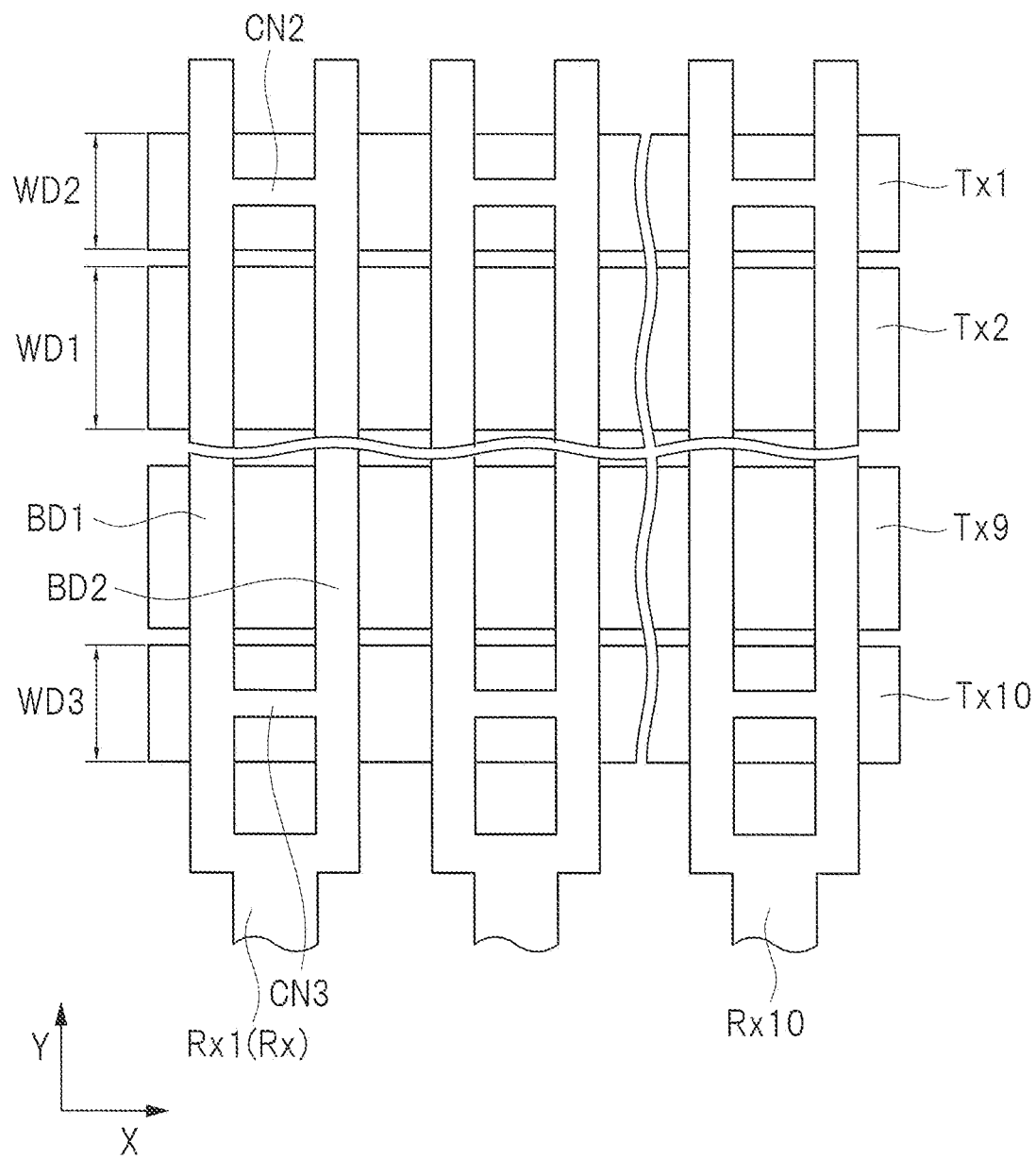
FIG. 22 is a plan view schematically showing a sixth modification example of the arrangement of driving electrodes and detecting electrodes in the touch panel provided in the display device of the second embodiment.

FIG. 22 is a plan view schematically showing a sixth modification example of arrangement of the driving electrodes and the detecting electrodes in the touch panel provided in the display device of the second embodiment. FIG. 22 shows an example in which each of a plurality of detecting electrodes has a plurality of main body portions. Note that, in FIG. 22, illustration of the substrate 12, the display area EA1, the detecting area EA2 and the area OEA (see FIG. 16) is omitted. Further, respective portions of the touch panel other than the detecting electrodes Rx1 to Rx10, namely, the detecting electrodes Rx, in the sixth modification example are identical to respective portions of the touch panel TP2 in the second embodiment. Therefore, members of the touch panel shown in FIG. 22 other than the detecting electrodes Rx, which are members having the same functions as those of members of the touch panel TP2 shown in FIG. 16 are denoted by the same reference numerals, and repetitive descriptions thereof will be omitted.

In the sixth modification example shown in FIG. 22, the detecting electrode Rx includes two main body portions BD1 and BD2, and connecting portions CN2 and CN3.

Each of the two main body portions BD1 and BD2 in the sixth modification example can be made identical to each of the two main body portions BD1 and BD2 in the fifth modification example of the first embodiment. Note that, the present invention is not limited to the case in which the detecting electrode Rx includes two main body portions BD1 and BD2 but the detecting electrode Rx may include three or more main body portions like the fifth modification example of the first embodiment.

In a plan view, the connecting portion CN2 is formed inside an area provided with the driving electrode Tx1 so as to connect the main body portions BD1 and BD2. In a plan view, the connecting portion CN3 is formed inside an area provided with the driving electrode Tx10 so as to connect the main body portions BD1 and BD2. The connecting portions CN2 and CN3 are expanding portions for expanding the area of the detecting electrode Rx as compared with a case in which the connecting portions CN2 and CN3 are not formed.

On the other hand, as shown in FIG. 22, such a configuration can be adopted that the connecting portion or the overhang portion as the expanding portion for expanding the area of the detecting electrode Rx is not formed inside an area provided with each of the driving electrodes Tx2 to Tx9 in a plan view.

In the sixth modification example, in the same manner as the second embodiment, adjustment has been performed by forming the connecting portions CN2 and CN3 such that the area of a portion of the detecting electrode Rx overlapping with each of the driving electrodes Tx1 and Tx10 approaches the area of a portion of the detecting electrode Rx overlapping with each of the driving electrodes Tx2 to Tx9.

<Electrostatic Capacitance Between Driving Electrode and Detecting Electrode>

Next, the electrostatic capacitance between the driving electrode and the detecting electrode will be described with reference to first comparative example in the same manner as the first embodiment. As described above with reference to FIG. 13, the detecting electrode Rx includes the main body BD and the overhang portions OH1 to OH3 in the first comparative example. In first comparative example, in a different manner from the second embodiment, the width WR2 of the overhang portion OH2 is equal to the width WR1 of the overhang portion OH1, and the width WR3 of the overhang portion OH3 is equal to the width WR1 of the overhang portion OH1.

In first comparative example, also, in the same manner as the second embodiment, the width WD2 of the driving electrode Tx1 is smaller than the respective widths WD1 of the driving electrodes Tx2 to Tx9. Therefore, the area S2 of a portion of the detecting electrode Rx overlapping with the driving electrode Tx1 becomes smaller than the area S1 of a portion of the detecting electrode Rx overlapping with each of the driving electrodes Tx2 to Tx9. Further, the width WD3 of the driving electrode Tx10 is smaller than the respective widths WD1 of the driving electrodes Tx2 to Tx9. Therefore, the area S3 of a portion of the detecting electrode Rx overlapping with driving electrode Tx10 becomes smaller than the area S1 of a portion of the detecting electrode Rx overlapping with each of the driving electrodes Tx2 to Tx9. Therefore, the electrostatic capacitance between each of the driving electrodes Tx1 and Tx10 and the detecting electrode Rx becomes smaller than each of the driving electrodes Tx2 to Tx9 and the detecting electrode Rx.

Therefore, in the touch panel TP100 of the first comparative example, as described above with reference to FIG. 14, a difference, namely, a tolerance of the detected capacitance detected when a driving voltage has been applied to each of the driving electrodes Tx1 and Tx10 to the lower limit LL1 of the ACD range becomes small, so that a noise immunity of the detected capacitance lowers. As a result, in the touch panel TP100 of the first comparative example, there is a possibility that the position detection accuracies lower or the position detection sensitivities lower on the driving electrodes Tx1 and Tx10 lower as compared with on the driving electrodes Tx2 to Tx9.

<Main Feature and Advantageous Effect of this Embodiment>

In the second embodiment and the first modification example to the sixth modification example thereof, in a plan view, the detecting electrode Rx is arranged in the area provided with the driving electrodes Tx1 and Tx10, and the detecting electrode Rx includes, for example, the overhang portions OH2 and OH3, or the connecting portions CN2 and CN3 as the expanding portions for expanding the area of the detecting electrode Rx. The overhang portions OH2 and OH3 will be described below on behalf of the overhang portions OH2 and OH3 or the connecting portions CN2 and CN3.

Adjustment has been performed such that the respective areas of the overhang portions OH2 and OH3 become larger than the area of the overhang portion OH1, and adjustment has been performed such that the area of a portion of the detecting electrode Rx overlapping with each of the driving electrodes Tx1 and Tx10 approaches the area of a portion of the detecting electrode Rx overlapping with each of the driving electrodes Tx2 to Tx9. Therefore, adjustment can be performed such that the electrostatic capacitance between each of the driving electrodes Tx1 and Tx10 and the detecting electrode Rx approaches the electrostatic capacitance between each of the driving electrodes Tx1 and Tx10 and the detecting electrode Rx. Therefore, the electrostatic capacitance between each of the driving electrodes Tx1 and Tx10 and the detecting electrode Rx can be prevented or inhibited from becoming smaller than the electrostatic capacitance between each of the driving electrodes Tx2 to Tx9 and the detecting electrode Rx.

FIG. 15 described above is also a graph showing the detected capacitance detected when a driving voltage has been applied to each of the plurality of driving electrodes in Example 3 and Example 4 which are examples of the second embodiment. As shown in FIG. 15, in Example 3 and Example 4, also, it is assumed that the electrostatic capacitances, namely, the detected capacitances detected when a driving voltage has been applied to the respective driving electrodes Tx2 to Tx9 take a constant value CST1.

Here, respective areas of the overhang portions OH2 and OH3 are preferably adjusted such that the electrostatic capacitances, namely, the detected capacitances detected when a driving voltage has been applied to the respective driving electrodes Tx1 and Tx10 fall within the range of ±10% to the constant value CST1. The case in which the detecting electrode Rx includes the overhang portions OH2 and OH3 thus adjusted is shown as Example 3 shown in FIG. 15.

In Example 3 shown in FIG. 15, the differences, namely, the tolerances of the detected capacitances detected when a driving voltage has been applied to the respective driving electrodes Tx1 and Tx10 to the lower limit LL1 of the ADC range can be inhibited from becoming small, as compared with first comparative example shown in FIG. 14. A noise immunity of the detected capacitances detected when a driving voltage has been applied to the respective driving electrodes Tx1 and Tx10 can be inhibited from lowering. As a result, the position detection accuracies can be prevented or inhibited from lowering on the driving electrodes Tx1 and Tx10 and the position detection sensitivities can be prevented or inhibited from lowering thereon as compared with on the driving electrodes Tx2 to Tx9. Therefore, the position detection performance in the display device can be improved.

Further, preferably, the respective areas of the overhang portions OH2 and OH3 are adjusted such that the detected capacitances detected when a driving voltage has been applied to the respective driving electrodes Tx1 and Tx10 become equal to the constant value CST1. The case in which the detecting electrode Rx includes the overhang portions OH2 and OH3 thus adjusted is shown as Example 4 shown in FIG. 15.

In Example 4 shown in FIG. 15, the tolerances of the detected capacitances detected when a driving voltage has been applied to the respective driving electrodes Tx1 and Tx10 to the lower limit LL1 of the ADC range can be inhibited from becoming small further securely as compared with first comparative example shown in FIG. 14. The noise immunity of the detected capacitances detected when a driving voltage has been applied to the respective driving electrodes Tx1 and Tx10 can be inhibited from lowering further securely. As a result, the position detection accuracies can be prevented or inhibited from lowering further securely on the driving electrodes Tx1 and Tx10 and the position detection sensitivities can be prevented or inhibited from lowering further securely thereon as compared with the on the driving electrodes Tx2 to Tx9. Therefore, the position detection performance in the display device can be improved.

(Third Embodiment)

In the second embodiment, adjustment has been performed such that the area of a portion of the detecting electrode overlapping with the driving electrode having a width smaller than those of the other driving electrodes becomes larger than the area of a portion of the detecting electrode overlapping with each of the other driving electrodes in a plan view. On the other hand, in the third embodiment, adjustment has been performed such that the area of a portion of the detecting electrode overlapping with the driving electrode having a width larger than those of the other driving electrodes becomes smaller than the area of a portion of the detecting electrode overlapping with each of the other driving electrodes in a plan view.

Since respective portions of the display device of the third embodiment other than a touch panel TP3 are identical to the respective portions of the display device of the first embodiment other than the touch panel TP1, descriptions thereof are omitted.

<Arrangement of Driving Electrodes and Detecting Electrodes>

Figure 23:
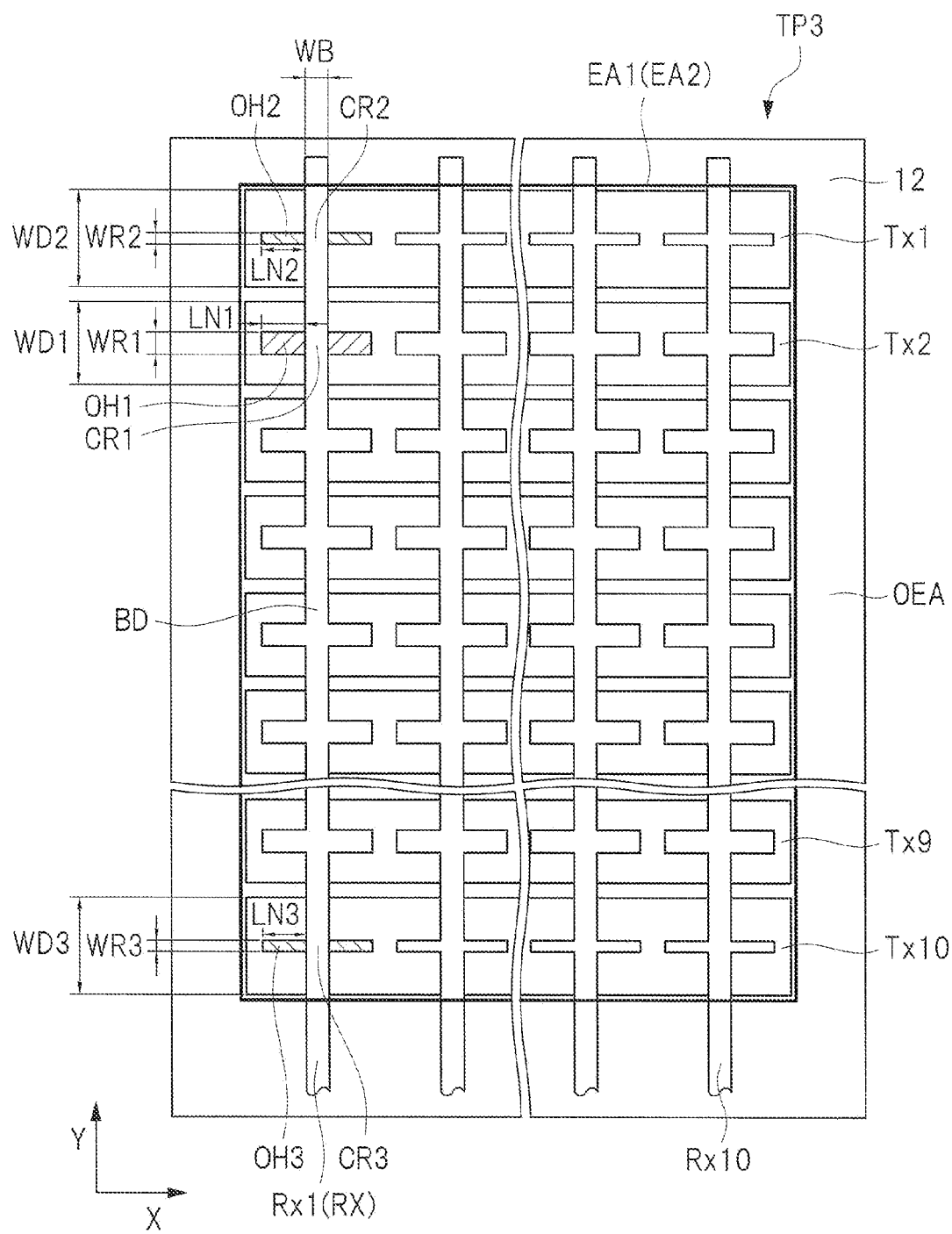
FIG. 23 is a plan view schematically showing an arrangement of driving electrodes and detecting electrodes in a touch panel provided in a display device of a third embodiment.

FIG. 23 is a plan view schematically showing an arrangement of driving electrodes and detecting electrodes in a touch panel provided in a display device of the third embodiment.

Note that, respective portions of the touch panel TP3 other than the detecting electrodes Rx1 to Rx10, namely, the detecting electrodes Rx in the third embodiment are identical to respective portions of the touch panel TP1 in the first embodiment except for the widths WD1, WD2, and WD3 of the driving electrodes Tx1 to Tx10. Therefore, respective portions of the touch panel TP3 shown in FIG. 23 other than the driving electrodes Rx, having the same functions as those of the members of the touch panel TP1 shown in FIG. 7 are denoted by the same reference numerals, and descriptions thereof are omitted except for the widths WD1, WD2, and WD3 of the driving electrodes Tx1 to Tx10. Note that, the driving electrodes Tx1 to Tx10 are arranged inside the display area EA1 in a section perpendicular to the X-axis direction.

In the third embodiment, the respective widths WD1 of the driving electrodes Tx2 to Tx9 are equal to one another in the same manner as the first embodiment. In the third embodiment, however, in a different manner from the first embodiment, the width WD2 of the driving electrode Tx1 is larger than the respective widths WD1 of the driving electrodes Tx2 to Tx9 and the width WD3 of the driving electrode Tx10 is larger than the respective widths WD1 of the driving electrodes Tx2 to Tx9.

As described above in the first embodiment, the respective widths WD1 of the driving electrodes Tx2 to Tx9 are an integral multiple of an arrangement period or a width of pixel electrodes, but since the number of pixels in the Y-axis direction is determined according to a specification required as the display device, such a case sometimes occurs that the number of pixels in the Y-axis direction cannot be divided by the number of pixels per one of the driving electrodes Tx. In such a case, a broken number which has occurred due to the indivisibility is allocated to, for example, the driving electrodes Tx on both sides of an arrangement of the driving electrodes Tx in a divisional fashion, and the widths obtained by multiplying the respective allocated broken numbers by the arrangement period or the width of the pixel electrodes in the Y-axis direction are set as the widths WD2 and DW3 of the driving electrodes Tx1 and Tx10, respectively.

However, when the allocated broken numbers are relatively small, such as 1 or 2, it is sometimes difficult to set the widths obtained by multiplying the allocated broken numbers by the arrangement period or the width of the pixel electrodes in the Y-axis direction as the widths WD2 and WD3 of the driving electrodes Tx1 and Tx10, respectively, for example, in view of a manufacturing process. In such a case, the widths obtained by multiplying the number of pixels obtained by adding the allocated numbers to the number of pixels per one driving electrode Tx by the arrangement period or the width of the pixel electrodes in the Y-axis direction are set as the widths WD2 and WD3 of the driving electrodes Tx1 and Tx10, respectively. Thus, the widths WD2 and WD3 of the driving electrodes Tx1 and Tx10 become larger than the respective widths WD1 of the driving electrodes Tx2 to Tx9.

For example, it is considered that 103 pixels are arranged in the Y-axis direction and one driving electrode Tx is allocated to each 10 pixels. In this case, the remaining three pixels occurring by dividing 103 pixels into respective groups of 10 pixels are divided into one pixel and two pixels, and the widths of the pixel electrodes corresponding to the numbers of pixels obtained by adding the one pixel and the two pixels to the 10 pixels, respectively, are set as the widths of the driving electrodes on both ends of the arrangement of the driving electrodes Tx. Therefore, for example, setting can be performed such that the respective widths WD1 of the driving electrodes Tx2 to Tx9 are widths corresponding to 10 pixels, the width WD2 of the driving electrode Tx1 is a width corresponding to 11 pixels, and the width WD3 of the driving electrode Tx10 is a width corresponding to 12 pixels.

In the third embodiment, in the same manner as the first embodiment, an intersection portion between each of the driving electrodes Tx2 to Tx9 and the detecting electrode Rx is represented as CR1, an intersection portion between the driving electrode Tx1 and the detecting electrode Rx is represented as CR2, and an intersection portion between the driving electrode Tx10 and the detecting electrode Rx is represented as CR3. Further, the electrostatic capacitance between each of the driving electrodes Tx2 to Tx9 and the detecting electrode Rx, namely, the electrostatic capacitance formed at the intersection portion CR1, is represented as CP1. Further, the electrostatic capacitance between the driving electrode Tx1 and the detecting electrode Rx, namely, the electrostatic capacitance formed at the intersection portion CR2, is represented as CP2, and the electrostatic capacitance between the driving electrode Tx10 and the detecting electrode Rx, namely, the electrostatic capacitance formed at the intersection portion CR3, is represented as CP3. Here, an input position is detected based upon the electrostatic capacitances CP1, CP2, and CP3.

The detecting electrode Rx includes a main body portion BD, and a plurality of overhang portions OH1 and overhang portions OH2 and OH3. The main body portion BD extends in the Y-axis direction, and the width of the main body portion BD in the X-axis direction is represented as WB. Note that, in FIG. 23, the overhang portions OH1 formed inside an area provided with the driving electrode Tx2, and the overhang portions OH2 and OH3 are hatched.

Each of the plurality of overhang portions OH1 in the third embodiment can be made identical with each of the plurality of overhang portions OH1 in the first embodiment.

In a plan view, the overhang portions OH2 are formed inside an area provided with the driving electrode Tx1, namely inside the intersection portion CR2 to overhang from the main body portion BD in the positive direction and the negative direction of the X-axis direction, respectively. The overhang portion OH2 is an expanding portion for expanding the area of the detecting electrode Rx as compared with the case in which the overhang portion OH2 is not formed.

In a plan view, the overhang portions OH3 are formed inside an area provided with the driving electrode Tx10, namely inside the intersection portion CR3 to overhang from the main body portion BD in the positive direction and the negative direction of the X-axis direction, respectively. The overhang portion OH3 is an expanding portion for expanding the area of the detecting electrode Rx as compared with the case in which the overhang portion OH3 is not formed.

In the third embodiment, also, in the same manner as the first embodiment, the area of a portion of the detecting electrode Rx overlapping with each of the driving electrodes Tx2 to Tx9 is represented as S1, the area of a portion of the detecting electrode Rx overlapping with the driving electrode Tx1 is represented as S2, and the area of a portion of the detecting electrode Rx overlapping with the driving electrode Tx10 is represented as S3. Here, the area of the overhang portion OH2 has been adjusted such that the area S2 approaches the area S1, and the area of the overhang portion OH3 has been adjusted such that the area S3 approaches the area S1. Further, preferably, the area of the overhang portion OH2 has been adjusted such that the area S2 becomes equal to the area S1 and the area of the overhang portion OH3 has been adjusted such that the area S3 becomes equal to the area S1.

Note that, the expression "the area S2 approaches the area S1" means that the ratio of the area S2 to the area S1 approaches 1, and it preferably means, for example, that the ratio of the area S2 to the area S1 falls within the range of 0.9 to 1.1. Further, the expression "the area S3 approaches the area S1" means that the ratio of the area S3 to the area S1 approaches 1, and it preferably means, for example, that the ratio of the area S3 to the area S1 falls within the range of 0.9 to 1.1. That is, the expression "the second area approaches the first area" means that the ratio of the second area to the first area approaches 1, and it preferably means, for example, that the ratio of the second area to the first area falls within the range of 0.9 to 1.1 (the same goes to modification examples of the third embodiment).

In the third embodiment, also, in the same manner as the first embodiment, the length of the overhang portion OH1 in the X-axis direction is represented as LN1, and the width of the overhang portion OH1 in the Y-axis direction is represented as WR1. Further, the length of the overhang portion OH2 in the X-axis direction is represented as LN2, and the width of the overhang portion OH2 in the Y-axis direction is represented as WR2. Further, the length of the overhang portion OH3 in the X-axis direction is represented as LN3, and the width of the overhang portion OH3 in the Y-axis direction is represented as WR3.

In the third embodiment, also, in the same manner as the first embodiment, for example, it is assumed that the length LN1 of the overhang portion OH1, the length LN2 of the overhang portion OH2, and the length LN3 of the overhang portion OH3 are equal to each other. Here, adjustment has been performed such that the width WR2 of the overhang portion OH2 is smaller than the width WR1 of the overhang portion OH1, and adjustment has been performed such that the width WR3 of the overhang portion OH3 is smaller than the width WR1 of the overhang portion OH1. That is, adjustment has been performed such that the area SO2 of the overhang portion OH2 which is a product of the length LN2 and the width WR2 becomes smaller than the area SO1 of the overhang portion OH1 which is a product of the length LN1 and the width WR1. Adjustment has been performed such that the area SO3 of the overhang portion OH3 which is a product of the length LN3 and the width WR3 becomes smaller than the area SO1 of the overhang portion OH1 which is a product of the length LN1 and the width WR1.

Furthermore, the area SB1 of the portion of the main body portion BD overlapping with each of the driving electrodes Tx2 to Tx9 is represented by a product of the width WB and the width WD1. The area SB2 of the portion of the main body portion BD overlapping with the driving electrode Tx1 is represented by a product of the width WB and the width WD2, and the area SB3 of the portion of the main body portion BD overlapping with the driving electrode Tx10 is represented by a product of the width WB and the width WD3. Therefore, the area S1 of the portion of the detecting electrode Rx overlapping with each of the driving electrodes Tx2 to Tx9 is represented by the above-mentioned Equation (1). The area S2 of the portion of the detecting electrode Rx overlapping with the driving electrode Tx1 is represented by the above-mentioned Equation (2), and the area S3 of the portion of the detecting electrode Rx overlapping with the driving electrode Tx10 is represented by the above-mentioned Equation (3).

As described above, since the width WD2 is larger than the width WD1 and the width WD3 is larger than WD1, the area SB2 is larger than the area SB1 and the area SB3 is larger than SB1. Therefore, when the area SO2 of the overhang portion OH2 is equal to the area SO1 of the overhang portion OH1, the area S2 is larger than the area S1, so that the electrostatic capacitance between the driving electrode Tx1 and the detecting electrode Rx becomes larger than the electrostatic capacitance between each of the driving electrodes Tx2 to Tx9 and the detecting electrode Rx. Further, when the area SO3 of the overhang portion OH3 is equal to the area SO1 of the overhang portion OH1, the area S3 is larger than the area S1, so that the electrostatic capacitance between the driving electrode Tx10 and the detecting electrode Rx becomes larger than the electrostatic capacitance between each of the driving electrodes Tx2 to Tx9 and the detecting electrode Rx.

In the third embodiment, however, for example, since the width WR2 is smaller than the width WR1, adjustment has been performed that the area SO2 of the overhang portion OH2 becomes smaller than the area SO1 of the overhang portion OH1. Adjustment has been performed such that the area S2 of the portion of the detecting electrode Rx overlapping with the driving electrode Tx1 approaches the area S1 of the portion of the detecting electrode Rx overlapping with each of the driving electrodes Tx2 to Tx9. Therefore, adjustment can be performed such that the electrostatic capacitance between the driving electrode Tx1 and the detecting electrode Rx approaches the electrostatic capacitance between each of the driving electrodes Tx2 to Tx9 and the detecting electrode Rx.

Further, in the third embodiment, for example, since the width WR3 is smaller than the width WR1, adjustment has been performed that the area SO3 of the overhang portion OH3 becomes smaller than the area SO1 of the overhang portion OH1. Adjustment has been performed such that the area S3 of the portion of the detecting electrode Rx overlapping with the driving electrode Tx10 approaches the area S1 of the portion of the detecting electrode Rx overlapping with each of the driving electrodes Tx2 to Tx9. Therefore, adjustment can be performed such that the electrostatic capacitance between the driving electrode Tx10 and the detecting electrode Rx approaches the electrostatic capacitance between each of the driving electrodes Tx2 to Tx9 and the detecting electrode Rx.

That is, in the third embodiment, adjustment has been performed such that the area of a portion of the detecting electrode overlapping with the driving electrode having a width larger than those of the other driving electrodes approaches the area of the portion of the detecting electrode overlapping with each of the other driving electrodes in a plan view.

Further, in the third embodiment, when the driving electrodes having a width larger than those of the other driving electrodes are arranged on both sides of the arrangement of the other driving electrodes, adjustment can be performed such that the electrostatic capacitance between the driving electrode having the larger width and the detecting electrode approaches the electrostatic capacitance between each of the other driving electrodes and the detecting electrode.

Further, in the third embodiment, in order to adjust the electrostatic capacitance between the driving electrode having the width larger than those of the other driving electrodes and the detecting electrode, the expanding portion for expanding the area of the detecting electrode is provided inside the display area in a plan view.

<First Modification Example of Arrangement of Driving Electrodes and Detecting Electrodes>

Figure 24:
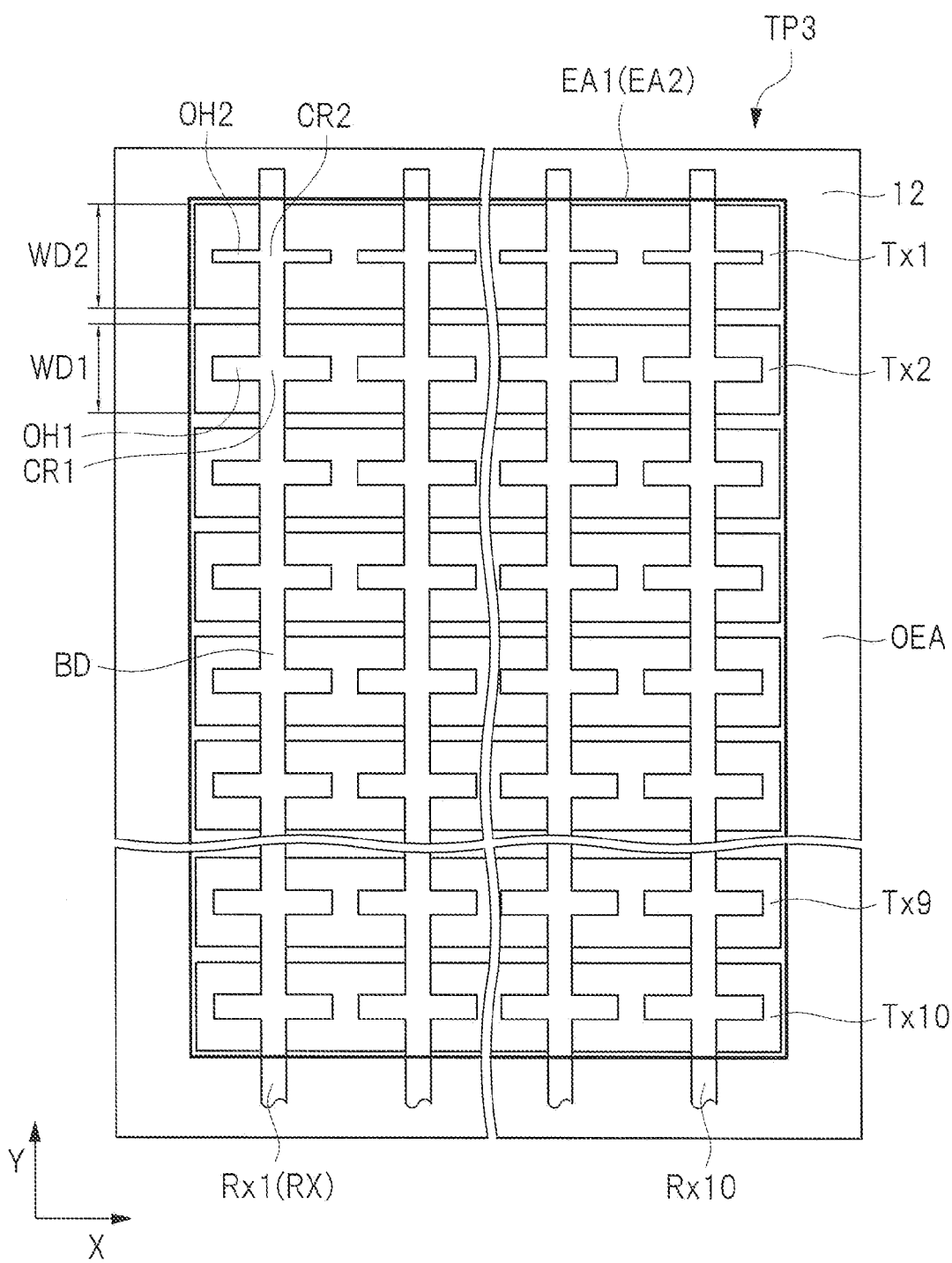
FIG. 24 is a plan view schematically showing a first modification example of the arrangement of driving electrodes and detecting electrodes in the touch panel provided in a display device of the third embodiment.

FIG. 24 is a plan view schematically showing a first modification example of arrangement of the driving electrodes and the detecting electrodes in the touch panel provided in the display device of the third embodiment. FIG. 24 shows an example in which the width of the driving electrode Tx1 is larger than the respective widths of the driving electrodes Tx2 to Tx9 but the width of the driving electrode Tx10 is equal to the respective widths of the driving electrodes Tx2 to Tx9. Note that, members of the touch panel TP3 shown in FIG. 24 having the same functions as those of the members of the touch panel TP3 shown in FIG. 23 are denoted by the same reference numerals and descriptions thereof are omitted.

In the first modification example, the respective widths WD1 of the driving electrodes Tx2 to Tx10 are equal to one another and the width WD2 of the driving electrode Tx1 is larger than the respective widths WD1 of the driving electrodes Tx2 to Tx10.

The detecting electrode Rx includes the main body portion BD, and the plurality of overhang portions OH1 and the overhang portions OH2, but it does not include the overhang portions OH3 (see FIG. 23). That is, the overhang portions OH1 are formed inside an area provided with the driving electrode Tx10.

Each of the plurality of overhang portions OH1 in the first modification example can be made identical to each of the plurality of overhang portions OH1 in the third embodiment. Further, the overhang portion OH2 in the first modification example can be made identical to the overhang portion OH2 in the third embodiment.

In the first modification example, like the third embodiment, adjustment has been performed such that the area of the overhang portion OH2 becomes smaller than the area of the overhang portion OH1, and adjustment has been performed such that the area of a portion of the detecting electrode Rx overlapping with the driving electrode Tx1 approaches the area of a portion of the detecting electrode Rx overlapping with each of the driving electrodes Tx2 to Tx10. Therefore, adjustment can be performed such that the electrostatic capacitance between the driving electrode Tx1 and the detecting electrode Rx approaches the electrostatic capacitance between each of the driving electrodes Tx2 to Tx10 and the detecting electrode Rx.

That is, even when the driving electrode having a width larger than those of the other driving electrodes is arranged only outside one side of the arrangement of the other driving electrodes, adjustment can be performed such that the electrostatic capacitance between the driving electrode having the larger width and the detecting electrode approaches the electrostatic capacitance between each of the other driving electrodes and the detecting electrode.

<Second Modification Example of Arrangement of Driving Electrodes and Detecting Electrodes>

Figure 25:
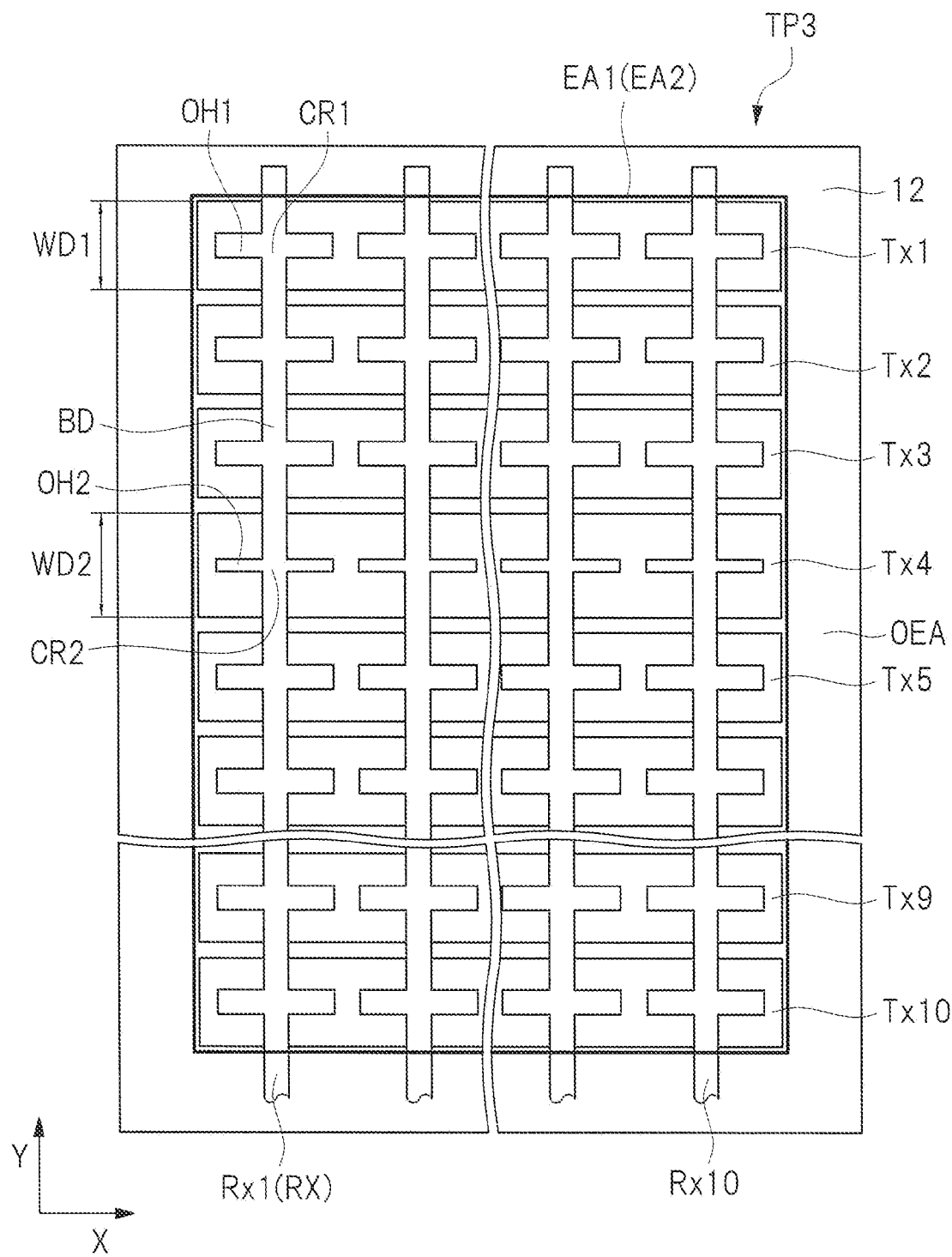
FIG. 25 is a plan view schematically showing a second modification example of the arrangement of driving electrodes and detecting electrodes in the touch panel provided in a display device of the third embodiment.

FIG. 25 is a plan view schematically showing a second modification example of an arrangement of driving electrodes and detecting electrodes in the touch panel provided in the display device of the third embodiment. FIG. 25 shows an example in which the driving electrode having a width larger than those of the other driving electrodes is not arranged outside the arrangement of the other driving electrodes but it is arranged in the middle of arrangement of the other driving electrodes. Note that, members of the touch panel TP3 shown in FIG. 25 having the same functions as those of the members of the touch panel TP3 shown in FIG. 23 are denoted by the same reference numerals and descriptions thereof are omitted.

In the second modification example, in a plan view, the respective widths of the driving electrodes Tx1 to Tx3 and Tx5 to Tx10 in the Y-axis direction are represented as WD1 and the width, in the Y-axis direction, of the driving electrode Tx4 arranged in the middle of the arrangement of the driving electrodes is represented as WD2. Here, the respective widths WD1 of the driving electrodes Tx1 to Tx3 and Tx5 to Tx10 are equal to one another, and the width WD2 of the driving electrode Tx4 is larger than the respective widths WD1 of the driving electrodes Tx1 to Tx3 and Tx5 to Tx10.

For example, according to a specification required as a display device or the like, a driving electrode having a width obtained by multiplying the number of pixels obtained by adding a broken number which has occurred due to the indivisibility of the number of pixels in the Y-axis direction to the number of pixels per one driving electrode Tx by the arrangement period or the width of pixel electrodes may not be arranged outside the arrangement of the driving electrodes but it may be arranged in the middle of the arrangement of the driving electrodes. In such a case, for example, the width WD2 of the driving electrode Tx4 which is the driving electrode arranged in the middle of the arrangement of the driving electrodes is made larger than the respective widths WD1 of the driving electrodes Tx1 to Tx3 and Tx5 to Tx10 which are the other driving electrodes.

Note that, the widths WD1 may also be made different between the driving electrodes Tx1 to Tx3 and the driving electrodes Tx5 to Tx10. Further, in the second modification example, the example in which the driving electrode having a width larger than those of the other driving electrodes is arranged at the fourth position in the arrangement of the driving electrodes is described, but the position of the driving electrode having the larger width is not limited to the fourth position but it may be any position in the middle portion of the arrangement.

In the second modification example, the intersection portion between each of the driving electrodes Tx1 to Tx3 and Tx5 to Tx10 and the detecting electrode Rx is represented as CR1, and the intersection portion between the driving electrode Tx4 and the detecting electrode Rx is represented as CR2. Further, the electrostatic capacitance between each of the driving electrodes Tx1 to Tx3 and Tx5 to Tx10 and the detecting electrode Rx is represented as CP1, and the electrostatic capacitance between the driving electrode Tx4 and the detecting electrode Rx is represented as CP2. Here, an input position is detected based upon the electrostatic capacitances CP1 and CP2.

Each of the plurality of overhang portions OH1 in the second modification example can be made equal to each of the plurality of overhang portions OH1 in the third embodiment. Furthermore, the overhang portion OH2 in the second modification example may be made equal to the overhang portion OH2 in the third embodiment.

In the second modification example, also, adjustment has been performed like the third embodiment such that the area of the overhang portion OH2 becomes smaller than the area of the overhang portion OH1. Adjustment has been performed such that the area of a portion of the detecting electrode Rx overlapping with the driving electrode Tx4 approaches the area of a portion of the detecting electrode Rx overlapping with each of the driving electrodes Tx1 to Tx3 and Tx5 to Tx10.

<Third Modification Example of Arrangement of Driving Electrodes and Detecting Electrodes>

Figure 26:
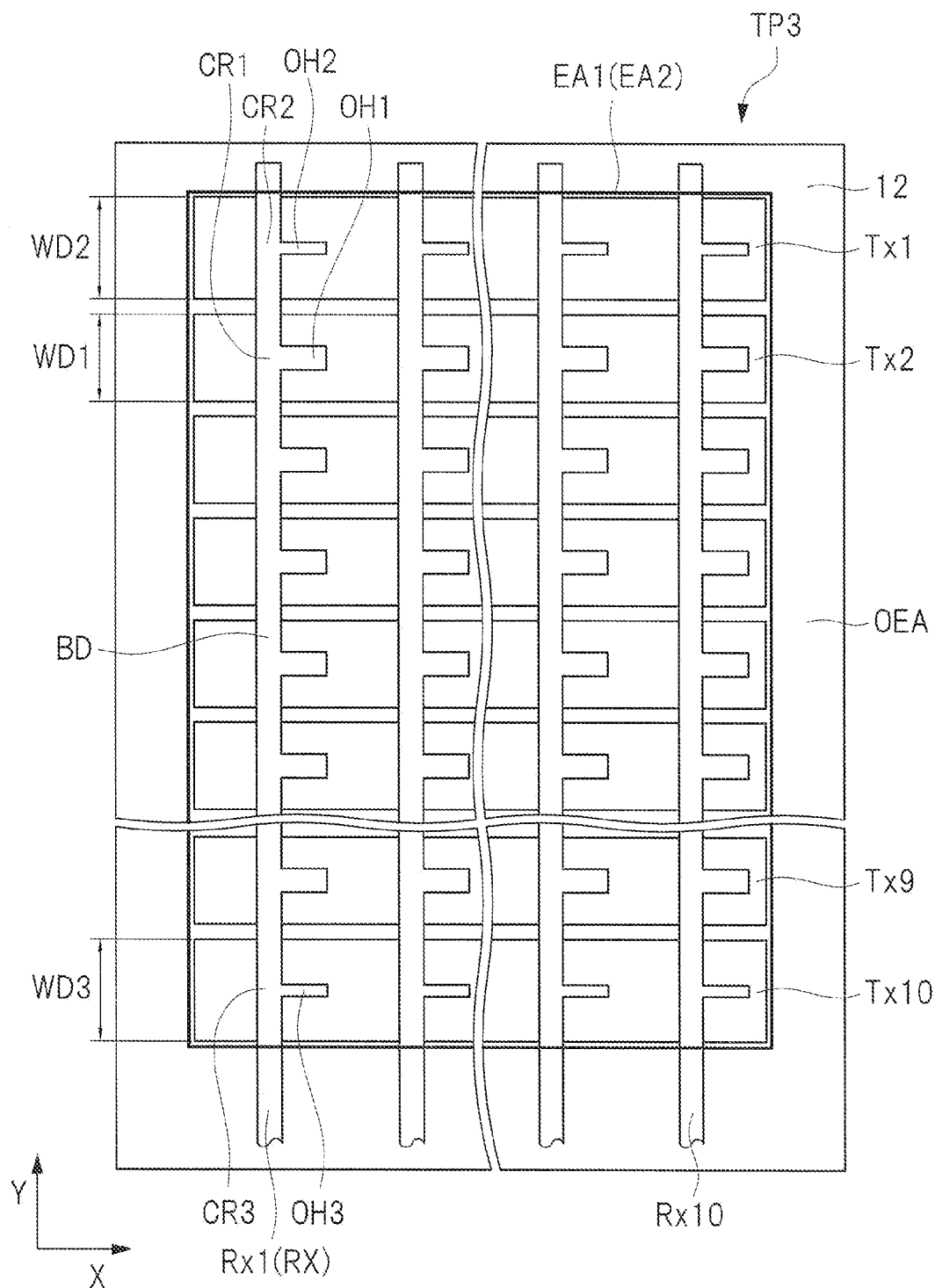
FIG. 26 is a plan view schematically showing a third modification example of the arrangement of driving electrodes and detecting electrodes in the touch panel provided in a display device of the third embodiment.

FIG. 26 is a plan view schematically showing a third modification example of arrangement of driving electrodes and detecting electrodes in the touch panel provided in the display device of the third embodiment. FIG. 26 shows an example in which the overhang portions OH1 to OH3 project to one side of the main body portion BD, but they do not project to the other side of the main body portion BD. Note that, respective portions of the touch panels TP3 other than the overhang portions OH1 to OH3 in the third modification example are identical to the respective portion in the touch panel TP3 in the third embodiment. Therefore, respective portions of the touch panels TP3 shown in FIG. 26 other than the overhang portions OH1 to OH3, which are members having the same functions as those of members of the touch panel TP3 shown in FIG. 23 are denoted by the same reference numerals, and repetitive descriptions thereof will be omitted.

In the third modification example shown in FIG. 26, in a plan view, the plurality of overhang portions OH1, and the overhang portions OH2 and OH3 are formed to project from the main body portion BD only in the positive direction of the X-axis direction, and the detecting electrode Rx has a comb-like shape.

In the third modification example, also, in the same manner as the third embodiment, adjustment has been performed such that the areas of the overhang portions OH2 and OH3 are smaller than the area of the overhang portion OH1. Adjustment has been performed such that the area of a portion of the detecting electrode Rx overlapping with each of the driving electrodes Tx1 and Tx10 approaches the area of a portion of the detecting electrode Rx overlapping with each of the driving electrodes Tx2 to Tx9.

Note that, in the third modification example, also, in the same manner as the fourth modification example of the second embodiment shown in FIG. 20, the plurality of overhang portions OH1 and the overhang portions OH2 and OH3 may be formed so as to project from the main body portion BD in the positive direction or the negative direction of the X-axis direction. The detecting electrodes where the overhang portions OH1 to OH3 project from the main body portion BD in the positive direction of the X-axis direction and the detecting electrodes where the overhang portions OH1 to OH3 project from the main body portion BD in the negative direction of the X-axis direction are alternately arranged in the X-axis direction.

<Fourth Modification Example of Arrangement of Driving Electrodes and Detecting Electrodes>

Figure 27:
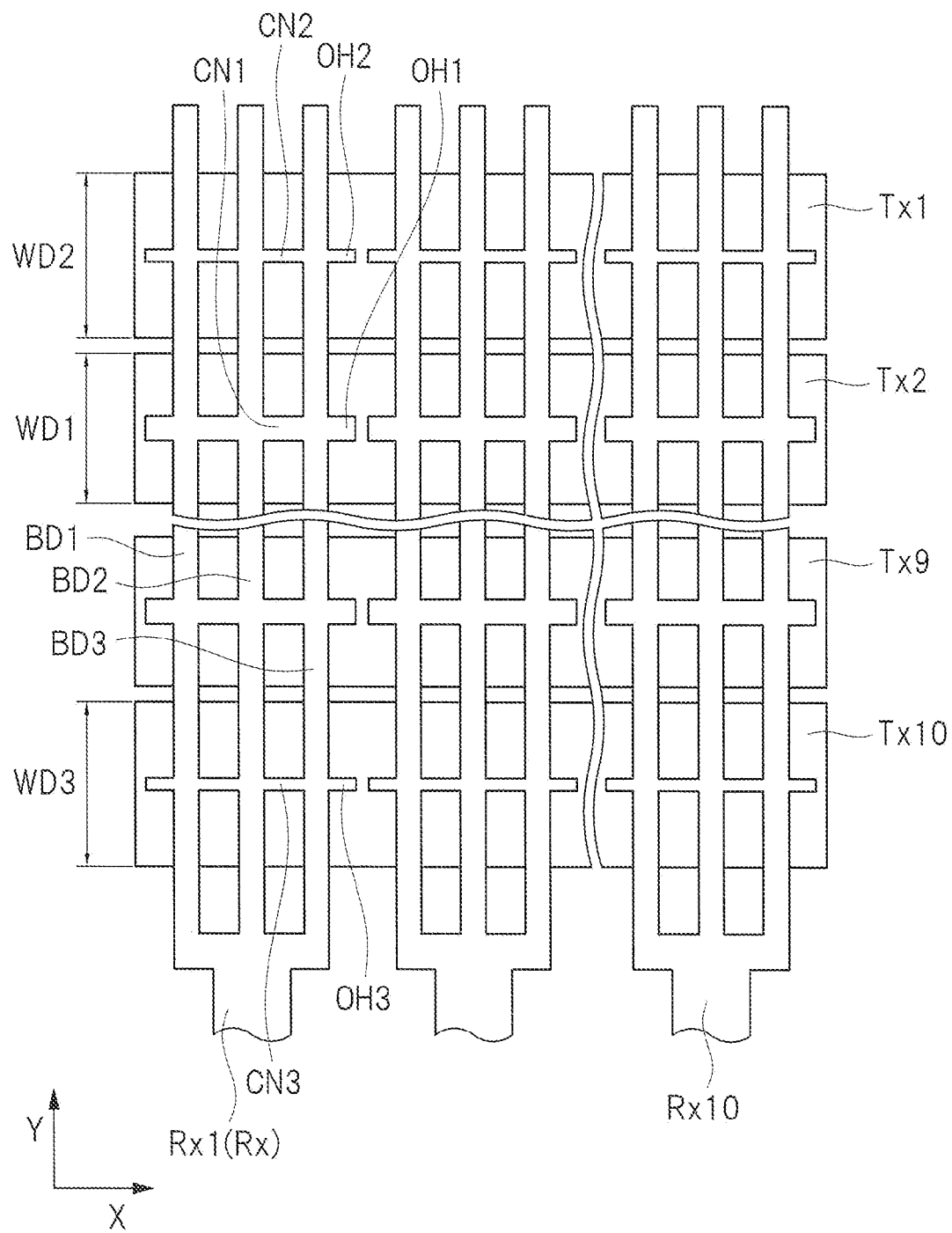
FIG. 27 is a plan view schematically showing a fourth modification example of the arrangement of driving electrodes and detecting electrodes in the touch panel provided in a display device of the third embodiment.

FIG. 27 is a plan view schematically showing a fourth modification example of an arrangement of driving electrodes and detecting electrodes in the touch panel provided in the display device of the third embodiment. FIG. 27 shows an example in which each of a plurality of detecting electrodes has a plurality of main body portions. Note that, in FIG. 27, illustration of the substrate 12, the display area EA1, the detecting area EA2 and the area OEA (see FIG. 23) is omitted. Further, respective portions of the touch panel other than the detecting electrodes Rx1 to Rx10, namely, the detecting electrodes Rx, in the fourth modification example are identical to the respective portions of the touch panel TP3 in the third embodiment. Therefore, the respective portions of the touch panel shown in FIG. 27 other than the detecting electrodes Rx, which are members having the same functions as those of members of the touch panel TP3 shown in FIG. 23 are denoted by the same reference numerals, and repetitive descriptions thereof will be omitted.

In the fourth modification example shown in FIG. 27, the detecting electrode Rx includes three main body portions BD1, BD2 and BD3, a plurality of connecting portions CN1 and connecting portions CN2 and CN3, and a plurality of overhang portions OH1 and overhang portions OH2 and OH3.

The three main body portions BD1, BD2 and BD3 in the fourth modification example can be made identical to the three main body portions BD1, BD2 and BD3 in the fourth modification example of the first embodiment, respectively. Note that, like the fourth modification example of the first embodiment, the present invention is not limited to the case in which the detecting electrode Rx includes three main body portions BD1, BD2 and BD3 and the detecting electrode Rx may include two, four or more main body portions.

The plurality of connecting portions CN1 in the fourth modification example can be made identical to the plurality of connecting portions CN1 in the fourth modification example of the first embodiment, respectively. Further, the plurality of overhang portions OH1 in the fifth modification example can be made identical to the plurality of overhang portions OH1 in the fourth modification example of the first embodiment, respectively.

In a plan view, the connecting portion CN2 is formed inside an area provided with the driving electrode Tx1 so as to connect the main body portions BD1, BD2 and BD3. In a plan view, the connecting portion CN3 is formed inside an area provided with the driving electrode Tx10 so as to connect the main body portions BD1, BD2 and BD3. The connecting portions CN2 and CN3 are expanding portions for expanding the area of the detecting electrode Rx as compared with the case in which the connecting portions CN2 and CN3 are not formed.

In a plan view, the overhang portions OH2 are formed inside an area provided with the driving electrode Tx1 so as to project from the main body portion BD1 in the negative direction of the X-axis direction and project from the main body portion BD3 in the positive direction of the X-axis direction. The overhang portion OH2 is expanding portions for expanding the area of the detecting electrode Rx as compared with the overhang portion OH2 is not formed.

In a plan view, the overhang portions OH3 are formed inside an area provided with the driving electrode Tx10 so as to project from the main body portion BD1 in the negative direction of the X-axis direction and project from the main body portion BD3 in the positive direction of the X-axis direction. The overhang portion OH3 is an expanding portions for expanding the area of the detecting electrode Rx as compared with the overhang portion OH3 is not formed.

In the fourth modification example, adjustment has been performed such that the respective areas of the connecting portion CN2 and the overhang portion OH2 become smaller than the respective areas of the connecting portion CN1 and the overhang portion OH1. That is, adjustment has been performed like the third embodiment such that the area of a portion of the detecting electrode Rx overlapping with the driving electrode Tx1 approaches the area of a portion of the detecting electrode Rx overlapping with each of the driving electrodes Tx2 to Tx9.

Furthermore, in the fourth modification example, adjustment has been performed such that the respective areas of the connecting portion CN3 and the overhang portion OH3 become smaller than the respective areas of the connecting portion CN1 and the overhang portion OH1. That is, like the third embodiment, adjustment has been performed such that the area of a portion of the detecting electrode Rx overlapping with the driving electrode Tx10 approaches the area of a portion of the detecting electrode Rx overlapping with each of the driving electrodes Tx2 to Tx9.

<Fifth Modification Example of Arrangement of Driving Electrodes and Detecting Electrodes>

Figure 28:
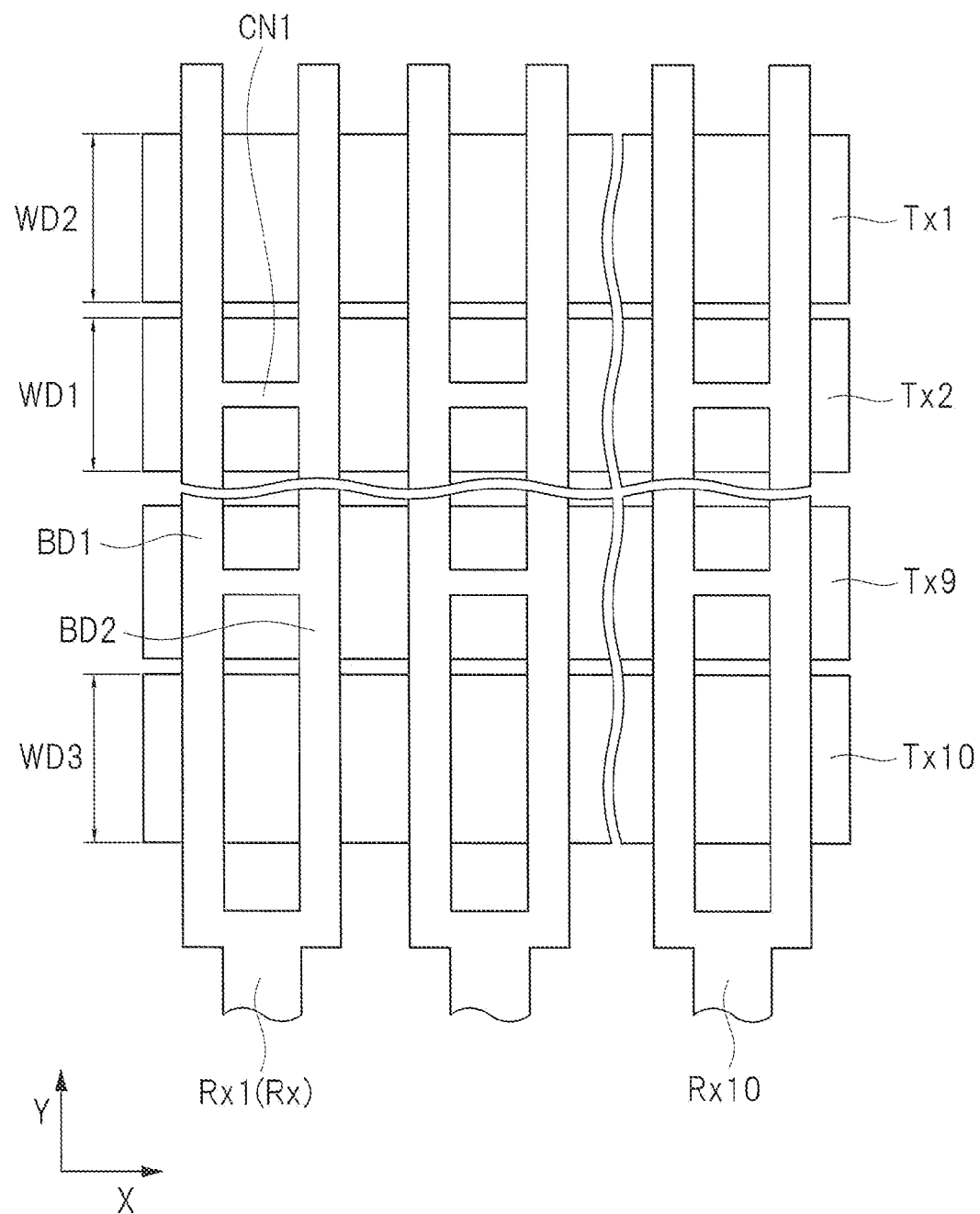
FIG. 28 is a plan view schematically showing a fifth modification example of the arrangement of driving electrodes and detecting electrodes in the touch panel provided in a display device of the third embodiment.

FIG. 28 is a plan view schematically showing a fifth modification example of an arrangement of driving electrodes and detecting electrodes in the touch panel provided in the display device of the third embodiment. FIG. 28 shows an example in which each of a plurality of detecting electrodes has a plurality of main body portions. Note that, in FIG. 28, illustration of the substrate 12, the display area EA1, the detecting area EA2 and the area OEA (see FIG. 23) is omitted. Further, respective portions of the touch panel other than the detecting electrodes Rx1 to Rx10, namely, the detecting electrodes Rx, in the fifth modification example are identical to the respective portions of the touch panel TP3 in the third embodiment. Therefore, the respective portions of the touch panel shown in FIG. 28 other than the detecting electrodes Rx, which are members having the same functions as members of the touch panel TP3 shown in FIG. 23 are denoted by the same reference numerals, and repetitive descriptions thereof will be omitted.

In the fifth modification example shown in FIG. 28, the detecting electrode Rx includes two main body portions BD1 and BD2, and connecting portions CN1.

The two main body portions BD1 and BD2 in the fifth modification example can be made identical to the two main body portions BD1 and BD2 in the fifth modification example of the first embodiment, respectively. Note that, like the fifth modification example of the first embodiment, the present invention is not limited to the case in which the detecting electrode Rx includes two main body portions BD1 and BD2, and the detecting electrode Rx may include three or more main body portions.

In a plan view, the connecting portion CN1 is formed inside an area provided with each of the driving electrodes Tx2 to Tx9 so as to connect the main body portions BD1 and BD2. The connecting portion CN1 is an expanding portion for expanding the area of the detecting electrode Rx as compared with the case in which the connecting portion CN1 is not formed.

On the other hand, as shown in FIG. 28, such a configuration can be adopted that the connecting portion or the overhang portion as the expanding portion for expanding the area of the detecting electrode Rx is not formed inside an area provided with each of the driving electrodes Tx2 and Tx10 in a plan view.

In the fifth modification example, like the third embodiment, adjustment has been performed by forming the connecting portion CN1 such that the area of a portion of the detecting electrode Rx overlapping with each of the driving electrodes Tx1 and Tx10 approaches the area of a portion of the detecting electrode Rx overlapping with each of the driving electrodes Tx2 to Tx9.

Note that, in the fifth modification example, also, like the second modification example of the third embodiment, the driving electrode having a width larger than the widths of the other driving electrodes is not arranged outside the arrangement of the driving electrodes but it may be arranged in the middle of the arrangement of the driving electrodes.

<Sixth Modification Example of Arrangement of Driving Electrodes and Detecting Electrodes>

Figure 29:
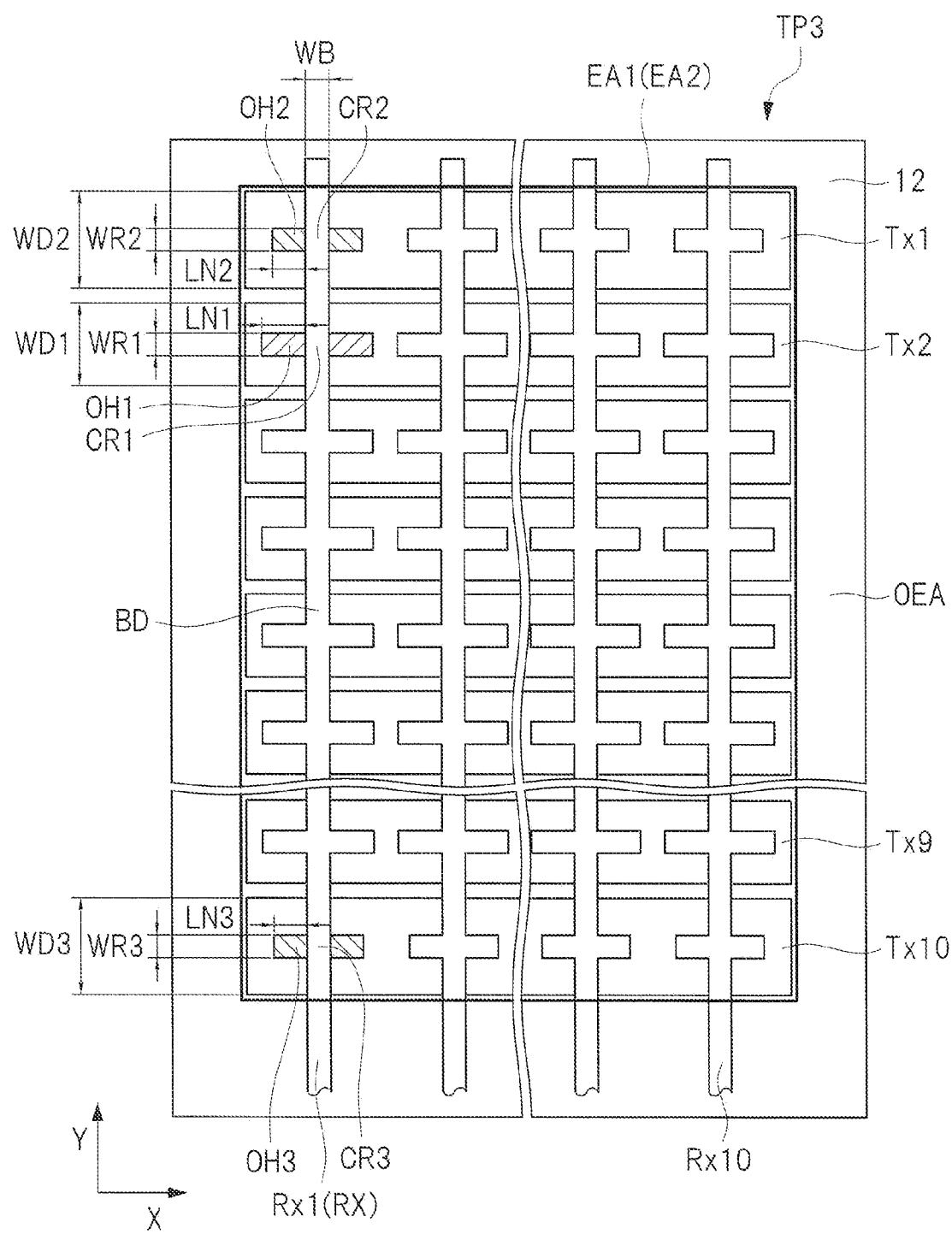
FIG. 29 is a plan view schematically showing a sixth modification example of the arrangement of driving electrodes and detecting electrodes in the touch panel provided in a display device of the third embodiment.

FIG. 29 is a plan view schematically showing a sixth modification example of an arrangement of driving electrodes and detecting electrodes in the touch panel provided in the display device of the third embodiment. FIG. 29 shows an example in which the length of the overhang portion has been adjusted instead of the width of the overhang portion. Note that, members of the touch panel TP3 shown in FIG. 29, having the same functions as those of members of the touch panel TP3 shown in FIG. 23 are denoted by the same reference numerals, and repetitive descriptions thereof will be omitted.

In the sixth modification example shown in FIG. 29, the driving detecting electrode Rx includes a main body portion BD, a plurality of overhang portions OH1, and overhang portions OH2 and OH3. The main body portion BD extends in the Y-axis direction, and the width of the main body portion BD in the X-axis direction is represented as WB. Note that, in FIG. 29, the overhang portion OH1 formed inside an area provided with the driving electrode Tx2, and the overhang portions OH2 and OH3 are hatched.

The plurality of overhang portions OH1 in the sixth modification example may be made equal to the plurality of overhang portions OH1 in the third embodiment, respectively.

In a plan view, the overhang portions OH2 are formed inside an area provided with the driving electrode Tx1, namely, inside the intersection portion CR2, so as to project from the main body portion BD in the positive direction and the negative direction of the X-axis direction, respectively. The overhang portion OH2 is an expanding portion for expanding the area of the detecting electrode Rx as compared with the overhang portion OH2 is not formed.

In a plan view, the overhang portions OH3 are formed inside an area provided with the driving electrode Tx10, namely, inside the intersection portion CR3, so as to project from the main body portion BD in the positive direction and the negative direction of the X-axis direction, respectively. The overhang portion OH3 is an expanding portions for expanding the area of the detecting electrode Rx as compared with the overhang portion OH3 is not formed.

In the sixth modification example, in a different manner from the third embodiment, for example, it is assumed that the width WR1 of the overhang portion OH1, the width WR2 of the overhang portion OH2, and the width WR3 of the overhang portion OH3 are made equal to one another. Here, for example, adjustment has been performed such that the length LN2 of the overhang portion OH2 becomes smaller than the length LN1 of the overhang portion OH1, and adjustment has been performed such that the length LN3 of the overhang portion OH3 becomes smaller than the length LN1 of the overhang portion OH1.

In the sixth modification example, for example, adjustment has been performed by making the length LN2 shorter than the length LN1 such that the area of the overhang portion OH2 becomes smaller than the area of the overhang portion OH1 Like the third embodiment, adjustment has been performed such that the area of a portion of the detecting electrode Rx overlapping with the driving electrode Tx1 approaches the area of a portion of the detecting electrode Rx overlapping with each of the driving electrodes Tx2 to Tx9.

Further, in the sixth modification example, for example, adjustment has been performed by making the length LN3 shorter than the length LN1 such that the area of the overhang portion OH3 becomes smaller than the area of the overhang portion OH1. Like the third embodiment, adjustment has been performed such that the area of a portion of the detecting electrode Rx overlapping with the driving electrode Tx10 approaches the area of a portion of the detecting electrode Rx overlapping with each of the driving electrodes Tx2 to Tx9.

<Regarding Electrostatic Capacitance between Driving Electrode and Detecting Electrode>

Next, the electrostatic capacitance between the driving electrode and the detecting electrode will be described with reference to second comparative example.

Figure 30:
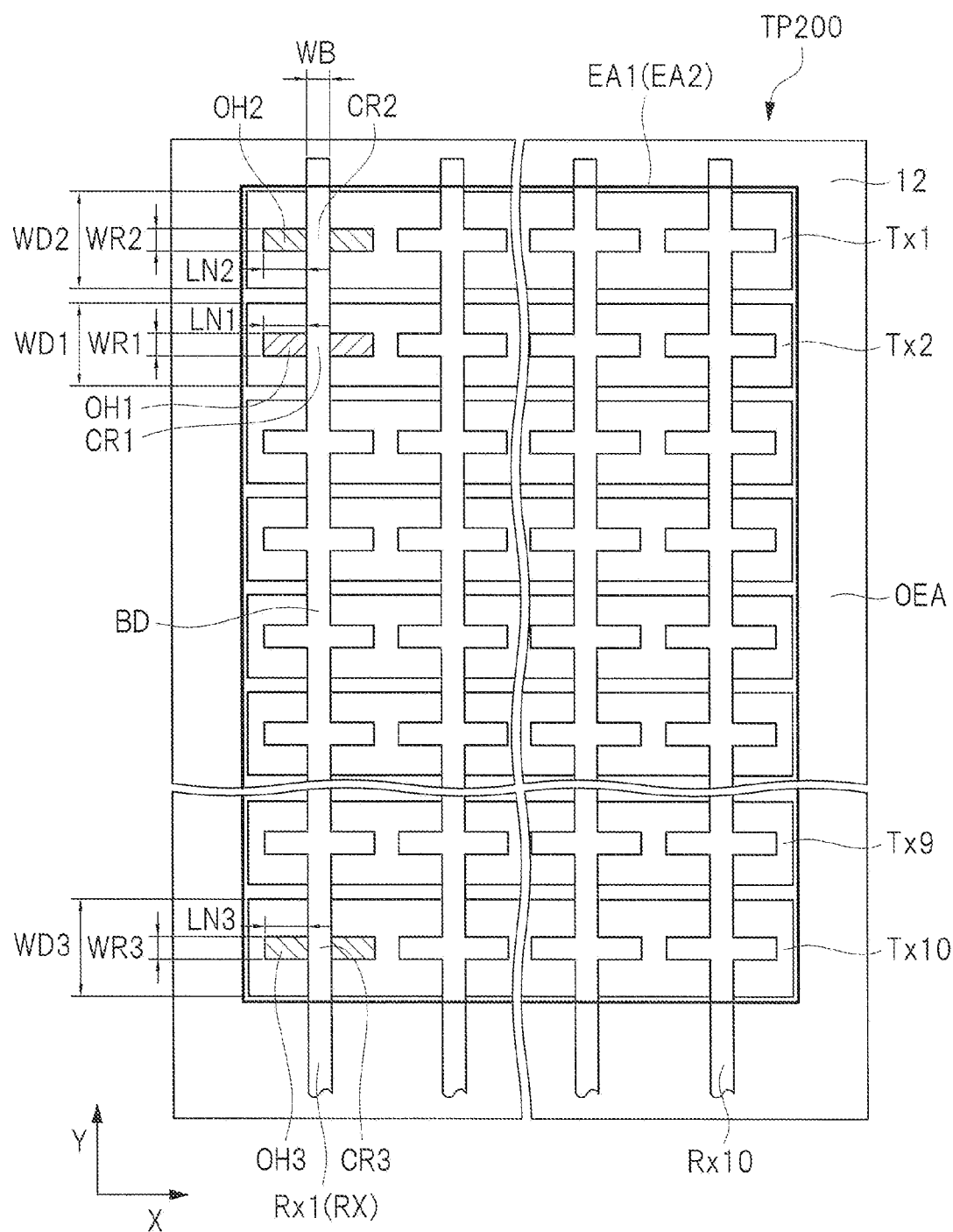
FIG. 30 is a plan view schematically showing an arrangement of driving electrodes and detecting electrodes in a touch panel provided in the display device of a second comparative example.

FIG. 30 is a plan view schematically showing an arrangement of driving electrodes and detecting electrodes in a touch panel provided in a display device of a second comparative example.

In second comparative example, it is assumed that the detecting electrode Rx includes a main body portion BD and overhang portions OH1 to OH3, but the area of the overhang portion OH1, the area of the overhang portion OH2, and the area of the overhang portion OH3 are equal to one another. It is assumed that the main body portion BD extends in the Y-axis direction, and the width of the main body portion BD in the X-axis direction is represented as WB.

Figure 31:
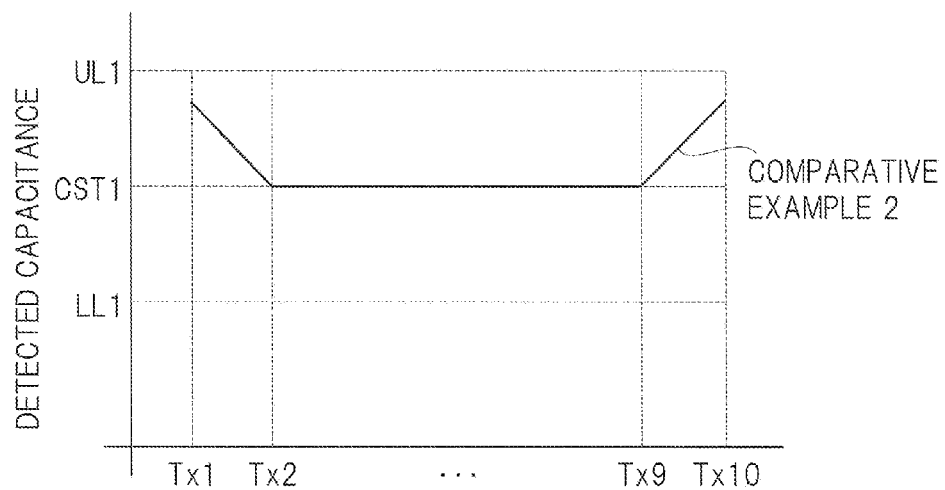
FIG. 31 is a graph showing a detected capacitance detected when a driving voltage is applied to each of a plurality of driving electrodes in the second comparative example.

FIG. 31 is a graph showing a detected capacitance detected when a driving voltage has been applied to each of the plurality of driving electrodes in the second comparative example. In FIG. 31, a horizontal axis represents a driving electrode applied with a driving voltage and a vertical axis represents a detected capacitance like FIG. 14. Further, in FIG. 31, a range of a detected capacitance which can be detected by the ADC, namely, a lower limit LL1 and an upper limit UL1 of the ADC range is shown like FIG. 14. Further, the detected capacitance shown in FIG. 31 is equal to the electrostatic capacitance between each of the driving electrodes Tx1 to Tx10 and the detecting electrode Rx like the detected capacitance shown in FIG. 14.

Note that, respective potions of the touch panel TP200 of the second comparative example shown in FIG. 30 other than the detecting electrodes Rx1 to Rx10, namely, the detecting electrode Rx are identical to the respective portions of the touch panel TP3 of the third embodiment shown in FIG. 23 other than the detecting electrode Rx. Further, respective portions of the display device provided with the touch panel TP200 of the second comparative example other than the touch panel TP200 are identical to the respective portions of the display device LCD1 shown in FIG. 6 other than the touch panel TP1.

That is, in the second comparative example, also, the width WD2 of the driving electrode Tx1 is larger than the respective widths WD1 of the driving electrodes Tx2 to Tx9 and the width WD3 of the driving electrode Tx10 is larger than the respective widths WD1 of the driving electrodes Tx2 to Tx9 like the third embodiment.

Further, respective portions of the detecting electrode Rx in the second comparative example are identical to the respective portions of the detecting electrode Rx in the third embodiment except that the area of the overhang portion OH1, the area of the overhang portion OH2, and the area of the overhang portion OH3 are equal to one another.

Note that, in FIG. 30, the overhang portions OH1 formed inside an area provided with the driving electrode Tx2, and the overhang portions OH2 and OH3 are hatched.

In second comparative example, also, like the third embodiment, the width WD2 of the driving electrode Tx1 is larger than the respective widths WD1 of the driving electrodes Tx2 to Tx9. Therefore, the area S2 of a portion of the detecting electrode Rx overlapping with the driving electrode Tx1 becomes larger than the area S1 of a portion of the detecting electrode Rx overlapping with each of the driving electrodes Tx2 to Tx9. Further, also, the width WD3 of the driving electrode Tx10 is larger than the respective widths WD1 of the driving electrodes Tx2 to Tx9. Therefore, the area S3 of a portion of the detecting electrode Rx overlapping with the driving electrode Tx10 becomes larger than the area S1 of a portion of the detecting electrode Rx overlapping with each of the driving electrodes Tx2 to Tx9. Accordingly, the electrostatic capacitance between each of the driving electrodes Tx1 and Tx10 and the detecting electrode Rx becomes larger than the electrostatic capacitance between each of the driving electrodes Tx2 to Tx9 and the detecting electrode Rx.

In the touch panel TP200 of the second comparative example, as shown in FIG. 31, the electrostatic capacitances, namely, the detected capacitances detected when a driving voltage has been applied to the driving electrodes Tx2 to Tx9, respectively, become a constant value CST1.

In the touch panel TP200 of the second comparative example, however, the electrostatic capacitance, namely, the detected capacitance detected when a driving voltage has been applied to each of the driving electrodes Tx1 and Tx10 become larger than the constant value CST1. When the detected capacitance becomes larger than the constant value CST1, there is such a possibility that the detected capacitance approaches the upper limit UL1 or becomes larger than the upper limit UL1. That is, a difference, namely, a tolerance of the detected capacitance detected when the driving voltage has been applied to each of the driving electrodes Tx1 and Tx10 to the upper limit UL1 of the ADC range becomes small, so that a noise immunity of the detected capacitance lowers. As a result, in the touch panel TP200 of the second comparative example, position detection accuracies may lower or the position detection sensitivities may lower on the driving electrodes Tx1 and Tx10 as compared with on the driving electrodes Tx2 to Tx9.

<Main Feature and Advantageous Effect of This Embodiment>

In the third embodiment and the first modification example to the sixth modification example thereof, in a plan view, the detecting electrode Rx is arranged in the area provided with the driving electrodes Tx1 and Tx10, respectively, and they include, for example, the overhang portions OH2 and OH3, the connecting portions CN2 and CN3, or the connecting portion CN1 as the expanding portions for expanding the area of the detecting electrode Rx. In the following, the overhang portions OH2 and OH3 will be described on behalf of the overhang portions OH2 and OH3, the connecting portions CN2 and CN3, or the connecting portion CN1.

Adjustment has been performed such that the respective areas of the overhang portions OH2 and OH3 become smaller than the area of the overhang portion OH1, and adjustment has been performed such that the area of a portion of the detecting electrode Rx overlapping with each of the driving electrodes Tx1 and Tx10 approaches the area of a portion of the detecting electrode Rx overlapping with each of the driving electrodes Tx2 to Tx9. Therefore, adjustment can be performed such that the electrostatic capacitance between each of the driving electrodes Tx1 and Tx10 and the detecting electrode Rx approaches the electrostatic capacitance between each of the driving electrodes Tx1 and Tx10 and the detecting electrode Rx. Therefore, the electrostatic capacitance between each of the driving electrodes Tx1 and Tx10 and the detecting electrode Rx can be prevented or inhibited from becoming larger than the electrostatic capacitance between each of the driving electrodes Tx2 to Tx9 and the detecting electrode Rx.

Figure 32:
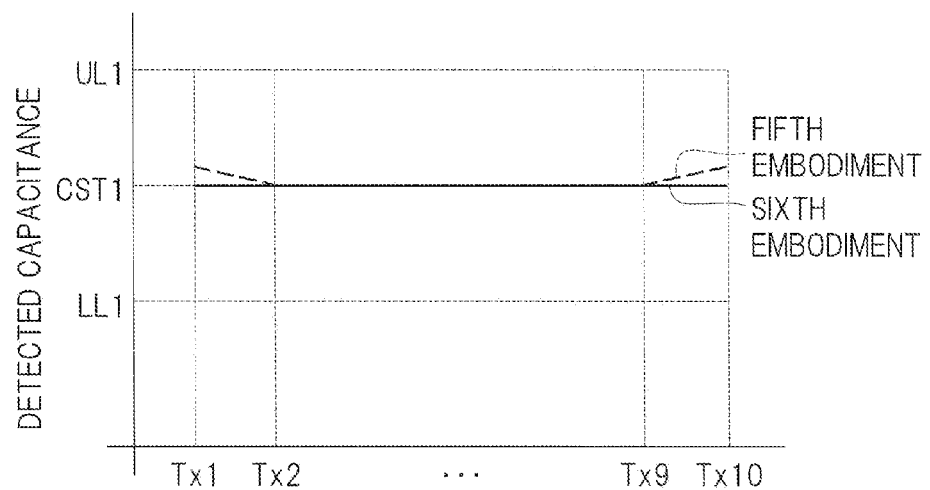
FIG. 32 is a plan view schematically showing an arrangement of driving electrodes and detecting electrodes in a touch panel provided in the display device of a second embodiment.

FIG. 32 is a graph showing the detected capacitance detected when a driving voltage has been applied to each of the plurality of driving electrodes in Example 5 and Example 6 which are examples of the third embodiment. In FIG. 32, a horizontal axis represents a driving electrode applied with a driving voltage and a vertical axis represents a detected capacitance like FIG. 15. Further, in FIG. 32, a range of a detected capacitance which can be detected by the ADC, namely, a lower limit LL1 and an upper limit UL1 of the ADC range is shown like FIG. 15. Further, the detected capacitance shown in FIG. 32 is equal to the electrostatic capacitance between each of the driving electrodes Tx1 to Tx10 and the detecting electrode Rx in the same manner as the detected capacitance shown in FIG. 15.

As shown in FIG. 32, in Example 5 and Example 6, also, it is assumed that the electrostatic capacitance, namely, the detected capacitance detected when a driving voltage has been applied to each of the driving electrodes Tx2 to Tx9 takes a constant value CST1.

Here, respective areas of the overhang portions OH2 and OH3 are preferably adjusted such that the electrostatic capacitance, namely, the detected capacitance detected when a driving voltage has been applied to each of the driving electrodes Tx1 and Tx10 falls within the range of ±10% to the constant value CST1. The case in which the detecting electrode Rx includes the overhang portions OH2 and OH3 thus adjusted is shown as Example 5 shown in FIG. 32.

In Example 5 shown in FIG. 32, the difference, namely, the tolerance of the detected capacitance detected when a driving voltage has been applied to each of the driving electrodes Tx1 and Tx10 to the upper limit UL1 of the ADC range can be inhibited from becoming small, as compared with second comparative example shown in FIG. 31. A noise immunity of the detected capacitance detected when a driving voltage has been applied to each of the driving electrodes Tx1 and Tx10 can be inhibited from lowering. As a result, the position detection accuracies can be prevented or inhibited from lowering on the driving electrodes Tx1 and Tx10 and the position detection sensitivities can be prevented or inhibited from lowering thereon as compared with on the driving electrodes Tx2 to Tx9. Therefore, the position detection performance in the display device can be improved.

Further, preferably, the respective areas of the overhang portions OH2 and OH3 are adjusted such that the detected capacitance detected when a driving voltage has been applied to each of the driving electrodes Tx1 and Tx10 becomes equal to the constant value CST1. The case in which the detecting electrode Rx includes the overhang portions OH2 and OH3 thus adjusted is shown as Example 6 shown in FIG. 32.

In Example 6 shown in FIG. 32, the tolerance of the detected capacitance detected when a driving voltage has been applied to each of the driving electrodes Tx1 and Tx10 to the upper limit UL1 of the ADC range can be inhibited from becoming small further securely as compared with second comparative example shown in FIG. 31. The noise immunity of the detected capacitance detected when a driving voltage has been applied to each of the driving electrodes Tx1 and Tx10 can be inhibited from lowering further securely. As a result, the position detection accuracies can be prevented or inhibited from lowering on the driving electrodes Tx1 and Tx10 and the position detection sensitivities can be prevented or inhibited from lowering thereon as compared with the on the driving electrodes Tx2 to Tx9. Therefore, the position detection performance in the display device can be improved.

(Fourth Embodiment)

In the first embodiment to the third embodiment, the example in which the touch panel as the input device including the driving electrode having a width different from those of the other driving electrodes has been applied to the input device provided in the liquid crystal display device of an in-cell type has been described. On the other hand, in the fourth embodiment, an example in which the touch panel as the input device including the driving electrode having a width different from those of the other driving electrodes has been applied to an input device as a single body or an input device provided in a display device of an on-cell type will be described.

Note that, the touch panel of the fourth embodiment can be applied to an input device provided in a display device of an on-cell type such as an input device provided on various display devices such as an organic EL display device including liquid crystal display device.

<Configuration of Touch Panel>

Next, a configuration of the touch panel of the fourth embodiment will be described.

Figure 33:
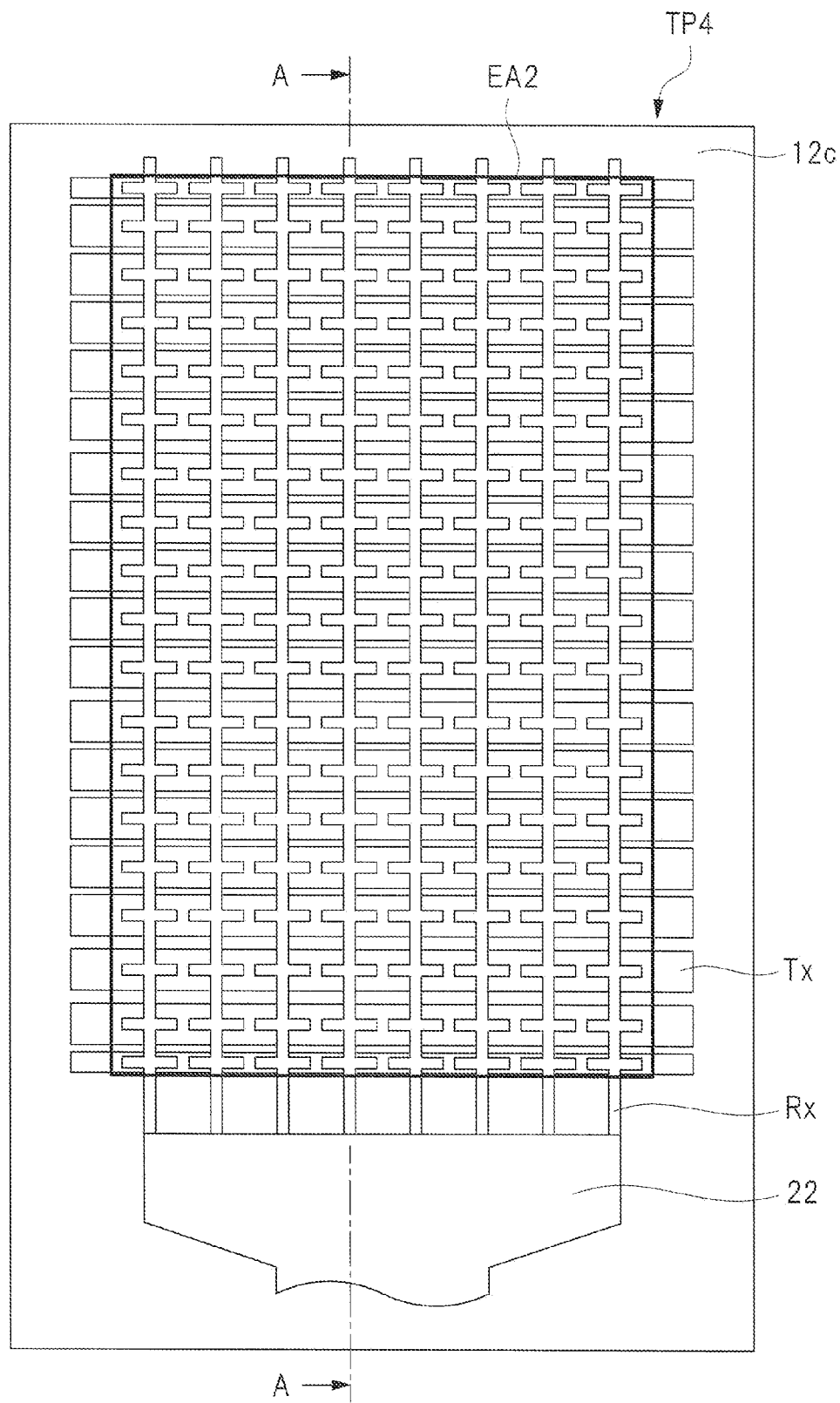
FIG. 33 is a plan view showing a configuration of one example of a touch panel of a fourth embodiment.
Figure 34:
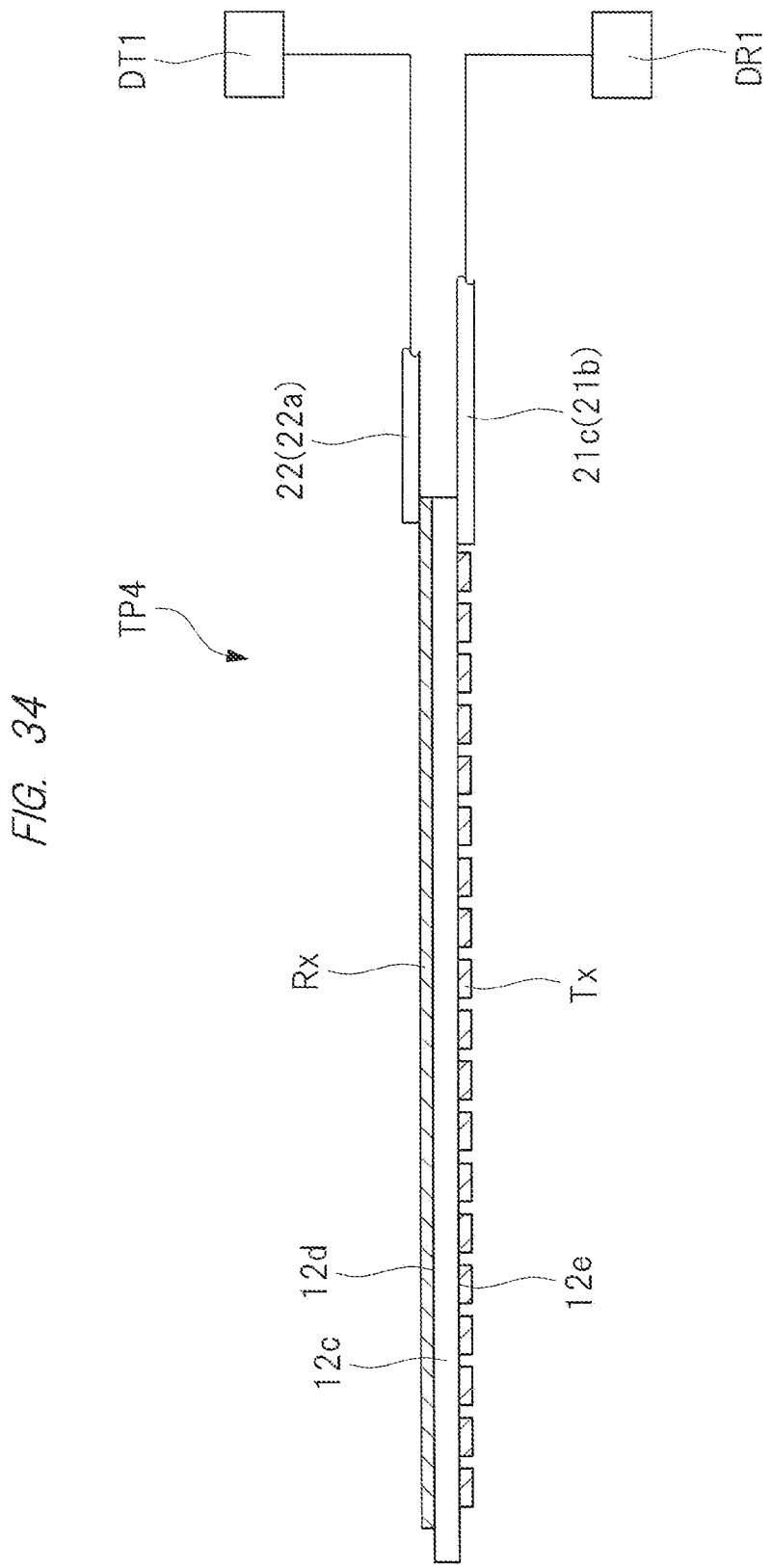
FIG. 34 is a cross-sectional view showing a configuration of one example of the touch panel of the fourth embodiment.

FIG. 33 is a plan view showing a configuration of one example of the touch panel of the fourth embodiment. FIG. 34 is a cross-sectional view showing a configuration of the one example of the touch panel of the fourth embodiment. FIG. 34 is a cross-sectional view taken along the line A-A in FIG. 33.

As shown in FIG. 33, a touch panel TP4 has a substrate 12c. The substrate 12c has a front surface 12d and a rear surface 12e positioned on the opposite side of the front surface 12d.

Note that, in the fourth embodiment, the term "plan view" means the case in which the display device has been viewed in a direction perpendicular to the front surface 12d of the substrate 12c.

A plurality of driving electrodes Tx is formed on the rear surface 12e of the substrate 12c. The plurality of driving electrodes Tx is composed of a transparent conductive film having translucency, namely, a transparent conductive film, for example, ITO or the like. As shown in FIG. 33, the plurality of driving electrodes Tx is provided side by side so as to extend in one direction inside the detection area EA2 which is an area where the touch panel detects a position. Here, the driving electrodes Tx are arranged inside the detection area EA2 in a section taken along the line A-A. On the other hand, as shown in FIG. 33, the driving electrodes Tx may be formed such that both ends thereof extend outside the detection area EA2.

Furthermore, in the fourth embodiment, even if the touch panel is provided in a display device, the display device is a display device of an on-cell type. Therefore, the detection area EA2 which is an area where the touch panel detects a position is not required to coincide with the display area EA1 (see FIG. 4) which is an area where the display device performs displaying.

A plurality of detecting electrodes Rx is formed on the front surface 12d of the substrate 12c. The plurality of detecting electrodes Rx are composed of a transparent conductive film having translucency, namely, a transparent conductive film, for example, ITO or the like.

A wiring board 21c is formed on the rear surface 12e of the substrate 12c. The wiring board 21c may be, for example, a so-called flexible wiring board like the wiring board 21 of the first embodiment. Wirings 21b are formed in the wiring board 21c. One end of the wiring 21b is electrically connected to a plurality of driving electrodes Tx, respectively, and the other end thereof is electrically connected to a driving circuit DT1. The driving circuit DR1 applies, to the driving electrodes Tx, the driving waveform DW for input position detection explained with reference to FIG. 2.

A wiring board 22 is formed on the front surface 12d of the substrate 12c. The wiring board 22 may be, for example, a so-called flexible wiring board in the same manner as the first embodiment. Wirings 22a are formed on the wiring board 22. One end of the wiring 22a is electrically connected to the plurality of detecting electrodes Rx, respectively, and the other end thereof is electrically connected to a detecting circuit DT1. The detecting circuit DT1 detects an input position based upon a detection signal.

<Configuration of Display Device>

Figure 35:
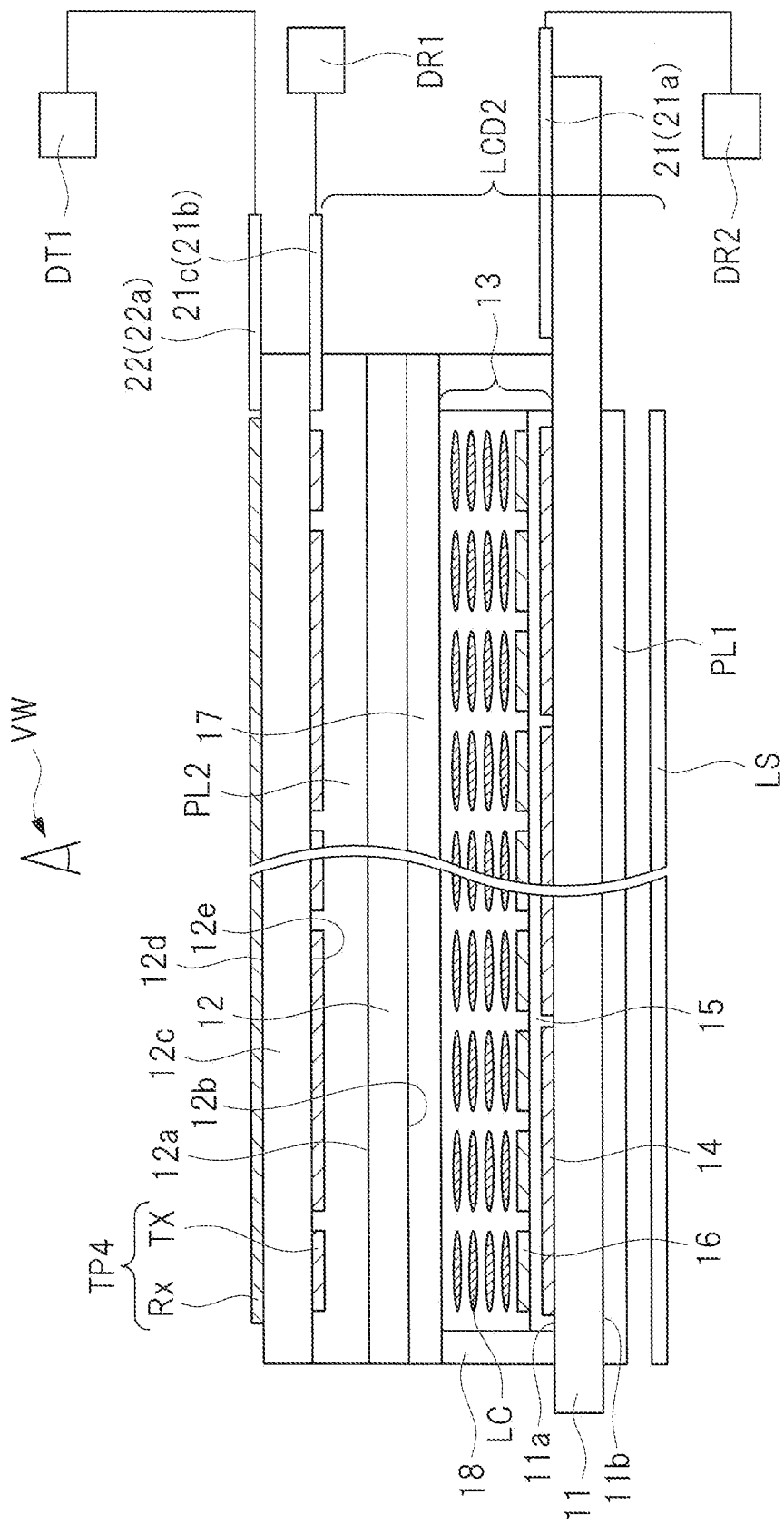
FIG. 35 is a cross-sectional view showing a configuration of one example of a display device of the fourth embodiment.

FIG. 35 is a cross-sectional view showing a configuration of one example of the display device of the fourth embodiment. The display device shown in FIG. 35 is a display device with a touch detection function of an on-cell type configured by attaching the touch panel TP4 on the front surface 12a of the substrate 12 of a display device LCD2 which is the display device composed of the liquid crystal display device described above with reference to FIG. 6 from which the detecting electrodes Rx and the wirings 21b, and the driving circuit DR1 have been removed. Therefore, respective portions of the display device LCD2 are identical to those of the display device LCD1 shown in FIG. 6, from which the detecting electrodes Rx and the wirings 21b, and the driving circuit DR1 have been removed, the descriptions thereof are omitted.

Here, the common electrodes 14 provided in the display device LCD2 are not used as detecting electrodes of the touch panel. Further, in the display device LCD2 as the liquid crystal display device, for example, the TN (Twisted Nematic) mode or the VA (Vertical Alignment) mode can be used as the vertical-electric-field mode of the system for applying electric field in order to change arrangement of liquid crystal molecules in a liquid crystal layer. Further, the above-described IPS mode, FFS mode, or the like can be used as the lateral electric field.

<Arrangement of Driving Electrodes and Detecting Electrodes>

As arrangement of driving electrodes and detecting electrodes in the touch panel of the fourth embodiment, the arrangement of the driving electrodes and the detecting electrodes in either one of the first embodiment and the first modification example to the fifth modification example thereof can be adopted. Further, as the arrangement of driving electrodes and detecting electrodes in the touch panel of the fourth embodiment, the arrangement of the driving electrodes and the detecting electrodes in either one of the second embodiment and the first modification example to the sixth modification example thereof can be adopted.

Even in the touch panel used as a single body and the touch panel provided in the display device of an on-cell type, there is such a case that the width of a driving electrode becomes smaller than those of the other driving electrodes due to constraint of arrangement or the like.

In the fourth embodiment, however, the arrangement of the driving electrodes and the detecting electrodes shown in either one of the first embodiment and the first modification example to the fifth modification example thereof can be adopted. Therefore, as explained with reference to FIG. 7 or the like, even when the width WD2 of the driving electrode Tx1 and the width WD3 of the driving electrode Tx10 are smaller than the respective widths WD1 of the driving electrodes Tx2 to Tx9, the electrostatic capacitance between each of the driving electrodes Tx1 and Tx10 and the detecting electrode Rx can be increased. Therefore, the electrostatic capacitance between each of the driving electrodes Tx1 and Tx10 and the detecting electrode Rx can be prevented or inhibited from becoming smaller than the electrostatic capacitance between each of the driving electrodes Tx2 to Tx9 and the detecting electrode Rx.

Further, in the fourth embodiment, the arrangement of the driving electrodes and the detecting electrodes shown in either one of the second embodiment and the first modification example to the sixth modification example thereof can be adopted. Therefore, as explained with reference to FIG. 16 or the like, even when the width WD2 of the driving electrode Tx1 and the width WD3 of the driving electrode Tx10 are smaller than the respective widths WD1 of the driving electrodes Tx2 to Tx9, the electrostatic capacitance between each of the driving electrodes Tx1 and Tx10 and the detecting electrode Rx can be increased. Therefore, the electrostatic capacitance between each of the driving electrodes Tx1 and Tx10 and the detecting electrode Rx can be prevented or inhibited from becoming smaller than the electrostatic capacitance between each of the driving electrodes Tx2 to Tx9 and the detecting electrode Rx.

Further, as the arrangement of driving electrodes and detecting electrodes in the touch panel of the fourth embodiment, the arrangement of the driving electrodes and the detecting electrodes in either one of the third embodiment and the first modification example to the sixth modification example thereof can be adopted.

Even in the touch panel used as a single body and the touch panel provided in the display device of an on-cell type, there is such a case that the width of a driving electrode becomes larger than those of the other driving electrodes due to constraint of arrangement or the like.

In the fourth embodiment, however, the arrangement of the driving electrodes and the detecting electrodes in either one of the third embodiment and the first modification example to the sixth modification example thereof can be adopted. Therefore, as explained with reference to FIG. 23 or the like, even when the width WD2 of the driving electrode Tx1 and the width WD3 of the driving electrode Tx10 are larger than the respective widths WD1 of the driving electrodes Tx2 to Tx9, the electrostatic capacitance between the each of the driving electrodes Tx1 and Tx10 and the detecting electrode Rx can be decreased. Therefore, the electrostatic capacitance between each of the driving electrodes Tx1 and Tx10 and the detecting electrode Rx can be prevented or inhibited from becoming larger than the electrostatic capacitance between each of the driving electrodes Tx2 to Tx9 and the detecting electrode Rx.

In the fourth embodiment, in the touch panel used as a single body or the touch panel provided in the display device of an on-cell type, adjustment can be performed in this manner that the electrostatic capacitance between the driving electrode different in width from the other driving electrodes and the detecting electrode approaches the electrostatic capacitance between each of the other driving electrodes and the detecting electrode.

Therefore, the tolerance of the detected capacitance detected when a driving voltage has been applied to the driving electrode different in width from the other driving electrodes to the lower limit or the upper limit of the ADC range can be prevented from becoming small, so that a noise immunity of the detected capacitance can be prevented or inhibited from lowering. Therefore, in the same manner as the first embodiment to the third embodiment, the position detection accuracy can be prevented or inhibited from lowering on the driving electrode different in width from the other driving electrodes and the position detection sensitivity can be prevented or inhibited from lowering thereon as compared with on the other driving electrodes. Therefore, the position detection performance on the stand-alone touch panel or the touch panel provided in the display device of an on-cell type can be improved.

(Fifth Embodiment)

Next, with reference to FIG. 36 to FIG. 42, electric equipment as an application example of the display device explained in the first embodiment to the fourth embodiment and the modification examples thereof will be described. It is possible to apply the display devices with a touch detection function of the first embodiment to the fourth embodiment and the modification examples thereof or the like to electronic device in any field such as television equipment, a digital camera, a notebook type personal computer, such a portable terminal device as a mobile phone, or a video camera. In other words, it is possible to apply the display devices with a touch detection function of the first embodiment to the fourth embodiment and the modification examples thereof or the like to electronic device in any field of displaying a video signal inputted from the outside or a video signal produced internally as an image or a video image.

<Television Equipment>

Figure 36:
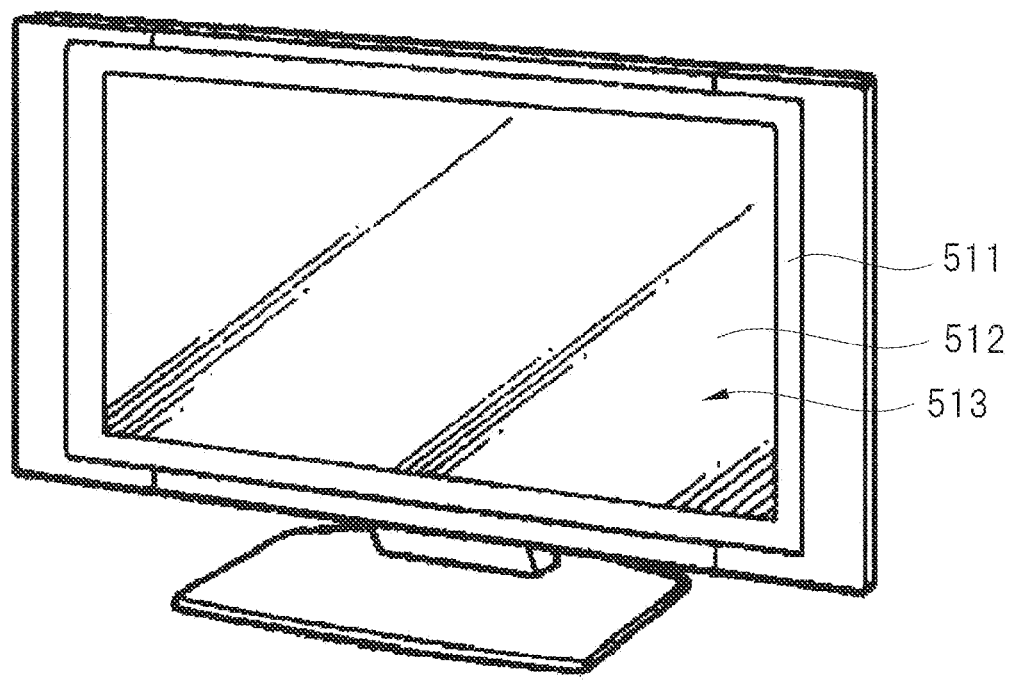
FIG. 36 is a perspective view representing an appearance of a television as one example of an electronic device of a fifth embodiment.

FIG. 36 is a perspective view representing an appearance of television equipment as one example of the electronic device of the fifth embodiment. The television equipment has a video image displaying screen section 513 including a front panel 511 and a filter glass 512. The video image displaying screen section 513 is composed of the display device with a touch detection function of an in-cell type or the display device with a touch detection function of an on-cell type which has been described in the first embodiment to the fourth embodiment and the modification examples thereof.

<Digital Camera>

Figure 37:
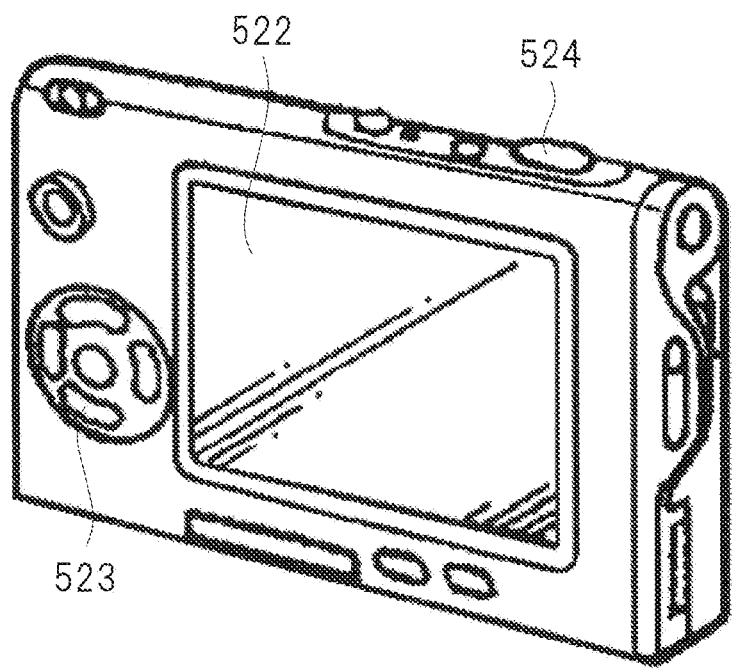
FIG. 37 is a perspective view representing an appearance of a digital camera as one example of the electronic device of the fifth embodiment.

FIG. 37 is a perspective view representing an appearance of a digital camera as one example of the electronic device of the fifth embodiment. The digital camera has, for example, a display section 522, a menu switch 523, and a shutter button 524. The display section 522 is composed of the display device with a touch detection function of an in-cell type or the display device with a touch detection function of an on-cell type which has been described in the first embodiment to the fourth embodiment and the modification examples thereof.

<Notebook Type Personal Computer>

Figure 38:
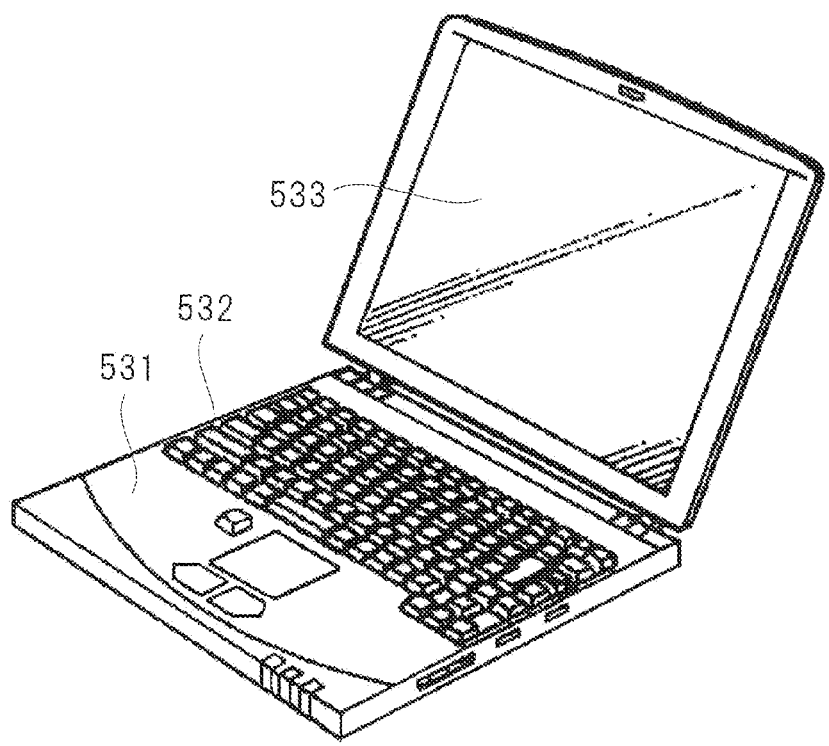
FIG. 38 is a perspective view representing an appearance of a notebook-type personal computer (laptop) as one example of the electronic device of the fifth embodiment.

FIG. 38 is a perspective view representing an appearance of a notebook type personal computer as one example of the electronic device of the fifth embodiment. The notebook type personal computer has, for example, a main body 531, a keyboard 532 for input operation of a character or the like, and display section 533 for displaying an image. The display section 533 is composed of the display device with a touch detection function of an in-cell type or the display device with a touch detection function of an on-cell type which has been described in the first embodiment to the fourth embodiment and the modification examples thereof.

<Video Camera>

Figure 39:
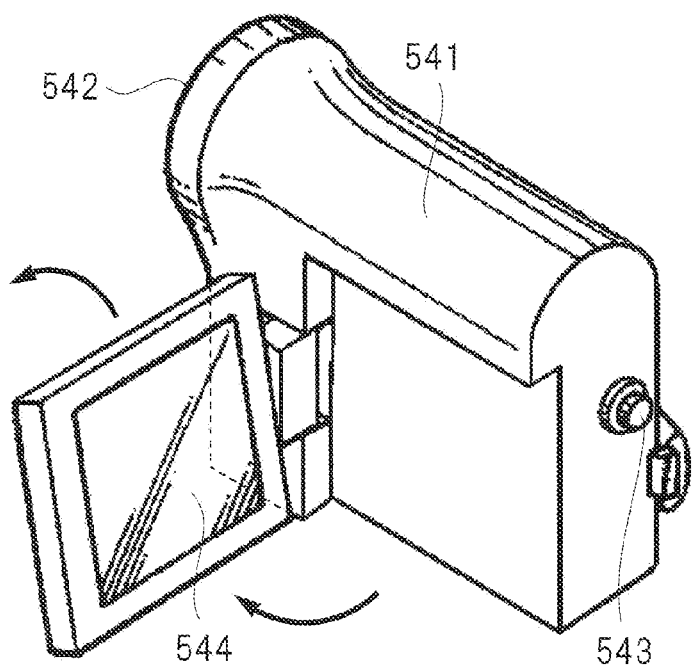
FIG. 39 is a perspective view representing an appearance of a video camera as one example of the electronic device of the fifth embodiment.

FIG. 39 is a perspective view representing an appearance of a video camera as one example of the electronic device of the fifth embodiment. The video camera has, for example, a main body portion 541, a lens for subject shooting provided on a front surface of the main body portion 541, a start/stop switch 543 used at a shooting time, and a display section 544. The display section 544 is composed of the display device with a touch detection function of an in-cell type or the display device with a touch detection function of an on-cell type which has been described in the first embodiment to the fourth embodiment and the modification examples thereof.

<Mobile Phone>

Figure 40:
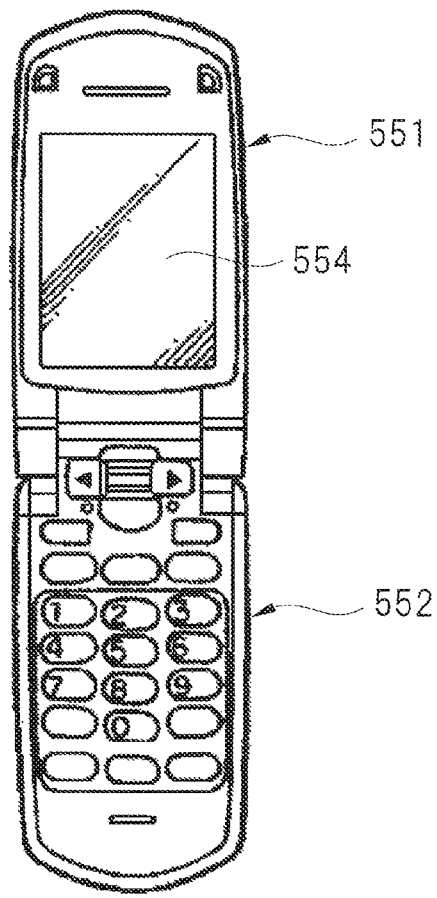
FIG. 40 is a perspective view representing an appearance of a mobile phone as one example of the electronic device of the fifth embodiment.
Figure 41:
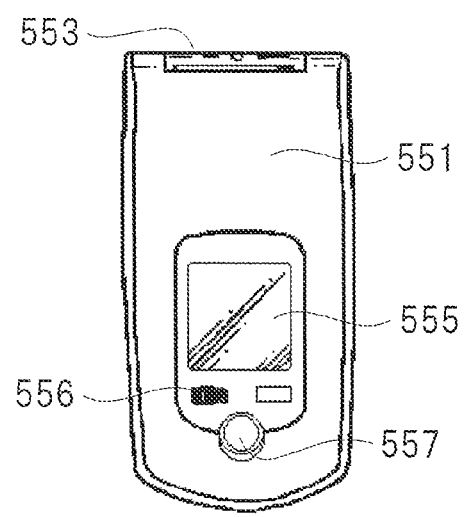
FIG. 41 is a perspective view representing an appearance of a mobile phone as one example of the electronic device of the fifth embodiment.

FIG. 40 and FIG. 41 are front views representing an appearance of a mobile phone as one example of the electronic device of the fifth embodiment. FIG. 41 shows a state where the mobile phone shown in FIG. 40 has been folded. The mobile phone is constituted by connecting, for example, an upper side casing 551 and a lower side casing 552 at a connecting portion (hinge portion) 553, and has a display 554, a sub-display 555, a picture light 556, and a camera 557. The display 554 or the sub-display 555 is composed of the display device with a touch detection function of one of the first embodiment to the fourth embodiment and the modification examples thereof, or the like.

<Smartphone>

Figure 42:
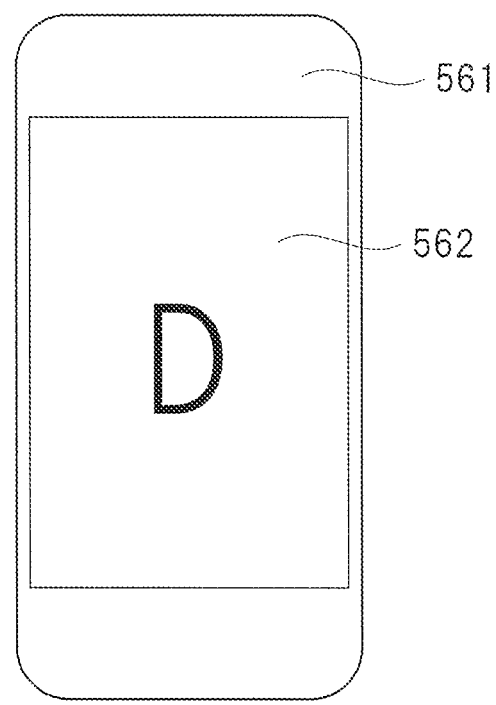
FIG. 42 is a perspective view representing an appearance of a smartphone as one example of the electronic device of the fifth embodiment.

FIG. 42 is a front view representing an appearance of a smartphone as one example of the electronic device of the fifth embodiment. The smartphone has, for example, a casing 561 and a touch screen 562. The touch screen 562 is composed of, for example, a touch panel serving as an input device and a liquid crystal panel serving as a display portion, and is constituted of the display device with a touch detection function of an in-cell type or the display device with a touch detection function of an on-cell type which has been described in the first embodiment to the fourth embodiment and the modification examples thereof.

The touch panel of the touch screen 562 is composed of, for example, the touch panel TP1 described with reference to FIG. 6, and it is provided on a surface of the liquid crystal panel composed of, for example, the display device LCD1 described with reference to FIG. 6. When a user uses his/her finger or a touch pen to perform such a gesture operation as a touch operation or a drag operation to the touch panel, the touch panel of the touch screen 562 detects coordinates of a position corresponding to the gesture operation to output the same to a control section (not shown).

The liquid crystal panel of the touch screen 562 is composed of, for example, the display device LCD1 described with reference to FIG. 6, as described above. Further, though not illustrated in FIG. 42, the liquid crystal panel of the touch screen 562 composed of the display device LCD1 has a driving section composed of, for example, the driving circuit DR2 described with reference to FIG. 6. The driving section composed of the driving circuit DR2 causes each of pixel electrodes arranged corresponding to each of a plurality of pixels disposed in a matrix fashion in the display device LCD1 described with reference to FIG. 6 to perform display by applying a voltage as an image signal to the pixel electrodes at respective constant timings.

<Main Feature and Advantageous Effect of This Embodiment>

In the fifth embodiment, in the input devices provided in the display devices of the various electronic devices described above, adjustment can be performed such that the electrostatic capacitance between the driving electrode different in width from the other driving electrodes and the detecting electrode approaches the electrostatic capacitance between each of the other driving electrodes and the detecting electrode.

Therefore, the tolerance of the detected capacitance detected when a driving voltage has been applied to the driving electrode different in width from the other driving electrodes to the lower limit or the upper limit of the ADC range is prevented from becoming small, so that a noise immunity of the detected capacitance can be prevented or inhibited from lowering. Therefore, in the same manner as the first embodiment to the fourth embodiment and the modification examples thereof, the position detection accuracy can be prevented or inhibited from lowering on the driving electrode different in width from the other driving electrodes as compared with on the other driving electrodes so that the position detection sensitivity can be prevented or inhibited from lowering. Therefore, performances of the various electronic device described above can be improved.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention is effectively applied to an input device, a display device and electronic device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An input device comprising:
   a plurality of first electrodes extending in a first direction, respectively, and arranged in a second direction intersecting with the first direction in a plan view;
   a second electrode arranged outside at least one side of an arrangement of the plurality of first electrodes and extending in the first direction in a plan view; and
   a plurality of third electrodes extending in the second direction, respectively, and arranged in the first direction in a plan view,
   wherein an input position is detected based upon a first electrostatic capacitance between the third electrode and the first electrode and a second electrostatic capacitance between the third electrode and the second electrode,
   wherein an area of a portion of the third electrode overlapping with the second electrode is smaller than an area of a portion of the third electrode overlapping with the first electrode,
   wherein a first width of the second electrode in the second direction is smaller than a second width of the first electrode in the second direction, and
   wherein the third electrode includes a first expanding portion for expanding the area of the third electrode on an opposite side of the plurality of first electrodes interposing the second electrode in a plan view.

2. The input device according to claim 1,
   wherein the first expanding portion expands the area of the third electrode such that the first electrostatic capacitance is equal to the second electrostatic capacitance.

3. The input device according to claim 1, wherein
   the first expanding portion is in contact with the second electrode in a plan view.

4. The input device according to claim 1,
   wherein the third electrode includes a main body portion extending in the second direction in a plan view, and
   the expanding portion is an overhang portion projecting in the first direction from the main body portion, on an opposite side of the plurality of first electrodes interposing the second electrode in a plan view.

5. The input device according to claim 1, further comprising
   a fourth electrode arranged outside the other side of the arrangement of the plurality of first electrodes and extending in the first direction,
   wherein the input position is detected based upon the first electrostatic capacitance, the second electrostatic capacitance, and an electrostatic capacitance between the third electrode and the fourth electrode,
   a third width of the fourth electrode in the second direction is smaller than the second width, and
   the third electrode includes a second expanding portion for expanding the area of the third electrode, on a side opposite of the plurality of first electrodes interposing the fourth electrode in a plan view.

6. The input device according to claim 1,
   wherein the first expanding portion does not face either of the first electrode and the second electrode.

* * * * *